US010963449B2

(12) United States Patent
Seidel

(10) Patent No.: US 10,963,449 B2
(45) Date of Patent: Mar. 30, 2021

(54) PROCESS CONTROL CIRCUIT AND METHOD FOR CONTROLLING A PROCESSING ARRANGEMENT

(71) Applicant: Infineon Technologies AG, Neubiberg (DE)

(72) Inventor: Ulf Seidel, Dresden (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 372 days.

(21) Appl. No.: 15/993,304

(22) Filed: May 30, 2018

(65) Prior Publication Data

US 2018/0349434 A1  Dec. 6, 2018

(30) Foreign Application Priority Data

May 31, 2017  (DE) .......................... 10 2017 111 926

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
None
See application file for complete search history.

(56) References Cited

U.S. PATENT DOCUMENTS

| 6,092,033 A * | 7/2000 | Uhlmann | G06F 17/18 |
| | | | 701/469 |
| 6,738,682 B1 | 5/2004 | Pasadyn | |
| 6,757,579 B1 * | 6/2004 | Pasadyn | G05B 13/04 |
| | | | 700/108 |
| 2003/0110015 A1 * | 6/2003 | Akopian | G01S 19/39 |
| | | | 702/191 |
| 2007/0288626 A1 * | 12/2007 | Cunningham | H04Q 9/00 |
| | | | 709/224 |
| 2008/0255911 A1 * | 10/2008 | Khosla | G01S 5/0294 |
| | | | 705/7.38 |

(Continued)

FOREIGN PATENT DOCUMENTS

| DE | 19902795 A1 | 8/2000 |
| DE | 60207588 T2 | 11/2006 |
| DE | 112010000703 T5 | 6/2013 |

*Primary Examiner* — Son T Hoang
(74) *Attorney, Agent, or Firm* — Slater Matsil, LLP

(57) ABSTRACT

According to an embodiment, a processing circuit includes: a data acquisition circuit configured to acquire process data and measurement data of a processing arrangement, the process data including a plurality of process event data in accordance with a plurality of process events and the measurement data including a plurality of measurement event data in accordance with a plurality of measurement events; a data merging circuit configured to provide state information, the state information representing a status of the processing arrangement, and accuracy information representing an accuracy of the state information; wherein the data merging circuit is further configured to update the state information based on the acquired process event data, wherein the accuracy of the state information is decreased, and, independently from updating the state information, to downdate the state information based on the acquired measurement event data, wherein the accuracy of the state information is increased.

31 Claims, 19 Drawing Sheets

(56) References Cited

U.S. PATENT DOCUMENTS

| | | | |
|---|---|---|---|
| 2009/0093924 A1* | 4/2009 | Aso .................... | B60W 40/10 701/31.4 |
| 2010/0191361 A1 | 7/2010 | McCready et al. | |
| 2010/0317420 A1* | 12/2010 | Hoffberg ............... | G07F 17/323 463/1 |
| 2010/0332147 A1* | 12/2010 | Stephens .............. | G01N 33/005 702/24 |
| 2013/0337825 A1* | 12/2013 | Brunk ................... | H04W 64/00 455/456.1 |
| 2014/0214354 A1* | 7/2014 | Dreifus ............... | G01R 31/2856 702/117 |
| 2015/0226049 A1* | 8/2015 | Frangos ................ | E21B 49/00 702/6 |
| 2017/0059318 A1* | 3/2017 | Kim ...................... | G01C 17/38 |

* cited by examiner

PROCESS CONTROL CIRCUIT AND METHOD FOR CONTROLLING A PROCESSING ARRANGEMENT

This application claims the benefit of German Application No. 102017111926.4, filed on May 31, 2017, which application is hereby incorporated herein by reference in its entirety.

TECHNICAL FIELD

Various embodiments relate generally to a process control circuit and a method for controlling a processing arrangement.

BACKGROUND

In general, in many branches of industry, more or less complex processing arrangements may be used to produce or process the desired goods, e.g. electronic devices, mechanical devices, electromechanical devices, and the like. Such processing arrangements may include a plurality of processing tool or any other suitable devices for processing the goods. In semiconductor industry, for example, a so-called tool park including a plurality of processing tools may be used for processing any suitable type of workpiece, e.g. for processing a wafer, a chip, a chip package, a circuit board, and the like. In semiconductor industry, processing a workpiece may include one or more layering processes, one or more patterning processes, one or more temperature treatments, one or more implantation processes, etc. Although the processing tools can be controlled individually, a global control system can be used to control all of the processing tools, e.g. for adjusting the respective processing tools, for setting one or more operation parameters of the respective processing tools, or for other adjustment of the respective processing tools. The local and/or global (e.g. factory wide) control of the respective processing tools may be also referred to as run-to-run system. However, in general it may be difficult to control a large number of processing tools running also a large number of different processes with respect to the data processing.

SUMMARY

According to various embodiments, a processing circuit may include: a data acquisition circuit configured to acquire process data and measurement data of a processing arrangement, the process data including a plurality of process event data in accordance with a plurality of process events and the measurement data including a plurality of measurement event data in accordance with a plurality of measurement events; a data merging circuit configured to provide state information, the state information representing a status of the processing arrangement, and accuracy information representing an accuracy of the state information; wherein the data merging circuit is further configured to update the state information based on the acquired process event data, wherein the accuracy of the state information is decreased, and, independently from updating the state information, to downdate the state information based on the acquired measurement data, wherein the accuracy of the state information is increased, and a control circuit configured to control the processing arrangement based on the state information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF ILLUSTRATIVE EMBODIMENTS

Figure 1:
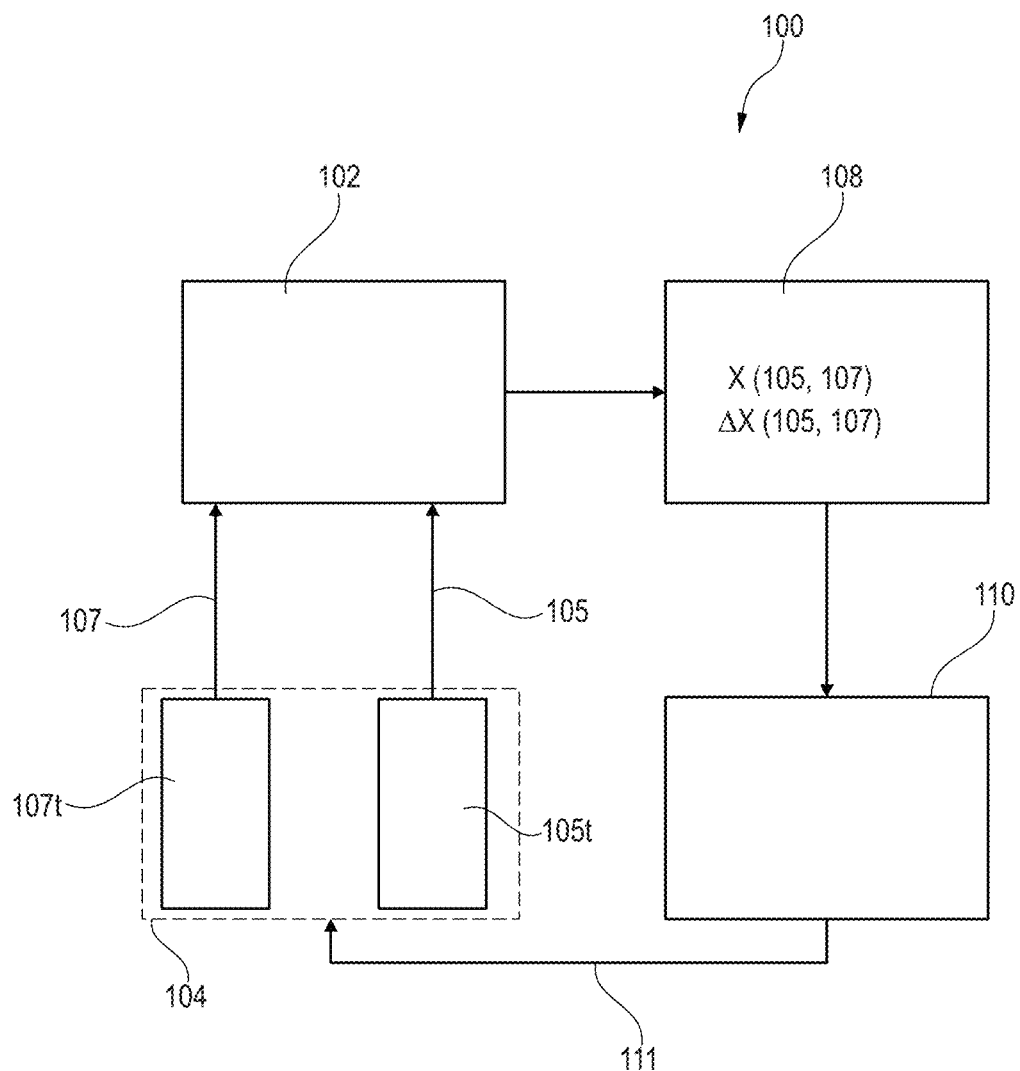
FIG. 1 shows a schematic diagram of a process control circuit, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

The terms "at least one" and "one or more" may be understood to include any integer number greater than or equal to one, i.e. one, two, three, four, [ . . . ], etc. The term "a plurality" may be understood to include any integer number greater than or equal to two, i.e. two, three, four, five, [ . . . ], etc.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processing circuit" (or equivalently "processing circuitry" or "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

In the following, a general description of a process control circuit is provided, according to various embodiments, followed by various embodiments described the process control circuit in more detail. FIG. 1 illustrates a process control circuit 100 in a schematic diagram, according to various embodiments.

The process control circuit 100 may include a data acquisition circuit 102. The data acquisition circuit 102 may be configured to acquire process data 105 and measurement data 107 of a processing arrangement 104. The processing arrangement 104 may include a plurality of processing tools 105$t$, e.g. manufacturing tools, or any other type of processing structures. Further, the processing arrangement 104 may include a plurality of measurement tools 107$t$ or any other type of measurement structures.

According to various embodiments, the process data 105 may include a plurality of process event data 105$d$ in accordance with a plurality of process events 105$e$. The measurement data 107 may include a plurality of measurement event data 107$d$ in accordance with a plurality of measurement events 107$e$ (see FIG. 3).

According to various embodiments, the processing tools 105$t$ may include any tool that is used in semiconductor processing, e.g. a layering tool (e.g. performing chemical or physical vapor deposition), a patterning tool (e.g. a lithography tool), an etching tool, a grinding tool, a dicing tool, an annealing tool, and the like. According to various embodiments, the measurement tools 107$t$ may include any tool that is used in semiconductor processing, e.g. a tool for measuring a thickness of a carrier, a tool for measuring optical properties, a tool for measuring electrical properties, a tool for testing a processed structure, and the like.

In case of semiconductor processing, each of the used processing tools 105$t$ of the processing arrangement 104 may provide process event data 105$d$ for a process event 105$e$, wherein a process event 105$e$ may be for example any type of process performed with the processing tool 105$t$ related to a processed workpiece, e.g. to a wafer, a chip, a package, and the like. Further, the each of the used measurement tools 107$t$ of the processing arrangement 104 may provide measurement event data 107$d$ for a measurement event 107$e$, wherein a measurement event 107$e$ may be for example any type of measurement performed with the measurement tool 107$t$ related to a processed workpiece, e.g. to a wafer, a chip, a package, and the like. Therefore, according to various embodiments, for a respective workpiece, W, manufactured with the processing arrangement 104 a corresponding set of correlated process data and measurement data may be provided, $W_1(105\text{-}1,107\text{-}1)$, $W_2(105\text{-}2,107\text{-}2)$. The correlated process data and measurement data may be used to control the processing arrangement 104, wherein the processing arrangement 104 includes a large number of processing tools 105$t$ and/or measurement tools 107$t$, e.g. more than 100 processing tools and/or measurement tools, in any desired way, which may be also referred to as run-to-run control. Due to the combination of the large number of tools and the large number of different workpieces (or illustratively products) a huge amount of data are to be handled.

Further, the process control circuit 100 may include a data merging circuit 108 configured to provide state information, X. The state information representing a status of the processing arrangement 104, and accuracy information $\Delta X$ representing an accuracy of the state information X. According to various embodiments, the generation of the accuracy information ΔX may be important to properly control the processing arrangement 104 based on the acquired data 105, 107. The processing data 105 may also include model data or model parameter for a corresponding process model for modelling a process of one or more of the plurality of processing tools 105t and/or measurement tools 107t. According to various embodiments, the processing arrangement 104 may include a data base circuit or any other suitable circuit for providing the process data 105 and/or measurement data 107.

According to various embodiments, the data merging circuit 108 may be further configured to update the state information X (e.g. by performing a process update) based on the acquired process event data 105, whereby the accuracy of the state information X is decreased, and, independently from updating the state information, to downdate the state information X (e.g. by performing a downdate, also referred to as metrology update) based on the acquired measurement event data (107), whereby the accuracy of the state information X is increased. Illustratively, the state information X may be kept up to date including as many as possible information (i.e. based on the process data 105 and measurement data 107) available at the respective time. The state information X may also allow predicting a result of possible following process events 105e and/or measure events 107e. Therefore, the processing arrangement 104 may be controlled based on the state information X. Alternatively or additionally, the processing arrangement 104 may be controlled based on the accuracy information ΔX.

Further, the process control circuit 100 may include a control circuit 110 configured to control 111 the processing arrangement 104 based on the state information X and/or based on the accuracy information ΔX.

According to various embodiments, the data merging circuit 106 may be configured to model the processes of the process arrangement 104 including accuracy data for each of the process data 105 and measurement data 107.

According to various embodiments, the process control circuit 100 may be configured according to various embodiments as described in the following. The embodiments may be included individually or in combination into the process control circuit 100. Various embodiments are related to the proper use of the accuracy information ΔX to control the processing arrangement 104 and/or to control any other connected circuit, e.g. a monitoring circuit for monitoring the processing arrangement 104, e.g. warning circuit, a dispatcher circuit, a communication circuit, and the like.

According to various embodiments, data merging circuit 108 may be configured to model the processes carried out by the processing arrangement 104 based on a process model and to predict processing results based on the process model. The data merging circuit 108 may be configured to provide results in real time, i.e. as fast as possible or in other words with as less computational effort as possible, and, at the same time, to model a plurality of processes (e.g. manufacturing processes) in a complex and dynamic process environment.

According to various embodiments, the process control circuit 100 may be used in semiconductor manufacturing. In general, an external automatic control is used in addition to one or more internal control systems of the manufacturing tool to improve the stability of semiconductor manufacturing processes. This external automatic control is also referred to as run-to-run-control (R2R). The control loops almost ever include more than one manufacturing operation (e.g. pre-metrology, processing, post-metrology). The control may be typically provided by a central, fab-wide, automatic system (R2R system) operated 24/7.

According to various embodiments, a run-to-run strategy may include two steps. First, estimating a suitable state (also referred to as state information) of the controlled processes using process data of previous materials. This data may include for example inline measurements (e.g. of a film thickness, a critical dimension, etc.), derived quantities (like e.g. the removal rate) and tool data. The state is chosen to reflect the properties of the process that need to be tuned. Second, using the state estimate to calculate the tuning parameter(s) for the next material.

According to various embodiments, the state estimation may be a main aspect of the control algorithm, i.e. of the process control circuit 100 and of a method for controlling the processing arrangement 104. In real life, state information can be corrupted in many ways, e.g. by missing, delayed or faulty measurements. It may be important to validate the state information permanently to avoid yield loss and/or scrap during processing or manufacturing. Therefore, the processing arrangement 104 may be configured to provide also information about the accuracy of the state information, e.g. a statistical error information as, for example, the estimation error standard deviation. According to various embodiments, the validation routines may be part of the control algorithm. Without a proper validation, the state estimates may be virtually worthless. According to various embodiments, the validity information (or in other words one or more accuracy information) may be used for at least one of the following functions:

To automatically interrupt the control loop in case of an invalid state,

To automatically trigger additional measurements to restore the state validity,

To control the number of measured materials (e.g. via the metrology sampling system), To select automatically a suitable manufacturing tool for the next material to be processed (i.e. to select a tool for which a valid state exists), To send materials automatically to manufacturing tools in order to prevent the expiration of the corresponding tool states, and To adapt the feedback gain of the control loop, e.g. increase the feedback if the state is (partially) expired and/or the incoming measurement data contains significant new information.

Conventionally, simplistic validation criteria may be used for obtained states of the processing arrangement 104, as for example:

The state may be invalidated if the time since the last state update exceeds some predefined threshold (time-out), The state may be invalidated if the number of processed materials (e.g. lots, wafers, etc.) since last state update exceeds some predefined threshold (material-out), The state update may be suppressed if the number of individual measurements is below a predefined threshold, The state may be invalidated if the number of material that are processed but not measured yet exceeds a predefined threshold. Alternatively, to a simple arithmetic sum of the number of materials a weighted sum can be used as well. The weighted sum emphasized materials that are processed most recently (unobserved drift), In the case that an EWMA (exponentially weighted moving average) filter is used for state estimation, the effective suppression of the measurement noise due to the filter can be quantified (noise reduction factor). The state may be valid only if the noise reduction exceeds some predefined threshold.

The thresholds for the simplistic validation criteria described above may be conventionally determined by a process engineer based on "gut feeling". The significance of the criteria is compromised by this highly subjective and error prone approach. In addition, the criteria are static and do not reflect the very dynamic nature of a high-mixture, low-volume manufacturing. Due to these limitations, the thresholds are conventionally chosen conservatively which causes premature interruptions of the control loop, and other problems. In many cases, the validity information described above cannot be implemented due to a lack of reliable validity information.

The state estimate may be corrupted by several mechanisms, as for example:
Tool drift (magnitude differs for different products),
Tool maintenance (random and/or systematic state shift),
Measurement blackout or shortage,
Measurements sampling, and/or
Low running products.

Each of the simplistic validation criteria described above may cover only a partial aspect of the actual situation. Desirable would be a validation routine, as described herein, which is able to cover all corruption mechanism simultaneously.

As an example, the removal rate of a chemical-mechanical planarization process may degrade for each processed wafer or product. The magnitude of degradation may depend on the surface structure of the particular wafer or product processed. The wafer or products may be processed in virtually random order. Some lots are measured immediately some with a considerable time delay. Run-to-run control may be used to model the degradation of the removal rate and to tune the chemical-mechanical planarization process, e.g. to adjust the removal time. In this complex situation, it is impossible for the process engineer using a conventional run-to-run system to correctly specify
A fixed timeout for the removal rate estimate (the time in which estimation error rises above some predefined threshold is highly variable),
A fixed material out (the number of wafers processed before the estimation error violates same predefined threshold is highly variable),
A fixed number of individual measurements per wafer needed for a valid state update (the information provided by each measurement differs considerably depending on the location of the measurement site),
A fixed upper limit for number of processes wafers that are not measured yet (different products deteriorate the state estimate differently), and/or
A lower limit for the noise reduction factor (for the calculation of the noise reduction factor it is assumed that all products deteriorate the state estimate similarly; also missing or delayed measurements are neglected).

According to various embodiments, the state estimation and validation system may be built as described in the following. It is noted, that a skilled person may modify or reformulate the equations and/or algorithms described in the following without changing the general concept defined by the equations and/or algorithms. For example, the indices used herein may be changed or replaced by other indices, or any suitable programming language may be used to implement the algorithms. The variables in form of scalars, vectors, and/or matrices may be reformulated differently as well. However, a general concept is provided and described herein based on one or more examples. Further, also detailed solutions for preferred embodiments are provided in the following, however, they have to be understood as exemplary since the mathematical concept allows different formulations of the same equations.

According to various embodiments, a linear time variant state space model may be used including a random excitation to model the process, e.g. according to the following equation:

$$x_{k+1}=A_{k+1}x_k+Q_{k+1}\xi_{k+1}+B_{k+1} \quad (1)$$

In this case, x is a state vector (in more detail, $x_{k+1}$ is the unknown state vector to be estimated and $x_k$ is a previous state vector), $A_{k+1}$ is a state transition matrix, $\xi_{k+1}$ is a random vector representing process noise (e.g. with $E[\xi]=0$; $E[\xi^2]=I$), $Q_{k+1}$ is a noise scaling matrix, and $B_{k+1}$ is a process drift vector representing deterministic state drifts, and k is a counter variable. Equation (1) describes the evolution of the state vector x from time k to time k+1 due to a single processing step. In other words, a plurality of processes carried out by the processing arrangement 104 (also referred to as process events) may be mapped to the index k, wherein the index k may also represent the chronological order of respective processes. Different parameter matrices Q, B, A can be used for each time instance according to the tools, materials, etc. involved in the processing step. The possibility to use different matrices/vectors for each time step may be useful for modelling the impact of different tools, materials, etc. precisely.

As illustrated above, according to various embodiments, the data merging circuit 108 may be configured to model the process data 105 based on a process model including one or more process model parameter for modelling known influences (e.g. process model parameter A, B), and/or one or more a process noise parameter for modelling unknown influences (e.g. process model parameter Q or N, as described in more detail below).

The data merging circuit 108 may be for example configured to model the process data 105 based on a (e.g. linear time variant state space) process model including at least one of the following process model parameters: a state transition parameter (e.g. process model parameter A), a process noise parameter (e.g. process model parameter Q or N, as described below), and/or a process drift parameter (e.g. process model parameter B).

As an example, the data merging circuit 108 may be configured to model the process data 105 similar to Equation (1), as follows:

$$x_{k+1}=A_{k+1}k+N_{k+1}+B_{k+1} \quad (1^*)$$

In this case, $x_{k+1}$ is a state vector, is a previous state vector, $A_{k+1}$ is a state transition matrix, $N_{k+1}$ is a process noise vector, $B_{k+1}$ is a process drift vector, and k is a counter variable. With $N_{k+1}=Q_{k+1}\xi_{k+1}$, wherein $\xi_{k+1}$ is a random vector representing process noise (e.g. with $E[\xi]=0$; $E[\xi^2]=I$) and $Q_{k+1}$ is a noise scaling matrix, the equation equals Equation (1).

According to various embodiments, the corresponding measurement is modelled in accordance with the process model, as for example as follows:

$$y_{k+1}=C_{k+1}x_{k+1}+R_{k+1}\eta_{k+1}+D_{k+1} \quad (2)$$

In this case, y is the scalar measurement value, C is the observation vector, e.g. representing the contribution of the elements of the state vector x to the scalar measurement value y, η is a random vector representing measurement noise (e.g. in the form of $E[\eta]=0$; $E[\eta^2]=I$), D is a scalar modeling additional deterministic feed forward effects, and k is a counter variable. As described above, different parameter matrices C, R, D may be used for each time step.

According to various embodiments, a number of m corresponding independent equations (2) can be formulated in the case that the measurement provides a number of m (possibly correlated) measurement values. In this case, the m measurements may be considered by executing the m equations (2) sequentially.

As illustrated above, the data merging circuit 108 may be configured to model the measurement data 107 based on one or more measurement model parameter for modelling known influences (e.g. measurement model parameter C and/or D), and/or one or more a measurement noise parameter for modelling unknown influences (e.g. measurement model parameter R and/or M, as described in more detail below). The data merging circuit 108 may be for example configured to model the measurement data 107 based on a measurement model (the modelling of the measurement may correspond to the process model) including at least one of the following measurement model parameters: an observation parameter (measurement model parameter C), a measurement noise parameter (measurement model parameter R or M), and/or a measurement offset parameter (measurement model parameter D).

As an example, the data merging circuit 108 may be configured to model the measurement data 107 similar to Equation (2) as follows:

$$y_{k+1}=C_{k+1}x_{k+1}+M_{k+1}+D_{k+1} \quad (2^*)$$

In this case, $y_{k+1}$ is a scalar measurement value or a measurement vector, $C_{k+1}$ is an observation vector or an observation matrix (e.g. describing the contribution of the elements of state vector $x_{k+1}$ to $y_{k+1}$), $M_{k+1}$ is a measurement noise scalar or a measurement noise vector, $D_{k+1}$ is a measurement offset scalar or a measurement offset vector, and k is a counter variable. With $M_{k+1}=R_{k+1}\eta_{k+1}$, wherein $\eta_{k+1}$ is a random vector representing measurement noise (e.g. with $E[\eta]=0$; $E[\eta^2]=I$) and $R_{k+1}$ is a noise scaling vector or a noise scaling matrix, this equation equals Equation (2).

According to various embodiments, not all elements of the matrices (A, N, Q, B, C, M, R) may be parametrized individually. One or more elements can be set to zeros. Large groups of elements can be assigned to the same parameter. In this way, the effective number of parameters may be reduced dramatically, if desired.

According to various embodiments, production mass-data (e.g. including for example process data 105 and measurement data 107 of the respective process to be modeled) may be collected over a predetermined time-period. A statistical procedure (e.g. a maximum likelihood estimation, as described in more detail below) may be used to determine the parameters N, Q, M, R, B, D, C, A of the process model described above, e.g. according to Equations (1), (2) or (1*), (2*), or any other suitable process model based on similar equations.

According to various embodiments, a Kalman filter may be used to estimate the state x and the corresponding estimation error covariance matrix P (the estimation error covariance matrix P may describe the accuracy of the prediction of state "x" via the process model. The filter may be parametrized with the matrices determined for example by the statistical procedure described above. According to various embodiments, the Kalman filter may be split into two sets of equations, therefore, the update and the downdate of the state information can be performed independently of each other.

According to various embodiments, the Kalman filter may be split into two sets of Equations (3), (4) based for example on Equations (1), (2) as follows:

$$\hat{x}_{k+1}=A_{k+1}\hat{x}_k+B_{k+1}$$

$$P_{k+1}=A_{k+1}+P_k+A_{k+1}^T+Q_{k+1}Q_{k+1}^T \quad (3)$$

$$\hat{x}_{k+1}=\hat{x}_k+K_{k+1}(y_{k+1}-C_{k+1}\hat{x}_k-D_{k+1})$$

$$P_{k+1}=(I-K_{k+1}C_{k+1})P_k$$

$$K_{k+1}=P_kC_{k+1}^T(C_{k+1}P_kC_{k+1}^T+R_{k+1}R_{k+1}^T)^{-1} \quad (4)$$

In the same way, the Kalman filter may be split into two sets of equations based for example on Equations (1*), (2*) or similar equations of another suitable process model. Both sets of Equations (3), (4) may be executed completely independently from each other. Equation (3) may be executed after each process or maintenance step (also referred to as "process update" or only as "update"). Those steps increase the estimation error and, therefore, decrease the accuracy of the state information, as new unknown process noise dislocates the observed state. Equation (4) may be executed after one or more measurement steps (also referred to as "metrology update" or only as "downdate"). Considering measurement data decreases the estimation error and, therefore, increases the accuracy of the state information, as they provide new information about the state. In the case that the metrology data (also referred to as measurement data) consist of more than one measurement value, the metrology update (4) may be performed for each value separately. The succession of (3) and (4) mirrors the accumulation and deterioration of the process information (e.g. the decrease and the increase and of estimation error) precisely as long as the process model parameters N, Q, M, R, B, D, C, A fit to the real life processes performed for example by the processing arrangement 104. According to various embodiments, the process model including the independent update and downdate, as described herein, offers a unified framework for modelling and monitoring all relevant state corruption mechanism simultaneously, as also described in more detail below.

According to various embodiments, the error covariance matrix $P_{k+1}$ may be used to calculate the error variance or in other words to provide accuracy information of the state information. The error variance may be determined based on the following equation or similar formulations:

$$\sigma_{ERR}^2=\overline{C}P_{k+1}\overline{C}^T \quad (5)$$

In this case, one or more state combinations of interest may be defined by state extractor vector $\overline{C}$. According to various embodiments, the estimation error standard deviation $\sigma_{ERR}$ may be used to validate the state combination. The estimation error standard deviation $\sigma_{ERR}$ has the same physical unit as the observed state combination.

According to various embodiments, an appropriate threshold may be used in combination with the estimation error standard deviation $\sigma_{ERR}$ to interrupt the control loop, to trigger additional measurements, etc., as described above. The utilization of the error covariance matrix P for state validation may be helpful and a main difference to commonly used run-to-run Kalman filter applications.

According to various embodiments, the state vector $\hat{x}$ and the error covariance matrix $\hat{P}$ may be augmented automatically when data for new products, tool, etc. are acquired.

Therefore, the run-to-run controller (e.g. the process control circuit 100) may be able to adapt to the ever-changing environment of semiconductor production or of any other processing environment.

Figure 2A:
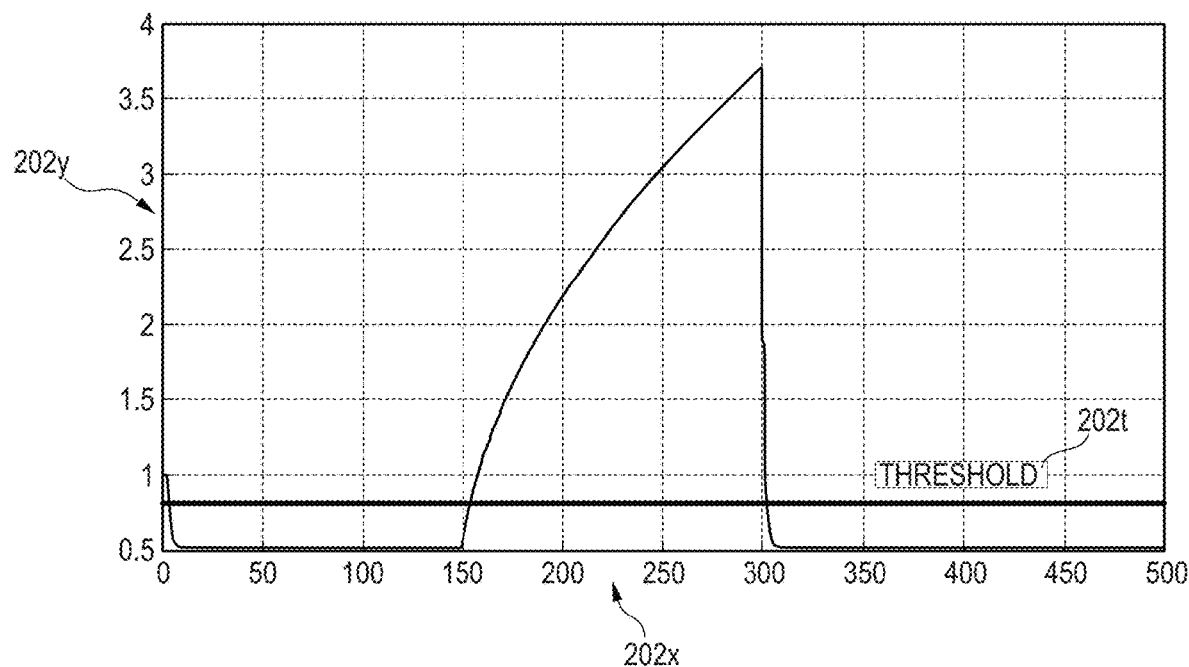
FIGS. 2A and 2B shows an example of an operation of a data merging circuit, according to various embodiments.

FIG. 2A illustrates the operation of the data merging circuit 108, or in other words, the operation of the process control circuit 100 based on a plot, according to various embodiments. The plot shows the accuracy of the state information 202y (e.g. based on an error standard deviation, $\sigma_{ERR}$, or based on a ratio normalized innovation (which may be understood for example as a normalized prediction error), as described in more detail below) for a single state model over a time index, k, 202x. The corresponding threshold 202t may be used for example to interrupt the control loop, to trigger additional measurements, etc., as described above. As illustrated, a measurement blackout is assumed from time index k=150 to time index k=300. The accuracy of the state information (e.g. the error standard deviation) exceeds the threshold 202t right after startup and in the time of the measurement blackout. After the measurement blackout, the accuracy of the state information decreases and falls below the threshold 202t quickly. Both effects (settling and measurement blackout) may be monitored by the same threshold, according to various embodiments.

Figure 2B:
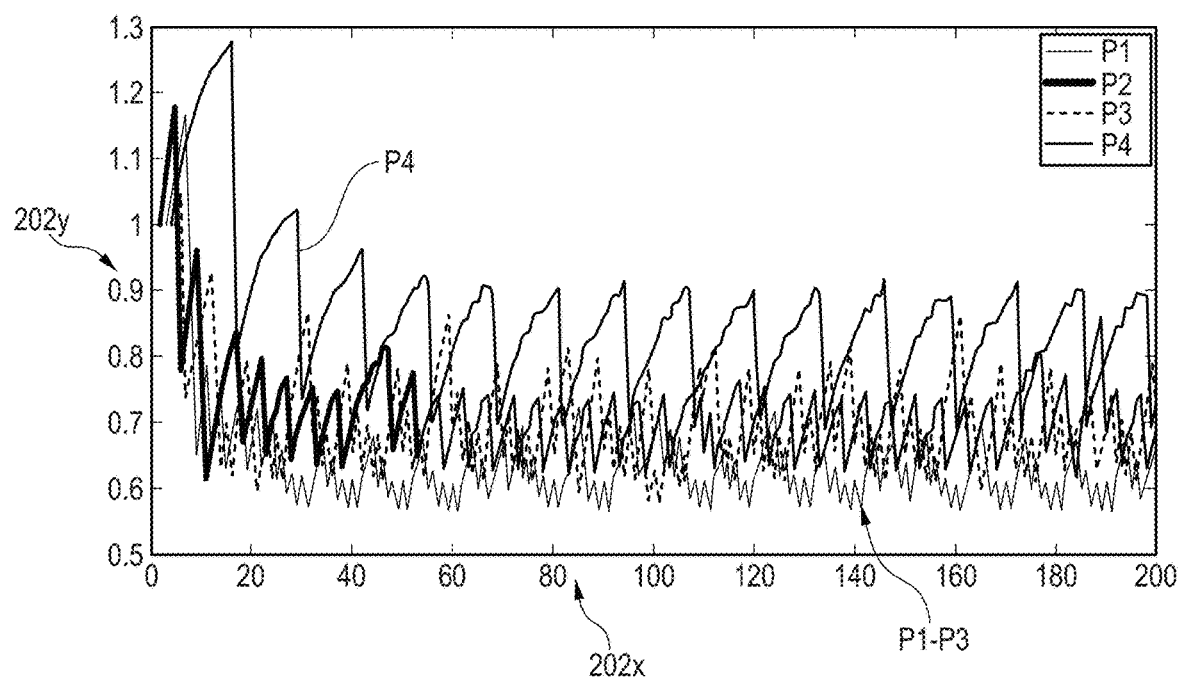

FIG. 2B illustrates the operation of the data merging circuit 108, or in other words, the operation of the process control circuit 100 based on a plot, according to various embodiments. The plot illustrates the accuracy of the state information 202y (e.g. based on an error standard deviation, $\sigma_{ERR}$, or based on a ratio normalized innovation, as described in more detail below) for four products processed with different frequency. P1 to P3 are for example high running products while P4 is a for example low running product. The magnitude of the estimation error (or any other suitable value to determine the accuracy of the state information) differs considerable due to the dissimilar processing frequencies. According to various embodiments, the data merging circuit 108, as described herein, is able to model this effect correctly. In addition, the estimation error rises when material is processed without inline measurements. This effect is also covered by the data merging circuit 108. According to various embodiments, the predicted estimation error is accumulated until a new measurement arrives. Due to the metrology update (also referred to as downdate), the estimation error drops and accumulates again afterwards.

According to various embodiments, the process control circuit 100 described herein may offer at least one or all the following aspects:
It may provide state estimation that is optimal with respect to the available data considering that:
Data are scarce, erratic and precious in low-volume, high-mixture manufacturing,
The feedback gain can be adjusted to data situation and wafers in process (WIP),
Estimates are optimal for any point in time,
A state estimate is optimal even in adverse situations (e.g. missing measurements, sampling, etc.);
An estimation error may be provided (e.g. calculated) considering that:
Recommendation can be suppressed if accuracy of state estimate is insufficient,
Permanent model validation is realized, e.g. it can be checked whether incoming data are modeled consistently and/or whether the internal model used for prediction is provided properly and complies with the real life process, A universal framework for simple and complex control task is provided; and
A model based approach is provided, which only focuses on a proper modelling of the process without the need of adapting the estimation algorithms itself.

According to various embodiments, the data merging circuit 108 may be a component of a run-to run system (e.g. in semiconductor manufacturing). According to various embodiments, the data merging circuit 108 may be used as a component of a (for example fab-wide) automatic run-to-run control system. Such systems may exist in every modern semiconductor fab. However, the use of the data merging circuit 108 may be not limited to central (fab-wide) systems; it could be also applied to a local system as well. The task of R2R systems may be to modify (e.g. to tune or to adapt) and optimize process parameters of critical production processes. The R2R system may control many production processes simultaneously and may hold the state information (e.g. the state estimate) for all controlled processes, typically in a database. At every relevant production event (e.g. a process, a measurement, a maintenance, etc.), data are send to the R2R system, or in other words, data is acquired by the R2R system. The R2R system may be configured to select the state that corresponds to the current production step and adds the new (acquired) data to it.

According to various embodiments, when the production event deteriorates the state estimate (e.g. due to a processing event, a maintenance event, etc.) data is added by Equation (3), which is also referred to as process update. When the production event generated data (e.g. in case of a metrology event) that improve the state estimate, the data is added by Equation (4), which is also referred to as metrology update.

If material (e.g. a wafer, a lot, a batch, etc.) arrives at a controlled production process, a request may be send to the R2R system. The R2R system may use the state information and/or the accuracy information to predict the outcome of the process. The prediction may be used to calculate one or more tuning parameters that may improve the outcome according to a predefined optimization criterion. The accuracy information (e.g. the estimation error standard deviation $\sigma_{ERR}$ given by Equation (5), may be used as follows:
When the estimation error standard deviation exceeds a predefined threshold, $L_{REC}$, the R2R systems may not send tuning parameters to the processing arrangement 104, e.g. to a production tool. The automatic control loop (e.g. the control of the processing arrangement 104) may be interrupted to avoid yield loss and/or scrap. According to various embodiments, the data merging circuit 108 including at least one validation routine may ensure that automatic run-to-run control (e.g. the control of the processing arrangement 104) is done only if a sufficiently reliable state estimate is available.
Incoming measurement data $y_{k+1}$ may be validated for example by calculating the ratio normalized innovation, $v_0$, for example according to:

$$v_0 = \frac{y_{k+1} - C_{k+1}\hat{x}_k - D_{k+1}}{\sqrt{C_{k+1}P_k C_{k+1}^T + R_{k+1}R_{k+1}^T}} \quad (6)$$

In this case, valid measurements may be characterized by $-Ly \leq v_0 \leq Ly$ with for example 1 $1 \leq Ly \leq 5$, or $2 \leq Ly \leq 4$, or any other suitable interval as a criterion. The ratio normalized innovation $v_0$ is a universal measure that is independent of the use case and the transient behavior (settling) of estimation algorithm. If the ratio normalized innovation $v_0$ exceeds Ly, several reactions may be possible, as for example:

A state update may be skipped because is considered to be faulty, and/or

A process engineer may be informed (e.g. via Email, SMS or any other suitable signal or message) because model and real data do not fit anymore; this could be an indication that the process changed and the process model needs to be readjusted.

The metrology sampling system may be controlled dynamically based on the accuracy information, e.g. based on the estimation error standard deviation $\sigma_{ERR}$. For high values of the estimation error standard deviation $\sigma_{ERR}$, the sampling rate may be reduced (i.e. more materials may be measured); for low values of the estimation error standard deviation $\sigma_{ERR}$, the sampling rate may be increased (e.g. less materials may be measured). For this, according to various embodiments, an interface and a data exchange between the sampling and the R2R system may be provided.

When the estimation error standard deviation $\sigma_{ERR}$ exceeds a predefined threshold, $L_{MET}$, additional measurements may be triggered, e.g. via a real time dispatch (RTD) system, in order to improve the accuracy of the state estimate. For this, according to various embodiments, an interface and a data exchange between the RTD and the R2R system may be provided.

According to various embodiments, a real time dispatching system may be configured to select a new production tool for a specific material based on the estimation error standard deviation $\sigma_{ERR}$:

Wherein only tools may be selected for which the estimation error standard deviation $\sigma_{ERR} < L_{REC}$; this ensures that for all selected tool a valid state for tuning parameter calculation is available, and/or From the selected tools, the tool with the highest estimation error standard deviation $\sigma_{ERR}$ may be chosen; this may prevent further degradation/expiration of the corresponding state estimate.

According to various embodiments, based on the accuracy information, one or more monitoring processes may be started and/or one or more warnings may be sent or displayed. There may be more than one threshold to start more than one different processes corresponding to the respective threshold in the case that the accuracy of the state information exceeds this respective threshold.

According to various embodiments, the data merging circuit 108 or the process control circuit 100 may be a main component of a control system for discrete processes (e.g. batch processes) in any other industries. The embodiments are described herein with reference to semiconductor processing. However, the use of the data merging circuit 108 or the process control circuit 100 may be not limited to semiconductor industry. It can be used for the control of any discrete process that can be described with Equations (1) and (2) or similar equations. The data merging circuit 108 provides a general mean for state validation, which may be a part of a control system.

Figure 3A:
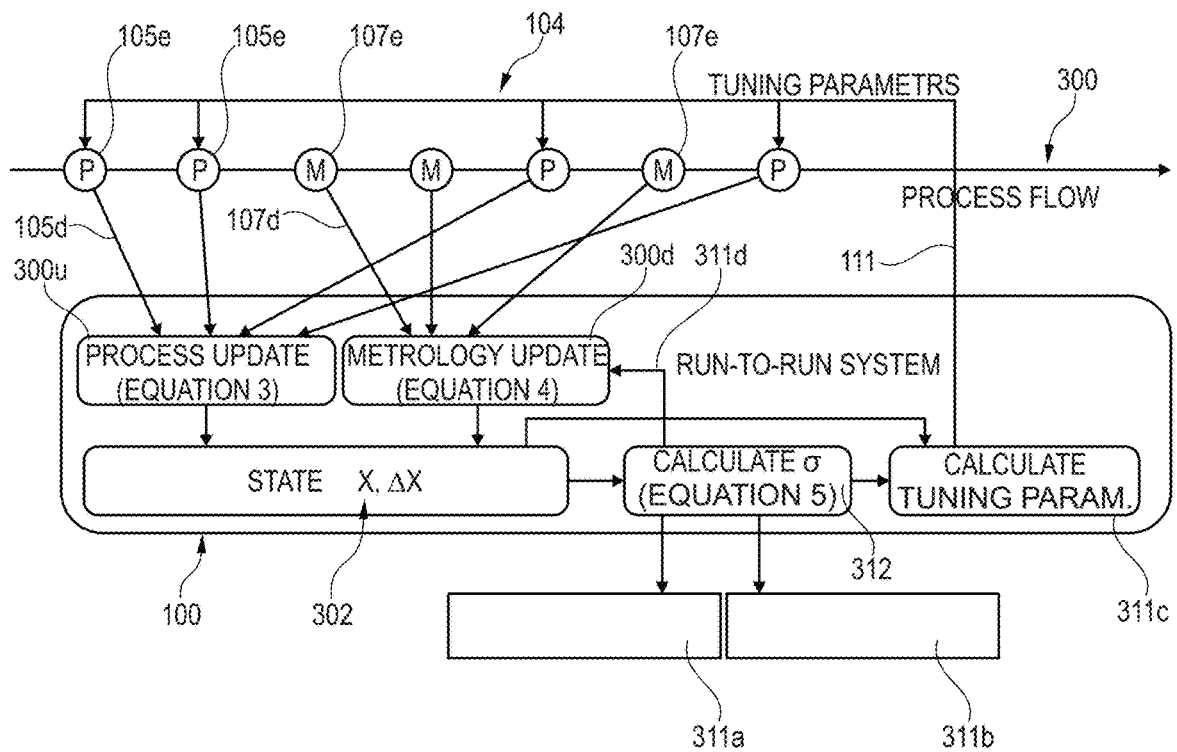
FIG. 3A shows a schematic operation diagram of a process control circuit, according to various embodiments.

FIG. 3A shows a schematic operation diagram of a process control circuit 100 that is used to control a process flow 300 of a processing arrangement 104 and of a method for controlling a processing arrangement 104, according to various embodiments.

In analogy to the embodiments described above, the process control circuit 100 may be configured to acquire process data 105d and measurement data 107d of a processing arrangement 104, the process data 105d may include a plurality of process event data in accordance with a plurality of process events 105e and the measurement data may include a plurality of measurement event data in accordance with a plurality of measurement events 107e. The process control circuit 100 may be further configured to provide an estimated state information 302 (see reference sign X), the estimated state information X representing an estimated status of the processing arrangement 104, and an error information representing an estimation error $\sigma$ (see reference sign $\Delta$X) of the estimated state information X. The process control circuit 100 may be configured to provide the estimated state information X by updating 300u (e.g. by carrying out a process update according to equation 3) and downdating 300d (e.g. by carrying out a metrology update or a downdate according to equation 4) a previous state information based on the acquired process event data 105d and measurement event data 107d, wherein the estimation error $\sigma$ (e.g. calculated according to equation 5) is increased by the updating 300u (e.g. considering the process event data 105d), and, wherein the estimation error $\sigma$ is decreased by the downdating 300d (e.g. considering the measurement event data 107d). The process control circuit 100 may be configured to control 111 the processing arrangement 104 based on at least one of the estimated state information X or the estimation error $\sigma$.

Based on the estimation error $\sigma$ at least one additional circuit may be controlled, e.g. a real time dispatcher may be controlled 311a, the sampling system may be controlled 311b, tuning parameter may be determined 311c, or the incoming measurement event data 105d may be validated 311d. According to various embodiments, the at least one additional circuit may be controlled by sending a message via a communication circuit 312 (e.g. including any suitable circuit for at least sending a message).

According to various embodiments, the method for controlling the processing arrangement 100 may include: acquiring process data 105 and measurement data 107 of the processing arrangement, the process data including a plurality of process event data 105d in accordance with a plurality of process events 105e and the measurement data including a plurality of measurement event data 107d in accordance with a plurality of measurement events 107e; providing state information X representing a status of the processing arrangement 104 and accuracy information $\Delta$X representing an accuracy of the state information X; updating 300u the state information X (e.g. updating a previous state information) based on the acquired process event data 105d, whereby the accuracy of the state information X is decreased, and, independently from updating 300u the state information X, downdating 300d the state information X (e.g. downdating a previous state information) based on the acquired measurement event data 107d, whereby the accuracy of the state information X is increased, and controlling the processing arrangement 104 based on the state information X and/or based on the accuracy information $\Delta$X.

Figure 3B:
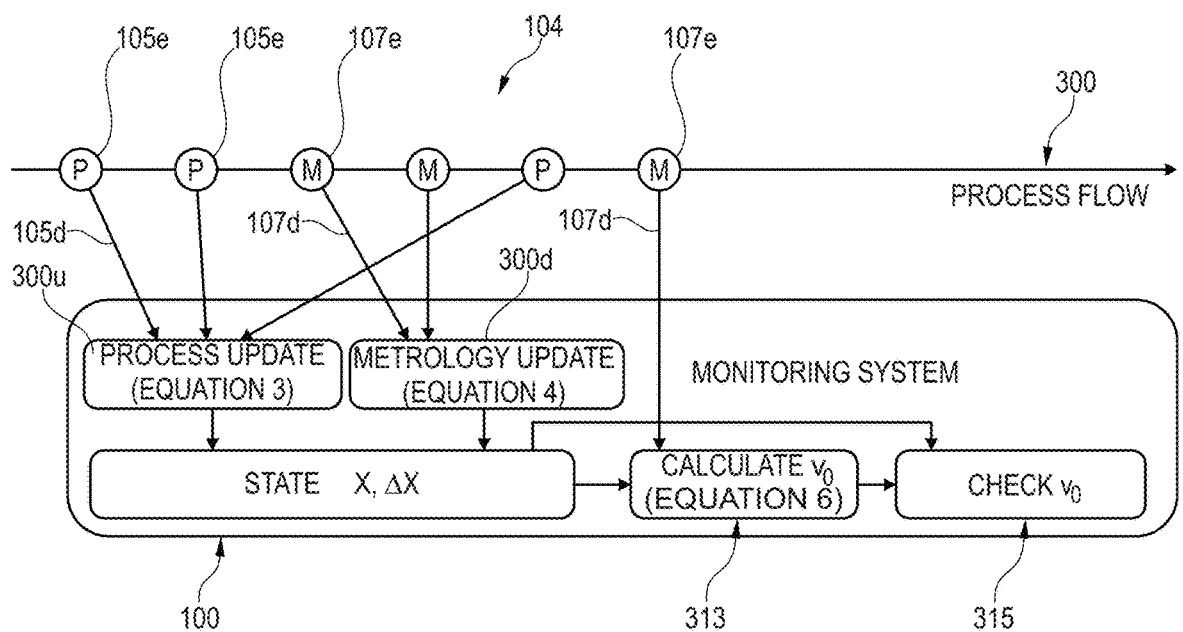
FIG. 3B shows a schematic operation diagram of a process control circuit, according to various embodiments.

According to various embodiments, the process control circuit 100 or the data merging circuit 108 may be used as a main component of a monitoring system (e.g. in semiconductor industry), as illustrated in FIG. 3B, in analogy to the embodiments described above.

In semiconductor manufacturing, many processes may be monitored. For instance, Statistical Process Control (SPC) or Fault Detection and Classification (FDC) may be used for monitoring. According to various embodiments, the data merging circuit 108 described herein may be also used as an improved monitoring system. According to various embodiments, a monitoring may include: selecting an appropriate process model (e.g. based on Equation (1)) and measurement model (e.g. based on Equation (2)) for the quantity, y, that needs to be monitored, and tuning the process model parameters by a statistical procedure using previous (e.g. historical) data of the quantity y (e.g. via maximum likelihood estimation as described in more detail below); implementing Equations (3) and (4) in the monitoring system (e.g. via a data merging circuit 108 described herein) for calculating a state estimate $\hat{x}_k$, $P_k$, and calculating (see reference sign 313) the normalized innovation, $v_0$, (e.g. based on Equation (6)) or any other state estimation error information. When new data $y_{k+1}$ arrive, the monitoring may include validating (see reference sign 315) the new data 107d and/or validating (see reference sign 315) the process model. For example, the monitored process may be validated, i.e. behaves normally in the case that $-Ly \leq v_0 \leq Ly$ with $1 \leq Ly \leq 5$, or $2 \leq Ly \leq 4$.

According to various embodiments, the process control circuit 100 or the data merging circuit 108 may be used in a monitoring system in general to monitor discrete processes that can be modelled for example with Equations (1) and (2) or similar equations.

According to various embodiments, the process control circuit 100 or the data merging circuit 108 may be used a part of a device (e.g. of a controller) that tunes and/or monitors concrete semiconductor processes, (e.g. chemical-mechanical planarization, lithography, etch, deposition, etc.). According to various embodiments, the process control circuit 100 or the data merging circuit 108 may be used a part of a device (e.g. of a controller) that tunes and/or monitors concrete processes in any other industry.

According to various embodiments, a Kalman filter including a corresponding error covariance matrix P may be utilized to validate the estimated state of a control and/or monitoring system. According to various embodiments, a Kalman filter including a corresponding error covariance matrix P may be utilized to validate measurement data acquired by a control and/or monitoring system.

As illustrated for example in FIG. 3A, the process control circuit 100 may include both functions, a control function and/or a monitoring function. According to various embodiments, the one or more functions of the process control circuit 100 or the data merging circuit 108 may be implemented as a software module, e.g. for use in a run-to-run control system to control for example manufacturing processes on a 24/7 basis.

The process control circuit 100 or the data merging circuit 108 as described herein allows to control and monitor semiconductor production processes much more precisely than based on conventional algorithms. An advantage may be the accurate validation of the respectively current state of the control/monitoring system even for very complex production scenarios (e.g. high-mixture, low-volume, significant time delay between process and measurement, metrology sampling, etc.).

Data may be scarce, erratic and precious in high-mixture, low-volume production. The process control circuit 100 or data merging circuit 108 described herein exploits the available data maximally, improves quality of run-to-run control, increases stability of production and/or avoids yield loss and scrap.

According to various embodiments, yield loss and/or scrap due to invalid state estimates may be prevented by utilizing the accuracy information. The control loop may be interrupted only if this is necessary, since any unnecessary interruption would generate additional production cost in form of send-ahead-wafers, an additional workload for the production personnel (e.g. in the case of a manual intervention) and/or a loss of time. Additionally, costs can also be saved.

According to various embodiments, one or more aspects of the process control circuit 100 or the data merging circuit 108 may be implemented in software, e.g. based on MATLAB® software or any other suitable software.

According to various embodiments, the recursive estimation and prediction algorithms may be adapted to production scenarios with delayed and permuted measurements. To improve the stability of semiconductor manufacturing processes or other manufacturing processes, external automatic control may be used in addition to the internal control of the manufacturing tool. This external control may be called run-to-run (R2R) control as described above. According to various embodiments, a run-to-run strategy may include at least two steps: first, estimate a suitable state of the controlled processes using process data of previous materials and, second, calculating tuning parameter(s) for the next material (lot, wafer, etc.) based on the estimation.

In general, the state estimation may be an important aspect of the control algorithm. It may be advantageous to use a Kalman filter based algorithm for the state estimation, as described herein. The Kalman filter may be refreshed (or, in other words, actualized) at least two times for one material. The first refresh (or the first actualization) may be performed (e.g. directly) after processing the material (i.e. the process update) and the second refresh (or the second actualization) may be performed upon the corresponding metrology data becomes available (i.e. downdate or metrology update). There is often a considerable time delay (e.g. several hours, or days) between processing and measuring and, therefore, one or more other manufacturing operations may be carried out between the update and downdate for one material (e.g. for one process event and a corresponding measurement event of a material). In the meantime, other materials may be processed and/or measured. Those other materials may outpace the materials processed earlier, i.e. the materials arrive in randomly permuted order at the metrology operation, see for example FIG. 3A. To utilize the new information as soon as possible, each update may be performed immediately. However, the Kalman filter is a recursive estimation algorithm, which may require that the materials are updated in a strict order, i.e. in the sequence PU(k), MU(k), PU(k+1), MU(k+1), PU(k+1), MU(k+1), etc. where PU(k) denotes the process update for material k (or an event k) and MU(k) denotes the metrology update for the material k (or the event k). The index k defined by the respective process event may be the counted variable for the process model, as described herein.

Figure 4A:
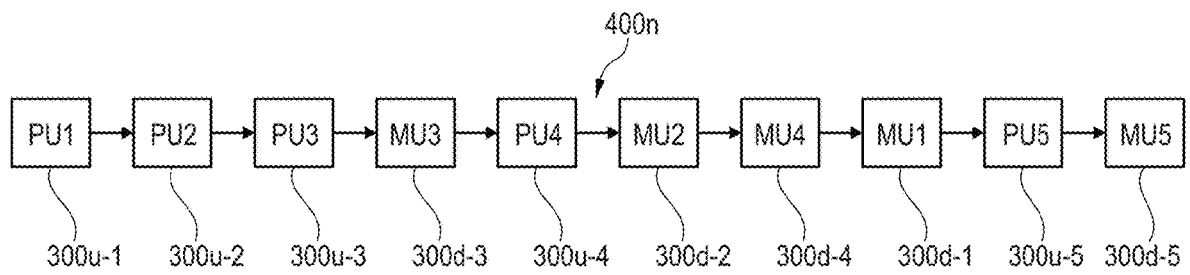
FIGS. 4A to 4E show various configurations of a data merging circuit in a schematic diagram, according to various embodiments.

FIG. 4A illustrates a schematic diagram of a natural update sequence due to a manufacturing process. In other words, the processing arrangement 104 may be operated resulting in the illustrated order for process updates PU and measurement updates MU for a first processed object (with index 1), a second processed object (with index 2), a third processed object (with index 3), a fourth processed object (with index 4), and a fifth processed object (with index 5), as an example. According to various embodiments, since the update and downdate of the data merging circuit 108 may be performed independently from each other, as described above, the illustrated natural order for process updates PU and measurement updates MU defined by the operation of the processing arrangement 104 may be used as the update sequence of the filter.

Figure 4B:
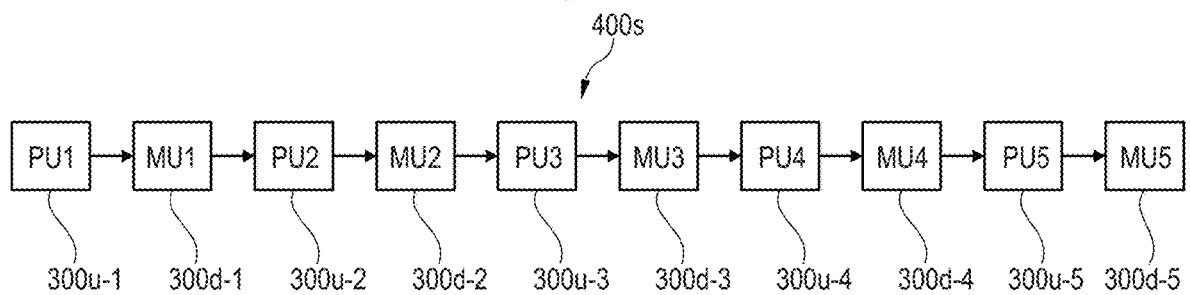

However, according to various embodiments, as illustrated in FIG. 4B in a schematic diagram, the natural update sequence due to the manufacturing process may be modified to a (sorted) update sequence that may be beneficial for a recursively operating filter, e.g. for a Kalman filter. Without transforming the natural sequence into the sorted one, the Kalman filter may not work optimally. Other recursive estimation algorithms (like for example the Wiener-Kolmogorow filter) may be used in a similar way.

As illustrated in FIGS. 4A and 4B, the index (e.g. index k) of a material may be defined by the process event, wherein the measurement event is correlated with the respective process event to provide process and measurement data for each of the processed materials.

According to various embodiments, a process control circuit may be provided similar to the process control circuit 100 described above based on a recursive estimation algorithms to estimate the state information. In this case, the process control circuit may include: a data acquisition circuit configured to acquire process data 105 and measurement data 107 of a processing arrangement, the process data 105 including a plurality of process event data 105$d$ in accordance with a plurality of process events and the measurement data including a plurality of measurement event data 107$d$ in accordance with a plurality of measurement events; a recursive process control circuit configured to recursively calculate a current state information 402$c$ based on process data 105 of a current process event and of a sequence 400$q$ of previous process events, and to recalculate the current state information 402C upon acquiring measurement event data 107$d$ corresponding to at least one previous process event of the sequence 400$q$ of previous process events, and a control circuit configured to control the processing arrangement based on the current state information 402$c$.

Figure 4C:
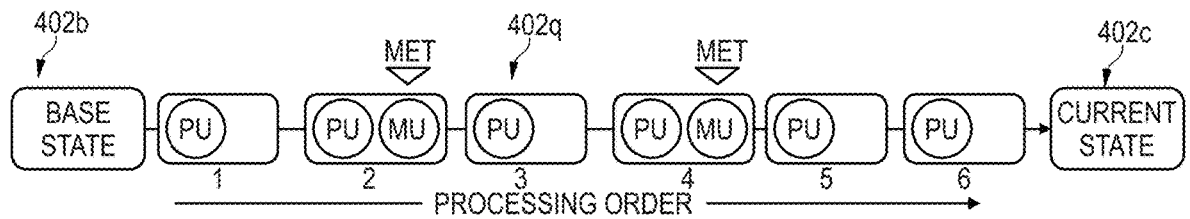

According to various embodiments, all materials with pending metrology data may be collected in a queue 400$q$, as for example illustrated in FIG. 4C in a schematic view. The queue 400$q$ may be sorted according to the processing time (e.g. defined by the index k, wherein k is a natural number) of the materials in ascending order, see FIG. 4B. However, one or more measurement event data may be missing, wherein the filter used for the data merging circuit 108 may be configured to cope with missing measurement event data, as described herein.

According to various embodiments, for the process update 300$u$, every time when a new material is processed, a new entry may be created in the queue 400$q$. The position of the element in the queue 400$q$ may be determined for example by the processing time (see FIG. 4C). According to various embodiments, for the metrology update 300$d$, every time when metrology data arrives for a material in the queue 400$q$, the corresponding queue element (1 to n, n is a natural number) may be flagged. According to various embodiments, a base state 402$b$ may be kept. The base state may be the state of the Kalman filter (or any other recursive filter or recursive state estimation algorithm) just before the first material (with index 1) in the queue 400$q$ is considered. After each process update 300$u$ or metrology update 300$d$, the Kalman filter iterations are executed for all materials (e.g. 1 to n, n is a natural number) in the queue. The iteration may be initialized with the base state 402$b$. Illustratively, the iteration moves along the queue 400$q$ (e.g. materials are updated according to their processing time; i.e. "old" materials are updated first). For each material a process update is performed. The metrology update is performed only if metrology data is available for the particular material. The result of the iteration is stored as a current state 402$c$. This may for example optionally to enable a quick access to the current state 402$c$ without the need to recalculate the queue 400$q$.

Figure 4D:
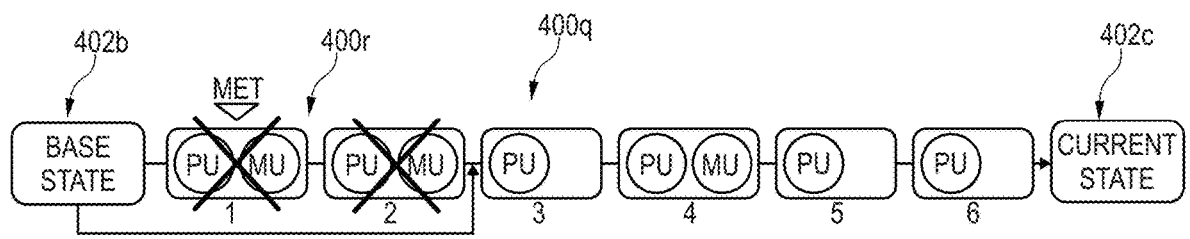

As illustrated in FIG. 4D in a schematic diagram, the materials may be removed 400$r$ from the queue 400$q$ when the metrology data is available and there is no older material with missing metrology data.

Figure 4E:
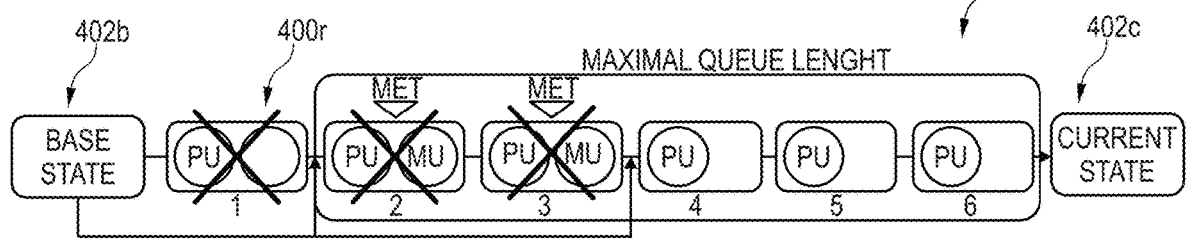

As illustrated in FIG. 4E in a schematic diagram, the length of the queue 400$q$ may be limited, according to various embodiments. This may be advantageous in some applications, because this averts excessive computational load, memory usage, and update duration. The aspect of collecting material with pending metrology data in a queue 400$q$ and update the state by iterating along the queue may be applied to any recursive algorithm of a controller.

According to various embodiments, a recursive estimation algorithm (e.g. Kalman filter) may be used to estimate state information for a run-to-run control system, as described herein. According to various embodiments, the state information may include the base state 402$b$ (e.g. state vector and an error covariance matrix), the queue 400$q$, and the current state 402$c$. Logistical context information (also referred to as process data 105) may be stored for each element of the queue 400$q$. This logistical context information may be mapped to incoming metrology data (also referred to as measurement data 107) to the corresponding queue element.

At every relevant production event (e.g. process, a measurement, a maintenance, etc.), data may be send to the R2R system. The R2R system may select the state that corresponds to the current production event and adds the new data to it. If the production step corresponds to a process update, a new element in the queue is generated and the entire queue is recalculated subsequently. If the production event corresponds to a metrology update, the metrology data is assigned to the corresponding element of the queue and the entire queue is recalculated subsequently. If material arrives at a controlled production event, a request may be send to the R2R system. The R2R system may use the state information to predict the outcome of the process and to calculate tuning parameters.

As illustrated in FIG. 4A, the data merging circuit 108 may be configured to update 300$u$ and downdate 300$d$ the state information for each of the acquired process event data and each of the acquired process measurement data in a chronological order defined by the process events, wherein the measurement events are mapped to the process events. In this case, for example, the data merging circuit 108 may be configured to update 300$u$ the state information for each of the plurality of process events upon acquiring the corresponding process event data, and for each of the plurality of measurement events upon acquiring the corresponding measurement event data.

Further, the data merging circuit 108 may be configured to collect a plurality of process event data of corresponding process events and to update the state information considering the collected plurality of process event data upon acquiring measurement event data of a subsequent measurement event, and downdating the state information based on the acquired measurement event data.

Alternatively, the order for updating 300$u$ and downdating 300$d$ the state information may be sorted, as illustrated in FIG. 4B, and/or processed in a queue 400$q$, as illustrated in FIGS. 4C to 4E. In this case, for example, the data acquisition circuit 102 may be further configured to correlate (e.g. to map) the measurement events with corresponding process events. According to various embodiments, for each material (e.g. for each workpiece processed with the processing arrangement 104) at least one (e.g. one or more) tuple based on a process event data and a measurement event data corresponding to the process event is provided, illustratively, the tuple may be assigned to a product, e.g. to a wafer. Further, the data merging circuit 108 may be configured to calculate current state information 402c based on process event data of a current process event and of a sequence of previous process events and/or measurement events. The sequence of previous process events and/or measurement events may be defined by the queue 400q. The data merging circuit 108 may be configured to calculate the current state information 402c based on process event data of a current process event and of a sequence of previous process events, and to recalculate the current state information 402c upon acquiring measurement event data corresponding to at least one previous process event of the sequence of previous process events. The sequence of previous process events may include a limited number of process events starting from an initial process event defining a base state information 402b and ending with the current process event defining the current state information 402c. In this case, the initial process event may be selected to be a first element in the sequence of previous process events for which no corresponding measurement event data are available and for which the corresponding measurement event data are to be considered. According to various embodiments, the length of the queue 400q may be reduced to a desired maximal number of elements.

According to various embodiments, a method is provided to cope with complex ambiguities in run-to-run Kalman filter models. As described above, the state estimation may be an important part of a control algorithm that may be used in a process control circuit. According to various embodiments, the control algorithm may be based on a Kalman filter, see for example Equations (1) to (6), as described above.

The state information of the process (see for example Equations (1) and (2)) may be estimated by two sets of Equations (e.g. equation sets (3) and (4)) executed completely independently from each other. After each process event or maintenance event, a process update 300u may be executed (see for example first set of Equations (3)). Further, metrology data may be added to the state by a metrology update 300d (see for example second set of Equations (4)).

The succession of the sets of Equations (3), (4) mirrors the accumulation and deterioration of the process information (decrease and increase and of estimation error) precisely as long as the process model parameters Q, R, B, D, C, A fit to the real life process. However, the practical application of the Kalman filter for run-to-run control may be adapted to consider one or more of the following aspects:

Very large number of states (50-1000);
New states need to be added and initialized automatically;
States evolve over long time periods (years);
Some state are (substantially) never updated;
Model ambiguity.

According to various embodiments, new state(s) can be added at run-time by augmenting the state information X and the error covariance matrix P. However, it may be at least helpful to initialize the new state properly. According to various embodiments, the filter used in the data merging circuit 108 may be configured to interpret the initial values as prior knowledge about the process, which in turn influences directly the result of the state estimation.

However, reliable prior knowledge may be often not available in practice. This may be especially the case for an automatic system operated 24/7. According to various embodiments, the filter used to control the processing arrangement 104 may be configured in such a way that the initial values contain no information. This may be achieved by initializing the diagonal elements of the error covariance matrix P that correspond to the new state by infinite large values. Unfortunately, the mathematical infinity cannot be handled by numerical algorithms. The desired behavior can be approximated by initializing the error covariance matrix P by a very large value instead of an infinite large value. However, this may lead to numerical problems (e.g. the larger the initial values the larger the problems). The root cause is that some (or all) elements of the error covariance matrix P consist simultaneously of small and very large components. Due to the limited numerical precision of digital computers, the large components may annihilate the small components, which may be nevertheless important for the accuracy. The initialization problem may be amplified by a model ambiguity. The model ambiguity may occur in run-to-run control systems or in similar systems, as described in more detail below.

Figure 5A:
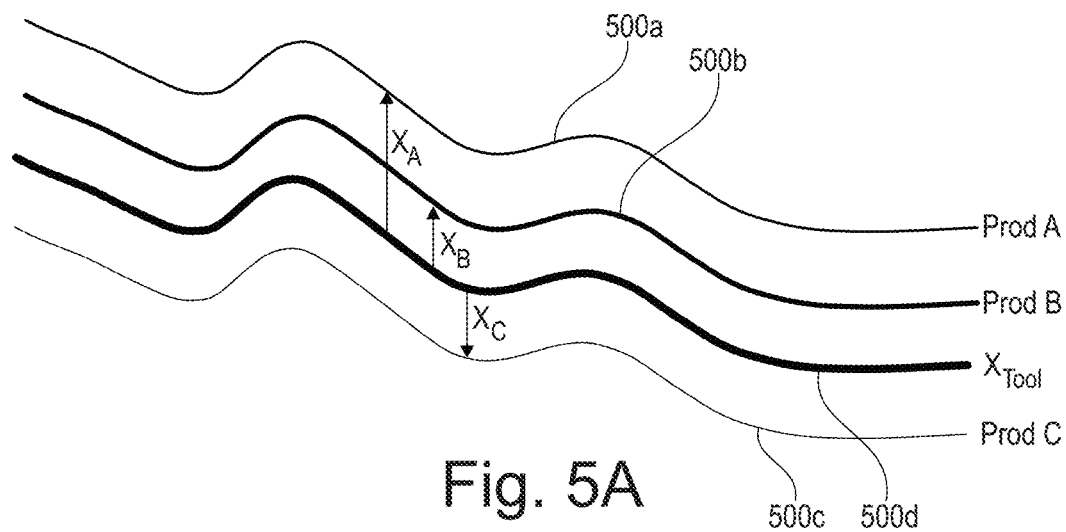
FIGS. 5A and 5B show an example of a model ambiguity in a schematic plot, according to various embodiments.

FIG. 5A shows an example to illustrate the model ambiguity schematically. Assuming that three products (A, B and C) have to be controlled, which are all processed by the same production tool. The observed quantity (e.g. a polish rate, a deposition rate, etc.) may show a synchronous movement over time as depicted by the lines 500a, 500b, 500c for each of the products A, B and C.

Figure 5B:
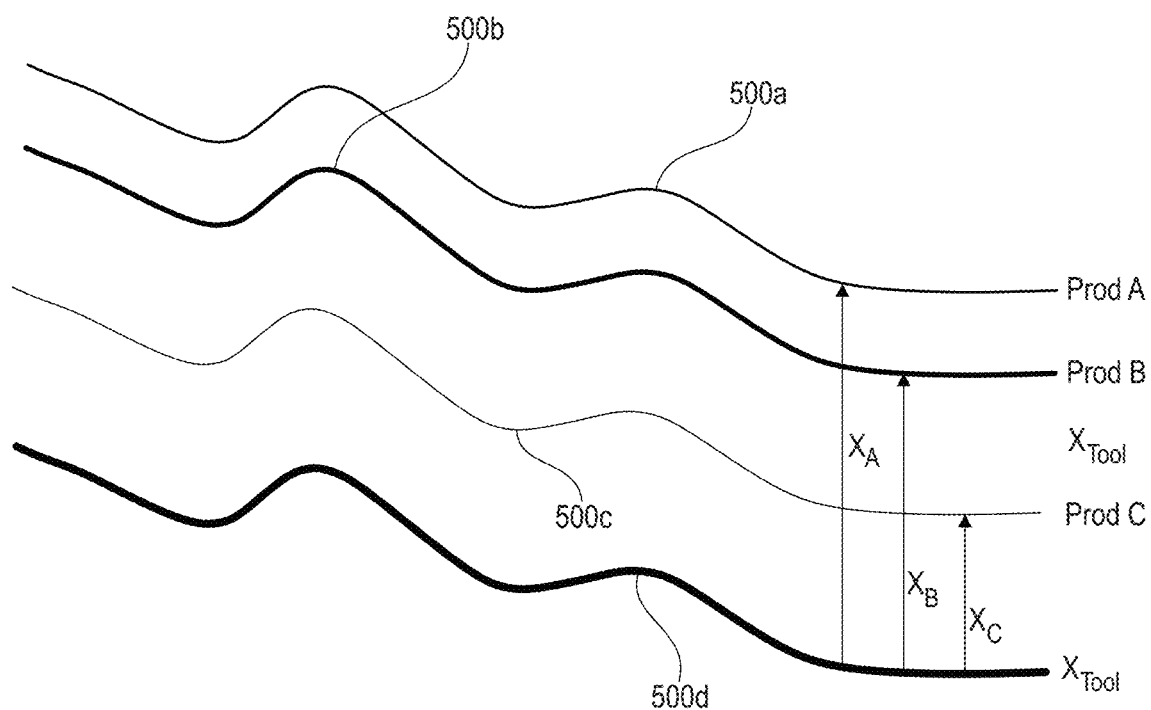

This behavior can be modelled by assuming a common tool state $X_{Tool}$ depicted by the line 500d to which product specific biases $X_A$, $X_B$, and $X_C$ are added. The individual states $X_{Tool}$, $X_A$, $X_B$, and $X_C$ are not uniquely defined by the data. As an example, the alternative state constellation illustrated in FIG. 5B is as likely as the first constellation illustrated in FIG. 5A.

There are in fact infinite state constellations, which cannot be distinguished by the data. There is an additional degree of freedom that is not resolved (determined) by the data and may result in estimation problems. The individual states $X_{Tool}$, $X_A$, $X_B$, and $X_C$ are undefined in contrast to the state combinations $X_{Tool}+X_A$, $X_{Tool}+X_B$, and $X_{Tool}+X_C$. Due to this, the variance of the estimation error of individual states $X_{Tool}$, $X_A$, $X_B$, and $X_C$ is infinite. This means that large components injected into the error covariance matrix P by a "large value"-initialization will never disappear and will therefore degrade the accuracy at each iteration step. According to various embodiments, these problems may be avoided as described in more detail below, which may be a major improvement for the application of Kalman based filtering to a run-to-run control system.

In general, there may be several strategies to overcome the problem outlined above, as for example:

Avoiding model ambiguity by defining an individual state for each context combination, i.e. define an own state for $X_{Tool}+X_A$, $X_{Tool}+X_B$, and $X_{Tool}+X_C$ respectively: This may be a simple solution, but a large number of states (e.g. number tools*number products*[ . . . ]) may be generated. Further, this requires non-zero off-diagonal elements in process noise matrix Q (storage and handling of $n^2$ elements). In case of e.g. new products, new states for all tool/product combinations have to be generated immediately; even if some of the combinations may be never used.

Eliminating model ambiguity by adding constraints to the states (as for example $X_A+X_B+X_C=0$): In this case, a reduced number of states is used (number tools+number products+[ ... ]) and the process noise matrix Q can be diagonal (n instead of $n^2$ elements). However, numerical problems may occur and constraints need to be refreshed regularly. Further, the constraints may be tricky to design especially for complex scenarios (e.g. for multi-level states, fine-tuning biases, gradients, polynomials). Further, in case of dedications (e.g. tool) some state combinations (e.g. tool/product) are undefined, wherein the constraint design must take this fact into account, constraints must be modified dynamically if tool dedication is abandoned, and additional logic is needed to convert states from dedicated states to non-dedicated states. Further, new states are undefined during initialization phase, wherein this fact is obscured by constraints and additional logic is needed to suppress and/or to control this phase.

Using "medium-sized" initial values: This may be a tricky approach. The initial value must be large enough for proper initialization of the filter and small enough keep numerical problems under control. The initial values need to be adjusted very carefully (e.g. "hand crafted") which may be difficult to use for a 24/7 production and diverse product portfolio. Further, no differentiation between not initialized and expired states is possible in this case. Further, numerical problems do not disappear completely. However, a reduced number of states (number tools+number products+[ ... ]) is used and the process noise matrix Q can be diagonal (n instead of $n^2$ elements). Further, complex scenarios (e.g. multi-level states, fine-tuning biases, gradients, polynomials, etc.) may be handled naturally, wherein state combinations are defined when $\sigma_{ERR}^2<$limit and new state levels can be added at run-time. Further, new states can be added and initialized at run-time and state combinations can be initialized as soon as $\sigma_{ERR}^2<$limit. Further, dedications (e.g. tool) can be handled naturally, wherein state combinations are defined if $\sigma_{ERR}^2<$limit and as soon as non-dedicated data is available dedicated states are automatically converted to non-dedicated states.

According to various embodiments, the error covariance matrix P may be dissected into a finite and infinite part, which leads to all advantages of the approach of the medium-sized initial values while avoiding the disadvantages. According to various embodiments, the error covariance matrix P may be dissected as follows or in a similar way:

$$P_k = P_{R,k} + \kappa \cdot P_{I,k} \quad \kappa \to \infty \quad (7)$$

According to various embodiments, inserting Equation (7) into Equation (3) may result in a new set of Equations (8) for the process update as follows:

$$\hat{x}_{k+1} = A_{k+1}\hat{x}_k + B_{k+1}$$

$$P_{R,k+1} = A_{k+1}P_{R,k}A_{k+1}^T + Q_{k+1}Q_{k+1}^T$$

$$P_{I,k+1} = A_{k+1}P_{I,k}A_{k+1}^T \quad (8)$$

According to various embodiments, process noise may be added to both the finite and the infinite part of $P_k$ in the set of Equations (8). This leads to modified equation of equation (8*) below. In this case, the following equations may be adapted accordingly.

$$\hat{x}_{k+1} = A_{k+1}\hat{x}_k + B_{k+1}$$

$$P_{R,k+1} = A_{k+1}P_{R,k}A_{k+1}^T + Q_{R,k+1}Q_{R,k+1}^T \quad (8*)$$

When the error covariance matrix P is dissected, e.g. according to Equation (7), the metrology update (e.g. according to Equation (4)) may decompose into two cases. According to various embodiments, based in the following equations:

$$F_{R,k+1} := C_{k+1}P_{R,k}C_{k+1}^T + R_{k+1}^T \quad (9)$$

$$F_{I,k+1} := C_{k+1}P_{I,k}C_{k+1}^T \quad (10)$$

case 1 and case 2 may be obtained as follows:

Case 1 may be defined by $|F_{I,k+1}|>0$ (in practice by $|F_{I,k+1}| \geq F_{NUM}$). In this case, the metrology update may be expressed by the following set of Equations (11):

$$\hat{x}_{k+1} = \hat{x}_k + K_{k+1}(y_{k+1} - C_{k+1}\hat{x}_k - D_{k+1}) \quad (11)$$

$$P_{R,k+1} =$$
$$P_{R,k} - \frac{P_{R,k}C_{k+1}^T C_{k+1}P_{I,k}}{F_{I,k+1}} - \frac{P_{I,k}C_{k+1}^T C_{k+1}P_{R,k}}{F_{I,k+1}} + \frac{P_{I,k}C_{k+1}^T C_{k+1}P_{I,k}}{F_{I,k+1}^2 / F_{R,k+1}}$$

$$P_{I,k} = P_{I,k} - \frac{P_{I,k}C_{k+1}^T C_{k+1}P_{I,k}}{F_{I,k+1}}$$

$$K_{k+1} = \frac{P_{I,k}C_{k+1}^T}{F_{I,k+1}}$$

Case 2 may be defined by $|F_{I,k+1}|=0$ (in practice by $|F_{I,k+1}| \leq L_{NUM}$). In this case, the metrology update may be expressed by the following set of Equations (12):

$$\hat{x}_{k+1} = \hat{x}_k + K_{k+1}(y_{k+1} - C_{k+1}\hat{x}_k - D_{k+1}) \quad (12)$$

$$P_{R,k+1} = P_{R,k} - \frac{P_{R,k}C_{k+1}^T C_{k+1}P_{R,k}}{F_{R,k+1}}$$

$$P_{I,k+1} = P_{I,k}$$

$$K_{k+1} = \frac{P_{R,k}C_{k+1}^T}{F_{R,k+1}}.$$

The numerical limit, $L_{NUM}$, can be set for example to a very small number, e.g. to a value of $10^{-10}$. The error variance $\sigma_{ERR}^2$ for the prediction of some linear state combination of interest $\hat{\alpha}_{k+1|k} = \bar{C}\hat{x}_k$ is given for example by:

$$\sigma_{ERR}^2 = \begin{cases} \bar{C}[P_{R,k} + Q_{k+1}Q_{k+1}^T]\bar{C}^T & \text{if } F_I \leq L_{NUM} \\ \infty & \text{if } F_I > L_{NUM} \end{cases}, \text{with} \quad (13)$$

$$F_I = \bar{C}P_{I,k}\bar{C}^T$$

The error variance $\sigma_{ERR}^2$ for the prediction of the next metrology value is given for example by:

$$\sigma_{ERR}^2 = \begin{cases} C_{k+1}P_{R,k}C_{k+1}^T + R_{k+1}^2 & \text{if } F_I \leq L_{NUM} \\ \infty & \text{if } F_I > L_{NUM} \end{cases}, \quad (14)$$

with $$F_I = C_{k+1}P_{I,k}C_{k+1}^T$$

This approach may realize one or more of the following aspects:
- An exact initialization with infinity "∞" is possible,
- The initial value can be chosen arbitrary since the result is independent of this choice,
- Computational complexity of the process update without state transition (i.e. with $A_{k+1}=I_n$) is of n,
- Computational complexity of metrology update is of $n^2$ (if properly implemented as described for example below),
- Not initialized and expired states can be distinguished from each other,
- No numerical problems due to "small" and "large" components in the error covariance matrix P occur,
- A reduced number of states is used (number tools+number products+[ . . . ]),
- Process noise matrix Q can be diagonal (n instead of $n^2$ elements),
- Complex scenarios (e.g. multi-level states, fine-tuning biases, gradients, polynomials) are handled naturally:
  - State combinations are defined if $\sigma_{ERR}^2 < \infty$
  - New state levels can be added at run-time new states can be added and initialized at run-time
  - State combinations are initialized as soon as $\sigma_{ERR}^2 < \infty$,
- Dedications (e.g. tool) are handled naturally:
  - State combinations are defined if $\sigma_{ERR}^2 \leq \infty$
  - As soon as non-dedicated data is available dedicated states are automatically converted to non-dedicated states.

However, a specification of a numerical limit $L_{NUM}$ may be tricky, in particular when the range of the observation vector elements $C_k(i)$ is large, which is described in more detail below.

According to various embodiments, a run-to-run Kalman filter initialization problem may be prevented as described above by decomposing the error covariance matrix P into a finite part $P_R$ and an infinite part $P_I$. Further, problems due to a model ambiguity can be prevented as described above by the error covariance matrix P into a finite part $P_R$ and an infinite part $P_I$.

According to various embodiments, the modification of the Kalman filter described above may be part of universal run-to-run/monitoring system used in semiconductor (or other) industries. In the case that a Kalman model is used and that the error covariance matrix is decomposed into a finite and an infinite part, the operation of the data merging circuit 108 may be improved. The iteration equations described above may lead to a characteristic sequence of the state estimate $\hat{x}_k$ and the error covariance matrix $P_{R,k}$, $P_{I,k}$ with k=0, 1, . . . ).

According to various embodiments, the data merging circuit 108 may be configured to determine the accuracy information based on an estimation error, wherein the estimation error may be dissected into a finite part and into an infinite part, similar to the dissection of the error covariance matrix P as described above. The estimation error may be determined via an error covariance matrix, e.g. based on the error covariance matrix P, or based on an inverted error covariance matrix $P^{-1}$. In this case, the error covariance matrix P or the inverted error covariance matrix $P^{-1}$ is dissected.

As a result, the data merging circuit 108 may be further configured to downdate the state information X based on a first set of downdate Equations (e.g. set of Equations (11)) in a first case and on a second set of downdate Equations (e.g. set of Equations (12)) in a second case. The first case and the second case are discriminated from each other via a discrimination criterion, e.g. based on Equation (10), wherein $|F_{I,k+1}| > L_{NUM}$ defines the first case and wherein $|F_{I,k+1}| > L_{NUM}$ defined the second case. However, there may be other values and similar definitions for discriminating the first case and the second case from each other.

According to various embodiments, the data merging circuit 108 may be configured to calculate estimated measurement data and a corresponding prediction error and to check whether the prediction error contains infinite parts.

According to various embodiments, the state information may be downdated for a measurement vector via a plurality of single scalar downdates, wherein for each of the single scalar downdate it is checked, whether the discrimination criterion is zero, e.g. based on a numeric reference value, $L_{NUM}$, as described above.

According to various embodiments, a fast and stable square downdate algorithm is provided for an Infinity-Filter. The state estimation may be provided by a control algorithm implemented into the data merging circuit 108 of the process control circuit 100. The control algorithm may be provided as described above or based on similar equations describing the same general approach. According to various embodiments, a Kalman filter or a Kalman based filter (i.e. a modification or extension of the standard Kalman filter) may be used to provide the state estimation advantageously. In the following, various aspects are described that are applicable to control any described process that can be modelled for example by Equations (1), (1*), (2), (2*) or in a similar way, as described above.

In more detail, the state information of a process modelled for example by Equations (1), (2) may be estimated by two sets of equations executed completely independently from each other, see for example the set of Equations (3), (4), as described above. After each process or maintenance step a process update is executed according to the first set of Equations (8) with Equations (8a) to (8c):

$$\hat{x}_{k+1} = A_{k+1}\hat{x}_k + B_{k+1} \tag{8a}$$

$$P_{R,k+1} = A_{k+1}P_{R,k}A_{k+1}^T + Q_{k+1}Q_{k+1}^T \tag{8b}$$

$$P_{I,k+1} = A_{k+1}P_{I,k}A_{k+1}^T. \tag{8c}$$

Further, metrology data may be added to the state information by the metrology update, e.g. also referred to as downdate, as described above with the definition of:

$$F_{R,k+1} := C_{k+1}P_{R,k}C_{k+1}^T + R_{k+1}^T \tag{9}$$

$$F_{I,k+1} := C_{k+1}P_{I,k}C_{k+1}^T \tag{10}$$

In case 1, defined for example by $|F_{I,k+1}| \geq 0$ or $|F_{I,k+1}| \geq F_{NUM}$ the metrology update may be carried out based on the following set of Equations (11) including Equations (11a) to (11d):

$$\hat{x}_{k+1} = \hat{x}_k + K_{k+1}(y_{k+1} - C_{k+1}\hat{x}_k - D_{k+1}) \tag{11a}$$

$$P_{R,k+1} = P_{R,k} - \frac{P_{R,k}C_{k+1}^T C_{k+1} P_{I,k}}{F_{I,k+1}} - \frac{P_{I,k}C_{k+1}^T C_{k+1} P_{R,k}}{F_{I,k+1}} + \frac{P_{I,k}C_{k+1}^T C_{k+1} P_{I,k}}{F_{I,k+1}^2 / F_{R,k+1}} \tag{11b}$$

$$P_{I,k} = P_{I,k} - \frac{P_{I,k}C_{k+1}^T C_{k+1} P_{I,k}}{F_{I,k+1}} \tag{11c}$$

$$K_{k+1} = \frac{P_{I,k}C_{k+1}^T}{F_{I,k+1}} \tag{11d}$$

In case 2, defined for example by $|F_{I,k+1}|=0$ or $|F_{I,k+1}| \leq L_{NUM}$, the metrology update may be carried out based on the following set of Equations (12) including Equations (12a) to (12d):

$$\hat{x}_{k+1} = \hat{x}_k + K_{k+1}(y_{k+1} - C_{k+1}\hat{x}_k - D_{k+1}) \quad (12a)$$

$$P_{R,k+1} = P_{R,k} - \frac{P_{R,k}C_{k+1}^T C_{k+1} P_{R,k}}{F_{R,k+1}} \quad (12b)$$

$$P_{I,k+1} = P_{I,k} \quad (12c)$$

$$K_{k+1} = \frac{P_{R,k}C_{k+1}^T}{F_{R,k+1}} \quad (12d)$$

When the metrology data consist of more than one measurement value the update with Equations (9)-(12d) may be performed for each value separately, as described above. The succession of Equations (8a)-(8c) and (9)-(12d) mirrors the accumulation and deterioration of the process information (e.g. the decrease and increase of estimation error) precisely as long as the process model parameters Q, R, B, D, C, A fit to the real life process.

According to various embodiments, the estimation algorithm (e.g. according to Equations (8a)-(12d)) may have advantages over a conventional Kalman filtering (in particular if applied to a run-to-run control). However, discriminating case 1 and case 2 in metrology update from each other may be an important aspect of the algorithm, as described in more detail below.

Figure 6A:
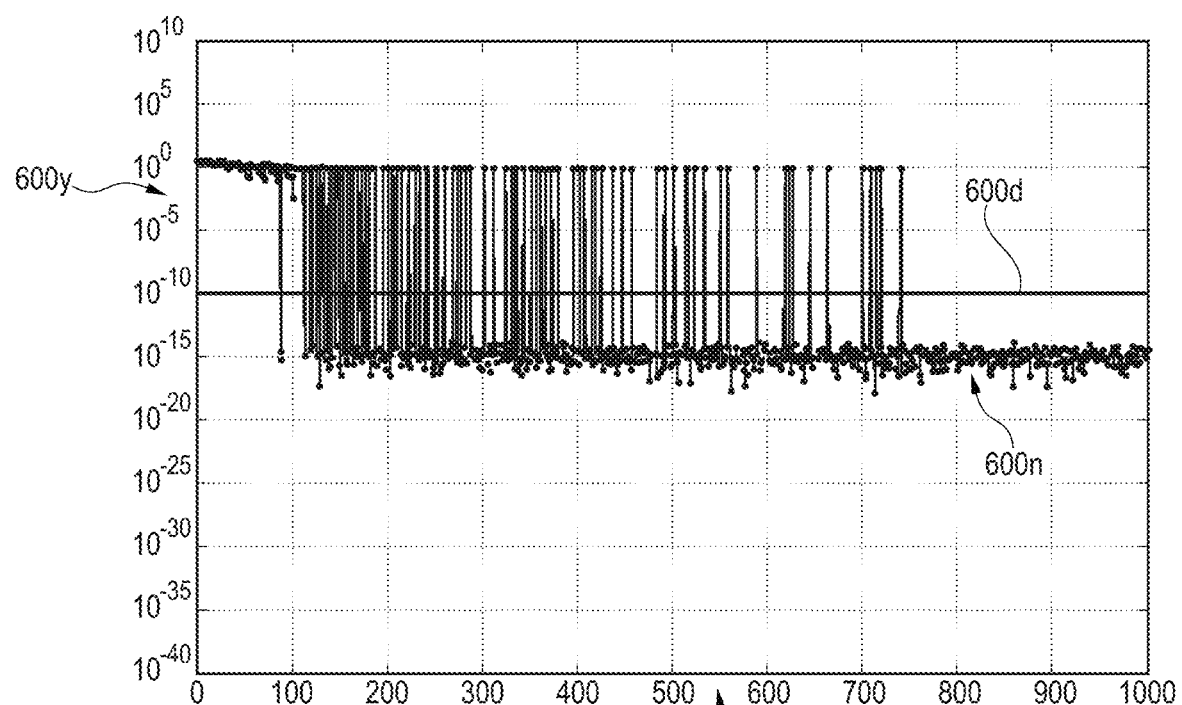
FIGS. 6A to 6I show various configurations of a data merging circuit, according to various embodiments.

As an example, FIG. 6A shows the discrimination parameter $F_I$ for a model with 230 states over 1000 iterations with the discrimination parameter plotted on the y-axis 600y and the iterations plotted on the x-axis 600x. The elements of the observation vector, C, are 1 and 0 only, see Equation (10). As illustrated in FIG. 6A, case 1, with $|F_I|\approx 1.0$ and case 2, with $(|F_I|\approx 10^{-15})$, are well separated from each other in this example and a discrimination threshold can be safely set to, for example, $L_{NUM}=10^{-10}$ (see discrimination line 600d), wherein the numerical basic noise floor 600n is about $10^{-16}$.

Figure 6B:
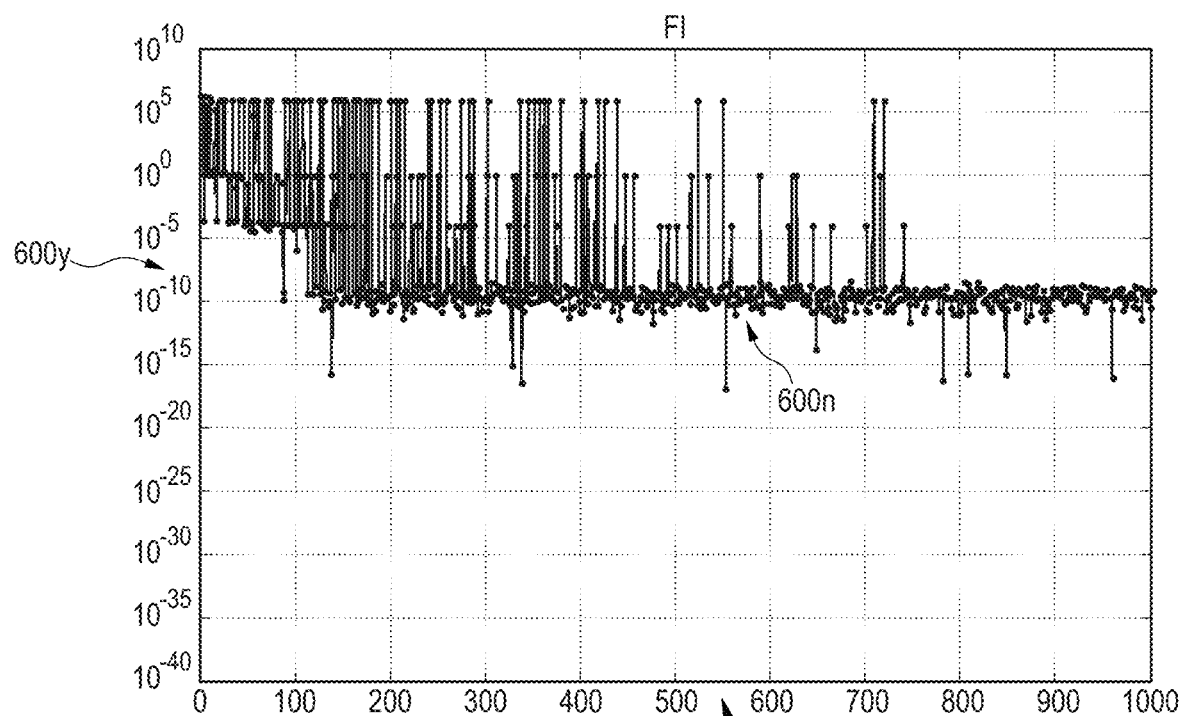

However, when the elements of the observation vector, C, are distributed over some broader range, e.g. (0.01, 1.0, 1000), the discrimination parameter $F_I$ is distributed more complex, as illustrated for example in FIG. 6B. The first case is now characterized by values of the discrimination parameter $F_I$ ranging for example from $10^6$ to $10^{-4}$. The second case corresponds to values of the discrimination parameter of about $10^{-10}$, e.g. with $|F_I|\approx 10^{-10}$ (e.g. defined by the numerical basic noise floor 600n of about $10^{-10}$ leaving not much room for a save discrimination between the two cases and therefore between the application of Equations (11a)-(11d) or Equations (12a)-(12d). The save discrimination limit $L_{NUM}=10^{-10}$ illustrated in FIG. 6A would be inadequate in this case, which in turn means that $L_{NUM}$ would have to be adjusted individually for each use case. According to various embodiments, an algorithm for the state estimation is provided in the following to avoid the need of individually adjusting the discrimination limit $L_{NUM}$. This algorithm (also referred to as square root algorithm) may be used in the process control circuit 100 or data merging circuit 108 of an automatic control system, e.g. operated on a 24/7 basis, as described above.

According to various embodiments, a square root algorithm based on the Equations (8a)-(12d) is provided, as described in more detail below. According to various embodiments, the covariance matrices $P_R$ and $P_I$ are replaced by the factorizations. The factorization may be defined for example as follows or in a similar way:

$$P_R = S_R^T S_R \quad (15)$$

$$P_I = S_I^T S_I \quad (16)$$

In this case, the square root matrices $S_R$, $S_I$ are propagated directly instead of the error covariance matrices $P_R$, $P_I$. In this case, the square root matrices $S_R$, $S_I$ are for example also referred to as Cholesky factors.

Although the following embodiment is described based on a specific example of factorization, see Equations (15), (16), other factorizations may be used in the same way, as for example:

$$P = U^T D U$$

In this case, U is for example a generalized Cholesky factor, and D is a diagonal matrix.

Further, the following factorizations may be used in a similar way:

$$P = SS^T \text{ or } P = UDU^T$$

According to various embodiments, the strategy of square rooting may be applied to Kalman filtering. The condition number of square roots $S_R$, $S_I$ (Cholesky factors) is better than the condition number of the original matrices $P_R$, $P_I$. The numerically challenging part may be the downdate (metrology update). For standard Kalman filters, the most accurate (and at the same time the most efficient) algorithms may be the Carlson algorithm and the Bierman algorithm. Both the Carlson algorithm and the Bierman algorithm are based on the same principles and are almost equivalent from a numerical point of view. According to various embodiments, the Carlson/Bierman algorithm is used in a modified, e.g. generalized, way for the downdate based for example on Equations (11a)-(12d). The implementation of the modified Carlson algorithm is shown exemplarily in more detail below.

According to various embodiments, square rooting the Equations (8a)-(12d) may face one or more of the following aspects:

| process update | (8b), (8c) | Kalman update<br>computational complexity ~ $n^3$ |
|---|---|---|
| metrology update | (12b)-(12d) | Kalman downdate<br>Carlson algorithm is applicable<br>Carlson algorithm doesn't work for singular matrices |
| metrology update | (11b) | coupled rank-1 downdate and rank-2 update<br>sequential execution of rank-1 downdates and updates leads to problems due to numerical mismatch |
| metrology update | (11c), (11d) | "total downdate" → reduces rank of $P_I$<br>Carlson algorithm is not designed for total downdate<br>$P_I$ is singular after first downdate<br>Carlson algorithm doesn't work for singular matrices |

According to various embodiments, the Carlson Algorithm may be used for downdate steps that can be written for example as:

$$\bar{S}^T\bar{S} = S^T\left(I - \frac{aa^T}{a^Ta + R^2}\right)S \qquad (17)$$

The matrices S and $\bar{S}$ are upper triangular matrices respectively. The algorithm cannot be applied when R=0 (e.g. in case of a "total downdate") or when the input matrix S is singular. However, both may be necessary for square rooting the downdate Equation (11c and 12b). Therefore, according to various embodiments, the Carlson algorithm is modified described in more detail below.

The generalized downdate based on the modified Carlson may be implemented for example with Algorithm (1), referred to as Generalized Carlson DownDate (GCDD), as follows:

---
ALGORITHM 1:
---

1. Input:   S - (n,n) upper triangular matrix
            a - (n,1) vector
            R - scalar
            tol - scalar
2. Initialization: b = (0 • • • 0 $a_n$)$^T$
3. if $R^2$ = 0
       if $a_n^2$ > tol
           $\alpha_n$ = $a_n^2$; $\bar{S}_{nn}$ = 0;
       else
           $\alpha_n$ = 0; $\bar{S}_{nn}$ = $S_{nn}$
       end
   else
       $\alpha_n$ = $R^2$ + $a_n^2$; $\bar{S}_{nn}$ = $S_{nn}\sqrt{R^2/\alpha_n}$
   end
4. for j = n − 1, . . ., 1
       if $a_j^2$ > tol
           if $\alpha_j$ = 0
               $b_k$ = $a_jS_{jk}$; $\alpha_j$ = $a_j^2$; $\bar{S}_{jk}$ = 0; k = j, . . ., n
           else
               $b_j$ = $S_{jj}a_j$; $\alpha_j$ = $\alpha_{j+1}$ + $a_j^2$; $\beta_j$ = $\sqrt{\alpha_{j+1}/\alpha_j}$
               $\bar{S}_{jj}$ = $S_{jj}\beta_j$; $\gamma_j$ = $a_j/(\alpha_j\beta_j)$
               $\bar{S}_{jk}$ = $S_{jk}\beta_j$ − $b_k\gamma_j$; $b_k$ = $b_k$ + $S_{jk}a_j$; k = j + 1, . . ., n
           end
       end
   end
5. if $\alpha_1$ > 0
       K = $b/\alpha_1$
   else
       K = (0 • • • 0)$^T$
   end

---

Figure 6C:
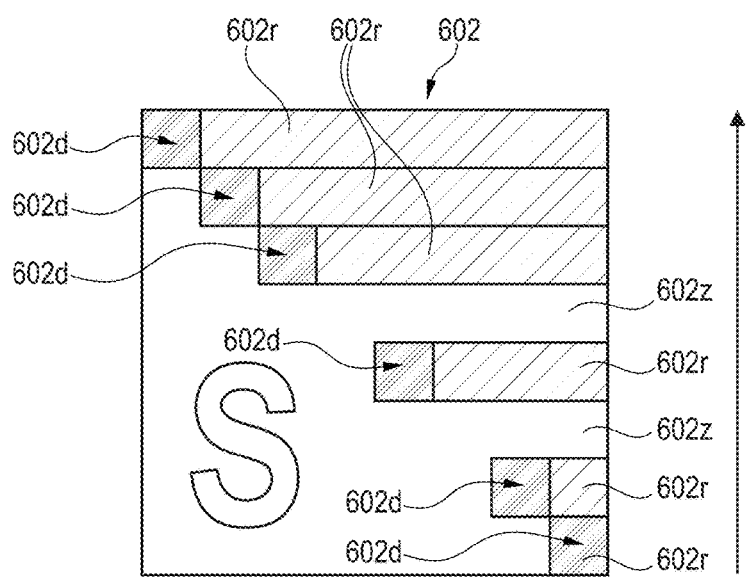

The generalized downdate based on the algorithm provided above, or implemented in a similar way, may have one or more of following properties:
Both singular matrices and total downdates (R=0) can be handled;
Each total downdate generates a new exact-zero row;
Rank deficit is encoded in matrix structure:
Increases numerical accuracy,
Exact-zero rows need not be stored,
$P_I$ typically has only a few non-zero rows, and therefore
The storage space for P=$P_R$+$P_I$ is reduced by about 50%;
All non-zero rows have non-zero diagonal elements;
Exact-zero rows are processes differently than non-zero rows; and
Exact-zero rows are preserved during further processing.
FIG. 6C illustrates the structure 602 of the matrix S, according to various embodiments. As illustrated, the rank deficit is a structurally encoded in the matrix S. As described above, each total downdate generates a new exact-zero row 602z, wherein the exact-zero rows 602z of the matrix S are preserved during further processing. All non-zero rows 602r of the matrix S have non-zero diagonal elements 602d.

Figure 6D:
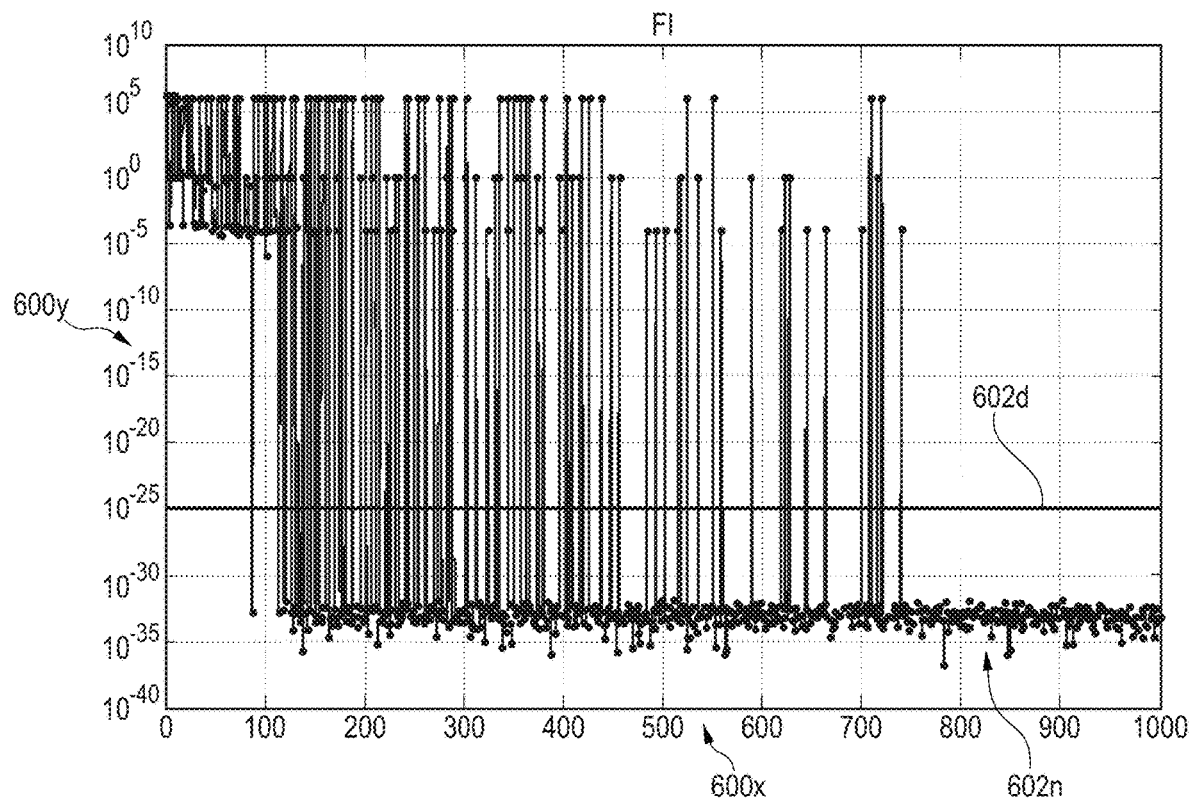

In comparison with the example provided with reference to FIG. 6B that includes the non-modified algorithm, the distribution of the values of the discrimination parameter $F_I$ generated by the modified algorithm is illustrated in FIG. 6D. As illustrated, case 1 is still characterized by values of the discrimination parameter $F_I$ ranging from $10^6$ to $10^{-4}$. However, the numerical basic noise floor 602n is decreased several orders of magnitude to about $10^{-1}$, which enables a save discrimination threshold above the numerical basic noise floor 602n, e.g. $L_{NUM}=10^{-25}$ (see discrimination line 602d).

Additionally, Algorithm (1) described above has the capability to add exact linear constraints to a Kalman based process model. Linear constraints can be expressed as one or more measurement Equations (e.g. similar to Equation (2)) with R=0 and therefore correspond to total downdates. Conventional filters may not be able to handle exact linear constraints and therefore require, for example, an approximation of exact constraint by measurement equations with "small" R that are greater than zero. Since in a conventional filter the exact constraint noise parameter R has to be emulated with a "small" number, such a conventional filter may lead to severe numerical problems.

According to various embodiments, Algorithm (1) described above can be extended to arbitrary downdates based for example on the following equation:

$$\bar{S}^T\bar{S}=S^TS-vv^T. \qquad (18)$$

In order to transform Equation (18) into Equation (17), the matrix S may be factored out of v by solving the following equation for a:

$$v=S^Ta \qquad (19)$$

This is possible in the case that the vector v belongs to the image of the matrix $S^T$. This condition is fulfilled for example when S and $\bar{S}$ are positive semidefinite. Inserting Equation (19) into Equation (18) results for example in a downdate Equation (20) as follows:

$$\bar{S}^T\bar{S} = S^TS - vv^T = S^T(I - aa^T)S = S^T\left(I - \frac{aa^T}{\underbrace{1 - a^Ta + a^Ta}_{=: R^2}}\right)S$$

This gives rise to the following algorithm for a modified Carlson downdate, according to various embodiments, as follows:

Algorithm 2

1. Input: S—(n,n) upper triangular matrix
   v—(n,1) vector
   tol—scalar
2. Solve: v=$S^T$a for a; for instance a=$(S^T)^+$v
3. Calculate R=$\sqrt{1-a^Ta}$
4. Calculate result matrix $\bar{S}$ with Algorithm (1):
   $\bar{S}$=GCDD (S, a, R, tol)

According to various embodiments, two independent highly stable algorithms are used for square rooting for example the Equations (11b) to (11d), see Algorithm (3) and Algorithm (5) below. For sake of brevity, the Equation (11b) can be for example rewritten as follows:

$$\overline{P}_R = P_R - \frac{P_R C^T CP_I}{F_I} - \frac{P_I C^T CP_R}{F_I} + \frac{P_I C^T CP_I}{F_I^2} F_R, \text{ with} \quad (21)$$

and with $$\overline{P}_R := P_{R,k+1}; \quad P_R := P_{R,k}; \quad P_I := P_{I,k}$$

$$F_R := F_{R,k+1}; \quad F_I := F_{I,k+1}; \quad C_{k+1} := C \quad (22)$$

The basic idea of Algorithm (3) is to rearrange Equation (21) for example as follows:

$$\overline{P}_R = \left(I - \frac{C^T CP_I}{F_I}\right)^T \frac{P_R}{S_R^T S_R}\left(I - \frac{C^T CP_I}{F_I}\right) + \frac{P_I C^T CP_I}{F_I^2} R^2 \quad (23)$$

$$\overline{S}_R^T \overline{S}_R = \left[\left(I - \frac{C^T CP_I}{F_I}\right)^T S_R^T \frac{P_I C^T R}{F_I}\right] \cdot \begin{bmatrix} S_R\left(I - \frac{C^T CP_I}{F_I}\right) \\ \frac{CP_I R}{F_I} \end{bmatrix} = M^T M \quad (24)$$

According to various embodiments, Matrix M can be factored using a QR decomposition as follows:

$$M = T\begin{bmatrix} M_1 \\ 0 \end{bmatrix}; \quad T^T T = I \quad (25)$$

Inserting Equation (25) into Equation (24) shows that result matrix $\overline{S}_R$ is given by the upper triangular matrix $M_1$ as follows:

$$\overline{S}_R^T \overline{S}_R = [M_1^T \ 0] \underline{T^T T} \begin{bmatrix} M_1 \\ 0 \end{bmatrix} = M_1^T M_1 + 0 \quad (26)$$

According to various embodiments, Equations (11b) to (11d) may be square rooted for example based on Algorithm (3) as follows:

Algorithm 3

1. Input: $S_{R,k}$—(n,n) upper triangular matrix
   $S_{I,k}$—(n,n) upper triangular matrix
   $C_{k+1}$—(1,n) observation vector
   R—scalar
2. Calculate: $m_R := S_{R,k} C_{k+1}^T$; $m_I := S_{I,k} C_{k+1}^T$; $u_I := S_{I,k}^T m_I$; $F_I := m_I^T m_I$
3. Build matrix $$M := \begin{bmatrix} S_{R,k} - (m_R u_I^T)/F_I \\ u_I^T (R/F_I) \end{bmatrix}$$

4. Use orthogonal row transformations (e.g. givens rotations) to eliminate last the row of M and to restore the upper triangular form of the other rows. Make sure that all exact-zero rows are preserved and all non-zero rows have a non-zero diagonal element $$\overline{M} = \begin{bmatrix} S_{R,k+1} \\ 0 \end{bmatrix} = TM$$

5. Result matrix $S_{R,k+1}$ is given by the rows 1, 2, ..., n of $\overline{M}$
6. Calculate result matrix $S_{I,k+1}$ and $K_{k+1}$ with Algorithm (1):
   $[S_{I,k+1}, K_{k+1}]$=GCDD(S=$S_{I,k}$, a=$m_I$, R=0, tol=0)

Due to the orthogonal row transformation in point 4 of Algorithm (3), the computational complexity of Algorithm (3) is proportional to $n^3$. This may be no issue because Equations (11a) to (11d) may be generally executed very rarely (e.g. max. n times).

According to various embodiments, the Equations (11b) to (11d) may be square rooted for example based on Algorithm (5) as follows. Algorithm (5) separates Equation (11b) into three sequential rank-1 updates and into one rank-1 downdate. This may be based on the following Equation (27):

$$C\overline{P}_R C^T = C\left[P_R - \frac{P_R C^T CP_I}{F_I} - \frac{P_I C^T CP_R}{F_I} + \frac{P_I C^T CP_I}{F_I^2} \frac{FR}{F_{R0}+R^2}\right]C^T \quad (27)$$

$$= C\underbrace{\left[P_R - \frac{P_R C^T CP_I}{F_I} - \frac{P_I C^T CP_R}{F_I} + \frac{P_I C^T CP_I}{F_I^2} F_{R0}\right]C^T}_{=0} +$$

$$\underbrace{C\left[\frac{P_I C^T CP_I}{F_I^2} R^2\right]C^T}_{=R^2}$$

$$= R^2$$

with $F_{R0} = CP_R C^T$

The left hand side of Equation (21) can be calculated by the sequence listed below. Equation (27) shows that step 3 in this sequence is a total downdate:

1. Rank-1 update with vector $$[P_I C^T]\frac{\sqrt{F_{R0}}}{F_I}$$

2. Rank-1 update with the "positive" eigenvector of $$\frac{P_R C^T CP_I}{F_I} + \frac{P_I C^T CP_R}{F_I}$$

3. Rank-1 downdate with the "negative" eigenvector of $$\frac{P_R C^T CP_I}{F_I} + \frac{P_I C^T CP_R}{F_I}$$

4. Rank-1 update with vector $$[P_I C^T]\frac{R}{F_I}$$

According to various embodiments, the total downdate in step 3 may be expressed in terms of the result matrix generated by step 1 and step 2 of the sequence. This may ensure for example numeral stability.

For steps 1, 2 and 4 of the sequence, a rank-1 update algorithm can be used. This rank-1 update algorithm may be slightly modified to preserve exact zero rows in $S_R$, as shown for example in Algorithm (4). Further, Algorithm (1) may be used for step 3 of the sequence.

According to various embodiments, the rank-1 update, $\bar{S}^T \bar{S} = S^T S + aa^T$, referred to as R1UD, may be carried out as follows:

Algorithm 4

1. Input: S—(n,n) upper triangular matrix
   a—(n,1) vector
2. Build matrix $$M := \begin{bmatrix} S \\ a^T \end{bmatrix}$$

3. Use orthogonal row transformations (e.g. Givens rotations) to eliminate the last row of M. Make sure that all exact-zero rows are preserved and all non-zero rows have a non-zero diagonal element.

$$\bar{M} = \begin{bmatrix} \bar{S} \\ 0 \end{bmatrix} = TM$$

4. Result matrix $\bar{S}$ is given by the rows 1, 2, ..., n of $\bar{M}$

According to various embodiments, Algorithm (5) shown below may use solely rank-1 updates and rank-1 downdates. The computational complexity in this case is proportional to $n^2$.

Algorithm 5

1. Input: $S_{R,k}$—(n,n) upper triangular matrix
   $S_{I,k}$—(n,n) upper triangular matrix
   $C_{k+1}$—(1,n) observation vector
   R—scalar
2. Calculate: $m_R := S_{R,k} C_{k+1}^T$; $m_I := S_{I,k} C_{k+1}^T$; $F_{R0} := m_R^T m_R$; $F_I := m_I^T m_I$
3.

$$m_{20} := \left(\frac{m_I}{|m_I|} - \frac{m_R}{|m_R|}\right) \sqrt{\frac{|m_I| \cdot |m_R|}{2}}$$

4. Calculate helper matrix $S_1$ with Algorithm (4):

$$S_1 = R1UD\left(S = S_{R,k}, a = m_I \frac{\sqrt{F_{R0}}}{F_I}\right)$$

5. Calculate helper matrix $S_2$ with Algorithm (4):

$$S_2 = R1UD\left(S = S_1, a = m_{20} \frac{1}{\sqrt{F_I}}\right)$$

6. Calculate helper matrix $S_3$ with Algorithm (1):
   $S_3 = GCDD(S=S_2, a=S_2 C_{k+1}, R=0)$
7. Calculate result matrix $S_{R,k+1}$ with Algorithm (4):

$$S_{R,k+1} = R1UD\left(S = S_3, a = m_I \frac{R}{F_I}\right)$$

8. Calculate result matrix $S_{I,k+1}$ and $K_{k+1}$ with Algorithm (1):
   $[S_{I,k+1}, K_{k+1}] = GCDD(S=S_{I,k}, a=m_I, R=0, tol=0)$ Equations (12b)-(12d) correspond to a Kalman filter based downdate, wherein the matrix PR can be singular. Therefore, according to various embodiments, Algorithm (1) can be applied. According to various embodiments, Equations (12b) to (12d) may be square rooted for example based on Algorithm (6) as follows:

Algorithm 6

1. Input: $S_{R,k}$—(n,n) upper triangular matrix
   $S_{I,k}$—(n,n) upper triangular matrix
   $C_{k+1}$—(1,n) observation vector
   R—scalar
2. Calculate: $m_R := S_{R,k} C_{k+1}^T$
3. Calculate result matrix $S_{R,k+1}$ and $K_{k+1}$ with Algorithm (1):
   $[S_{R,k+1}, K_{k+1}] = GCDD(S=S_{R,k}, a=m_R, R, tol=0)$
4. $S_{I,k+1} = S_{I,k}$ According to various embodiments, a fast and stable square root downdate algorithm is provided for a Kalman based filter or a similar operating filter, as described above. The fast and stable square root downdate algorithm may include one or more of the following aspects:

The numerical accuracy is dramatically improved (~32 digits for double precision/condition number of $P_R$, $P_I$ is reduced to its square root)

The algorithm can handle many states,

The overall computational complexity is proportional to $n^2$, (except Algorithm (3), which is used maximally n times), The storage requirements are comparable to non-modified Kalman filter, The triangular $S_I$ matrix reveals the structure of ambiguity, (number of non-zeros rows in $S_I$=number of degrees of freedom), Exact initialization of error covariance matrix P with ∞ is possible, The algorithm copes naturally with model ambiguity and equipment dedications.

According to various embodiments, the fast and stable square root downdate algorithm described above may be used in a component of a run-to run system (e.g. in semiconductor manufacturing), as already described. According to various embodiments, when the production event deteriorates the state estimate (e.g. due to a processing event, a maintenance event, etc.) data is added by Equations (8a) to (8c), which is also referred to as process update. When the production event generated data (e.g. in case of a metrology event) that improve the state estimate, the data is added by Equation (11a) to (12d), which is also referred to as metrology update.

According to various embodiments, the accuracy information, e.g. represented by the error standard deviation given by Equation (5), may be used as described above.

Incoming measurement data $y_{k+1}$ may be validated by calculating the ratio normalized innovation, for example, according to:

$$v_0 = \frac{y_{k+1} - C_{k+1}\hat{x}_k - D_{k+1}}{\sigma_{ERR}} \quad (28)$$

In this case, $\sigma_{ERR}$ is the standard deviation for the measurement data prediction. Further, valid measurements may be characterized for example by $-L_y \leq v_0 \leq L_y$ with $2 \leq L_y \leq 4$. According to various embodiments, v0 is a universal measure that is independent of the use case and the transient behavior (settling) of estimation algorithm. If $v_0$ exceeds $L_y$, several reactions are possible, as described above.

According to various embodiments, the data merging circuit 108 or the process control circuit 100 may include the fast and stable square root downdate algorithm described above. Therefore, the data merging circuit 108 may have an important function in a control system to control for example discrete processes in semiconductor industry and in other industries.

According to various embodiments, the data merging circuit 108 or the process control circuit 100 may include the fast and stable square root downdate algorithm described above implemented as a component of a monitoring system (e.g. semiconductor industry and in other industries). In semiconductor manufacturing, many processes need to be monitored. The monitoring may include for example: selecting an appropriate process model (e.g. based on Equation (1)) and an appropriate measurement model (e.g. based on Equation (2)) for the quantity, y, that needs to be monitored, and tuning the process model parameters by a statistical procedure using previous data (e.g. historical data) of the quantity y (e.g. via maximum likelihood estimation as described in more detail below); implementing Equations (8a) to (8c) in the monitoring system (e.g. via a data merging circuit 108 described herein), calculating a state estimate $\hat{x}_k$, $P_{R,k}$, $P_{I,k}$, and calculating the normalized innovation, $v_0$, (e.g. using equation 28) or any other state estimation error information, and when new data $y_k$+, arrive, validating 315 the new data 107d and/or validating 315 the process model. For example, the monitored process may be validated, i.e. behaves normally, in the case that $-Ly \leq v_0 \leq Ly$ with $1 \leq Ly \leq 5$, or $2 \leq Ly \leq 4$.

As described above, e.g. with reference to FIGS. 6A to 6D, a fast and numerically stable square root algorithm is provided for downdating the state information based on the Equations (11b)-(11d) and (12b)-(12d). The algorithm described above is based on a Kalman model, wherein the error covariance matrix is decomposed into a finite and into an infinite part, which are decomposed into triangular square roots with exact zero rows. The iteration Equations (11b)-(11d) and (12b)-(12d) lead to a characteristic sequence of state estimates $\hat{x}_k$ and covariance factors $S_{R,k}$, $S_{I,k}$ with k=0, 1, . . . .

As described above with reference to FIGS. 6A to 6D, the data merging circuit 108 may be configured to provide a discrimination parameter (e.g. $F_I$) based on the state extraction matrix C and the error covariance matrix P. The discrimination parameter may be compared with a discrimination limit, e.g. $L_{NUM}$.

As mentioned above, the Bierman algorithm is closely related to the Carlson algorithm and may have the same superior numerical properties. It uses an generalized Cholesky factorization according to:

$$P = U^T D U. \quad (29)$$

According to various embodiments, algorithms 1, 2, 3, 4, 5, 6 may be also reformulated in terms of Equation (29). Instead of the factorization (15) or (16), the following factorizations may be used to reformulate algorithms 1, 2, 3, 4, 5, 6 described above accordingly:

$$P = S \cdot S^T \quad \text{(Carlson algorithm)}$$

$$P = U \cdot D \cdot U^T \quad \text{(Bierman algorithm)}$$

As an alternative to Algorithm (1), the so-called Potter downdate algorithm can be used, according to various embodiments. As the Carlson algorithm, the Potter algorithm may be used for downdates in the form of Equation (17). An Algorithm (7) for the Potter downdate is exemplarily shown below:

Algorithm 7

1. Input: S—(n,n) upper triangular matrix
   a—(n,1) vector
   R—scalar
2. Calculate: $F := a^T a + R^2$; $\gamma := 1 + \sqrt{R^2/F}$
3. Calculate result matrix:

$$\overline{S} = S - \frac{S a a^T}{\gamma \cdot F}$$

Figure 6E:
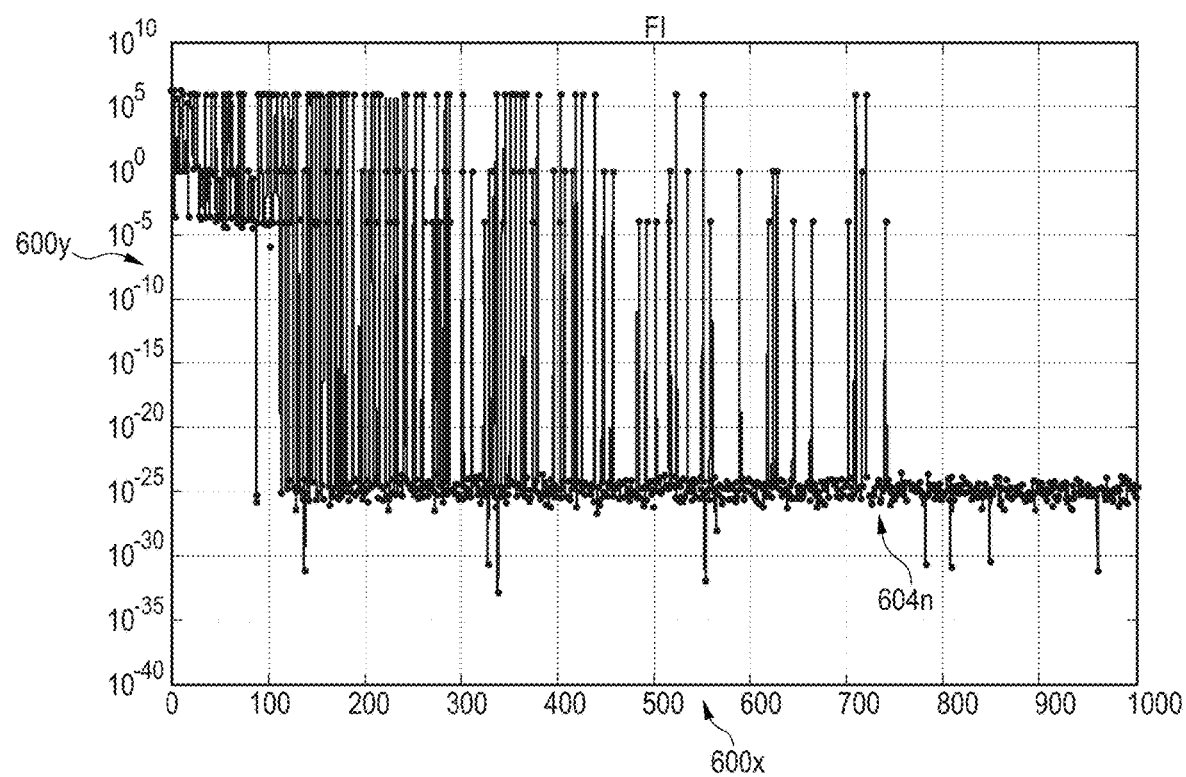

Algorithm (7) may be less precise than the Carlson algorithm. This can be seen for example in FIG. 6E illustrating the values of the discrimination parameter $F_I$ for the example of FIG. 6B and FIG. 6D but calculated with Algorithm (7). The downdate calculated with Algorithm (7) generates for example a numerical noise floor 604n of about $10^{-25}$, which is notably higher than the numerical noise floor 602n of about $10^{-33}$ produced by the generalized Carlson downdate described with reference to FIG. 6D. Further, the storage space required for the covariance matrices is about four times higher for matrices generated by the Potter downdate, e.g. according to Algorithm (7), compared to the generalized Carlson downdate described above. This is because the Potter downdate produces full matrices (rather than triangular ones, where half of the matrix elements need to be stored only) and does not generate exact zero rows (which need not be stored).

According to various embodiments, an information filter may be used to implement the functions of the data merging circuit 108. The information filter is a modification of the Kalman filter. In this modification, the error covariance matrix $P_k$ is replaced by the inverse $I_k := P_k^{-1}$. Instead of the state vector $\hat{x}_k$, the vector $\hat{z}_k := I_k^{-1} \hat{x}_k$ is propagated together with $I_k$. In case of no prior knowledge the elements of $I_k$ can be initialized with $1/\infty = 0$. This corresponds to initializing the element of $P_k$ with $\infty$. This means that the information filter may handle infinity-initialization and model ambiguity naturally.

In this approach, whenever a real state estimate $\hat{x}_k$ (or the estimate of linear state combinations $\hat{\alpha}_k = \overline{C} \hat{x}_k$) and/or its corresponding estimation error standard deviation $\sigma_{ERR}$ is required, the inverse $I_k^{-1}$ needs to be calculated. Calculating the inverse is of a computational complexity proportional to $n^3$. This may be possible to implement but, however, non-optimal for a run-to-run control, where often some hundreds states are used and $\hat{x}_k$ and $\sigma_{ERR}$ need to be calculated frequently. Further, the information filter may be also modified by square rooting the respective Equations.

Due to model ambiguity, the error covariance matrix $P_k$ may be singular, which means that a straightforward inversion may be not possible. This corresponds to fact that the individual states are not determined by the data in contrast to some state combinations $\hat{\alpha}_k = \overline{C}\hat{x}_k$. In addition, the inversion algorithm should exploit a square root structure to preserve the superior numerical properties. This can be carried out for example by the following Algorithm (8):

Algorithm 8

1. Input: Z—(n,n) triangular matrix; square root of information matrix, i.e. $P^{-1}=Z^TZ$
   $\hat{z}$—(n,1) converted state vector
   $\overline{C}$—(1,n) state extractor vector
2. Calculate orthonormal column compressor $T^T$
   (using e.g. singular value decomposition)
   $ZT^T = Z[T_1^T\ T_2^T] = [Z_1\ 0]$
   where the (n,r) matrix $Z_1$ is column regular and r is the rank of Z
3. Calculate $\overline{C}T^T = C[T_1^T\ T_2^T] =: [C_1\ C_2]$
4. Estimation error of linear state combination $\hat{\alpha}_k = \overline{C}\hat{x}_k$ is finite only if $C_2=0$. Do not use the state estimate if this condition is violated.
5. The estimate of the state combination $\hat{\alpha} = \overline{C}\hat{x}$ and its finite error variance is given by:
   $\hat{\alpha} = C_1(Z_1^T Z_1)^{-1}\hat{z}$; $\sigma_{ERR}^2 = C_1(Z_1^T Z_1)^{-1}C_1^T$
   To ensure numerical robustness use QR decomposition $Z_1=WU$ und back substitution of the triangular system $U^TU$ to calculate the inverse $$(Z_1^T Z_1)^{-1} = \left(U^T \underbrace{W^T W}_{I} U\right)^{-1} = (U^T U)^{-1}$$

According to various embodiments, the error covariance matrix P may be decomposed into:

$$P_k = L_k(D_{R,k} + \kappa \cdot D_{I,k})L_k^T;\ \kappa \to \infty \qquad (29)$$

During iteration, the triangular matrix $L_k$ and the diagonal matrices $D_{R,k}$ and $D_{I,k}$ are updated. In this alternative algorithm, the process update and the metrology update cannot be separated from each other. Further, this alternative algorithm has a computational complexity of $n^3$ and, further, this alternative algorithm is numerically unstable.

In the following, an algorithm that provides a robust discrimination between the finite and the infinite prediction error variance is provided for a Kalman based filter or any other similar filter based for example on Equations (8a) to (12d), as described above. Equation (10), as described above, may be a central decision point of the algorithm (see Equations (11a) to (12d)), since the first case and the second case have to be discriminated (e.g. distinguished) from each other, as for example based on a discrimination condition, as for example:

$|F_{I,k+1}| > 0$

Due to a limited numerical precision of any digital computer, the calculated value of $F_I$ will usually differ from the ideal value. Therefore, a modified discrimination condition may be used, as for example:

$|F_{I,k+1}| > \varepsilon$

In this case, the threshold $\varepsilon$ (also referred to as discrimination limit) needs to be chosen appropriately.

Figure 6F:
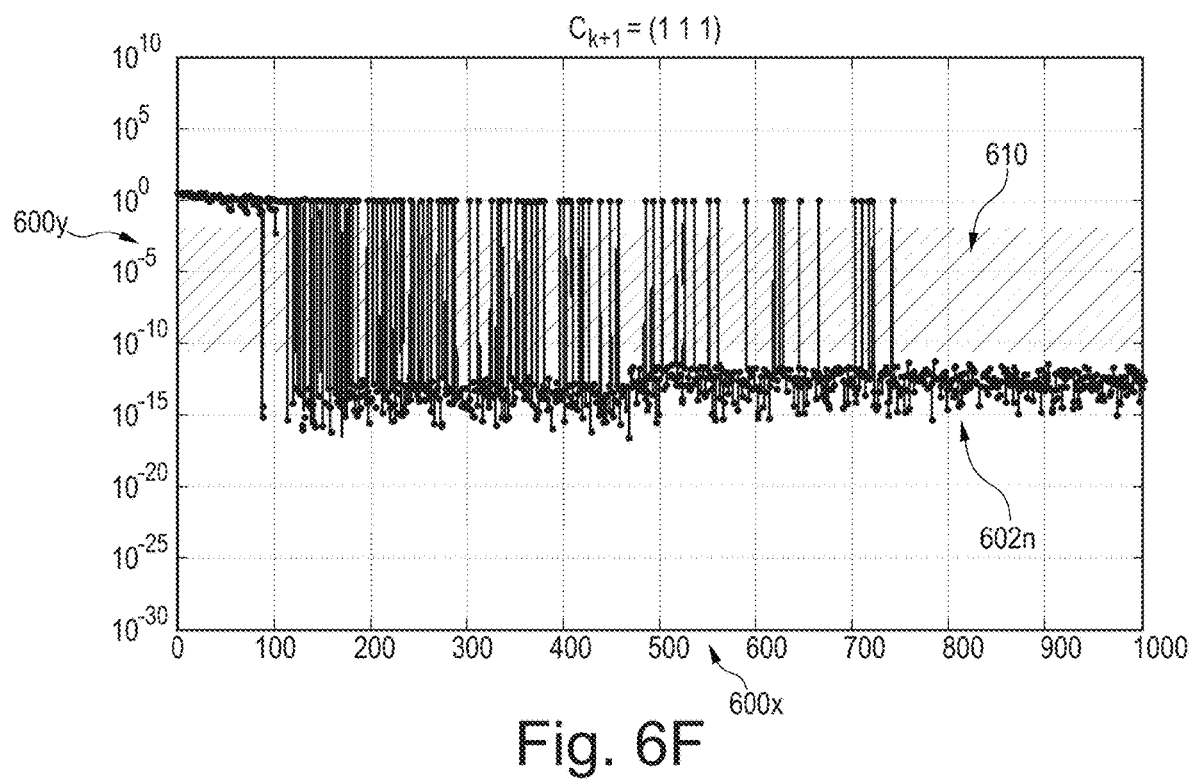
Figure 6G:
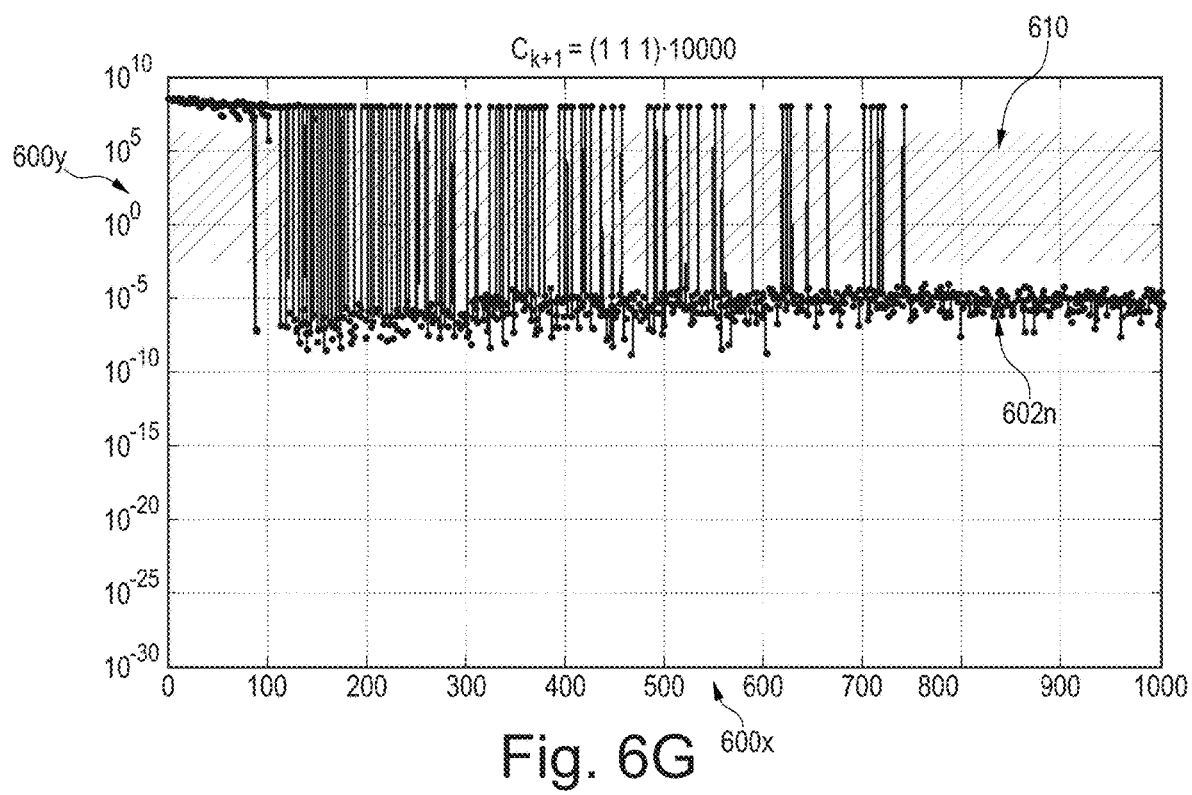
Figure 6H:
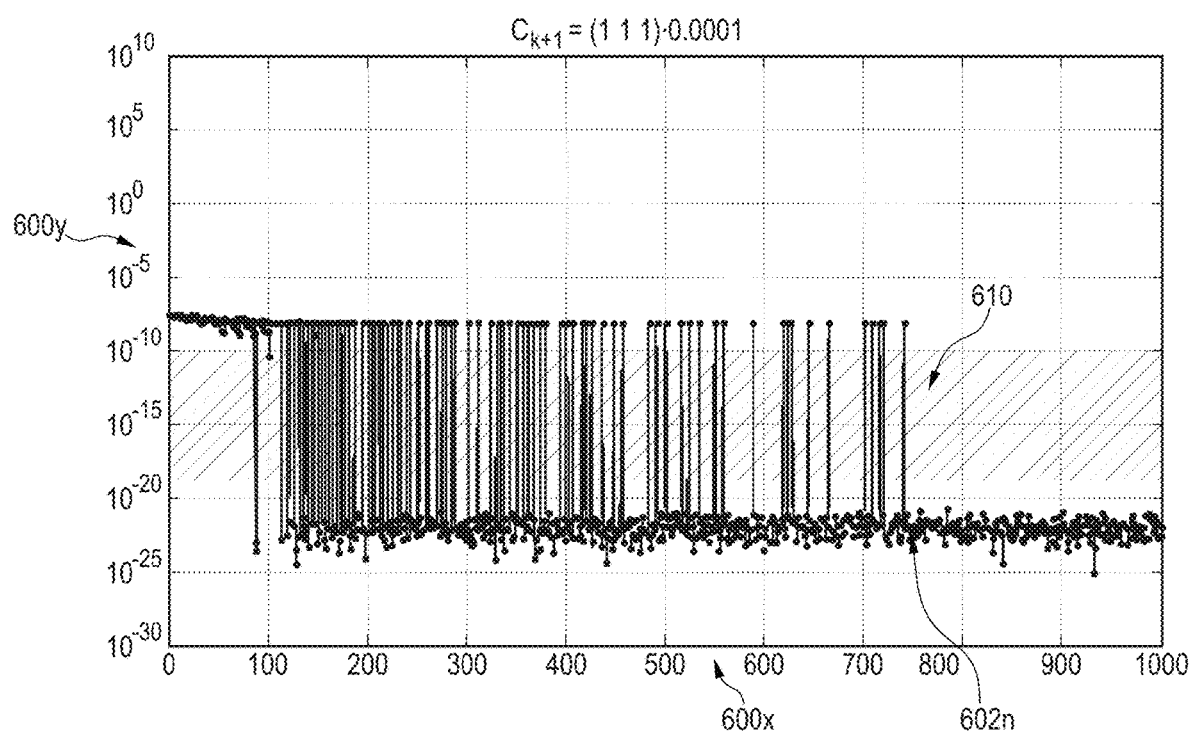

Based on an example, FIG. 6F, FIG. 6G, and FIG. 6H illustrate that choosing the threshold $\varepsilon$ may be relevant.

Therefore, the observation vector $C_{k+1}$ is varied. As examples, FIG. 6F shows the discrimination parameter $|F_{I,k+1}|$ for the observation vector $C_{k+1}=(1\ 1\ 1)$, FIG. 6G shows the discrimination parameter $|F_{I,k+1}|$ for the observation vector $C_{k+1}=(10000\ 10000\ 10000)$, and FIG. 6H shows discrimination parameter $|F_{I,k+1}|$ for the observation vector $C_{k+1}=(0.0001\ 0.0001\ 0.0001)$. The area 610 in each figure respectively illustrates the interval, where a threshold $\varepsilon$ that safely discriminates between $|F_{I,k+1}|=0$ and $|F_{I,k+1}|>0$ can be set. The threshold $\varepsilon$ may be selected to be distinguishable from the numerical noise floor 602n, e.g. the threshold $\varepsilon$ may be set one or more orders of magnitude above the numerical noise floor 602n. However, there may be usually no common intersection of the intervals for the three different observation vectors $C_{k+1}$ illustrated in FIGS. 6F to 6H.

According to various embodiments, the respective observation vector (e.g. in Equation (11c) may be replaced for example by a modified observation vector. With $C:=C_{k+1}$ and $|C_0|=1$, the modified observation vector may be formulated as follows:

$$C = C_0 \cdot |C| \qquad (30)$$

In this case, $|C|$ is the length of the observation vector C. Inserting Equation (30) into Equation (11c) results for example in:

$$\overline{P}_I = P_I - \frac{P_I C_0^T C_0 P_I}{F_I} \cdot \frac{|C|^2}{|C|^2} \qquad (30a)$$

with $\overline{P}_I := P_{I,k+1};\ P_I := P_{I,k};\ F_I := F_{I,k+1}$

As a result, the recursion of the infinite part of the error covariance matrix $P_I$ may be independent from the length of the observation vector C and may be completely determined by the direction of the observation vector C. In contrast, the discrimination parameter $F_I$ scales with the squared length of C, illustrated for example by the following equation:

$$F_I = \underbrace{C_0 P_I C_0^T}_{=:F_{I0}} \cdot |C|^2 = F_{I0} \cdot |C|^2 \qquad (30b)$$

The discrimination parameter $F_I$ may be zero for any non-zero observation vector C if (and only if) $F_{I0}$ is zero. Therefore the modified discrimination parameter $F_{I0}$ can be used instead of the discrimination parameter $F_I$ to discriminate the first and second case from each other, e.g. as follows:

$|F_{I0}| > \varepsilon \to$ Case 1 \qquad (30c)

$|F_{I0}| \leq \varepsilon \to$ Case 2 with $$F_{I0} = C_0 P_I C_0^T = \frac{F_I}{|C|^2} = \frac{F_I}{CC^T}$$

Figure 6I:
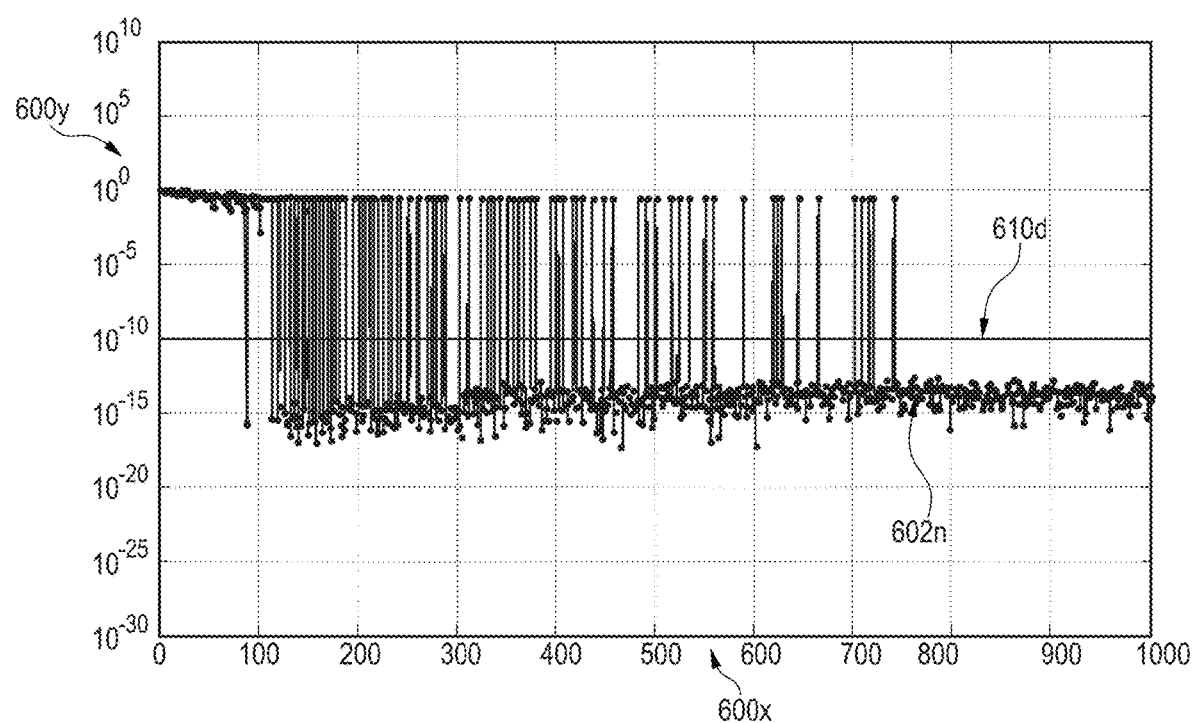

The modified discriminator $F_{I0}$ may be more suited for discrimination of the cases than the non-modified discriminator $F_I$ described before, because the modified discriminator $F_{I0}$ is independent of the length of the observation vector C. This is illustrated for example in FIG. 6I that shows for example the modified discriminator, $F_{I0}$, for the three sample observation vectors $C_{k+1}$=(1 1 1), $C_{k+1}$=(1 1 1)·10000, and $C_{k+1}$=(1 1 1)·0.0001 used above with reference to FIGS. 6F to 6H. Even though the three sample observation vectors differ by several orders of magnitude, the values of the modified discriminator $F_{IO}$ are aligned and highly comparable. Therefore, a common discrimination limit (see discriminator line 610d) may be used for all of the observation vectors. As shown above, this is not possible if the non-modified discriminator, $F_I$, is used.

The approach for modifying the discriminators $F_I$ may be also applied to the square root algorithms described above, wherein the error covariance matrix is factorized. This may be formulated for example with the following equations:

$$F_{IO} = v_f^T v_f = |v_f|^2; \quad v_f = C_0 S_I^T;$$

Further, according to various embodiments, the error variance may be calculated for the prediction of arbitrary state combinations and outputs. The state prediction may be based for example on the equation:

$$\alpha_{k+1} = \overline{C} x_{k+1} \tag{31}$$

In this case, $\alpha_{k+1}$ is the state combination of interest and $\overline{C}$ is the corresponding state extraction vector. The variance of the prediction error is given for example by the following equations:

$$\sigma_{ERR}^2 = \begin{cases} \overline{C}[P_{R,k} + Q_{k+1} Q_{k+1}^T] \overline{C}^T & \text{if } |F_I| = 0 \\ \infty & \text{if } |F_I| > 0 \end{cases} \tag{31a}$$

$$F_I = \overline{C} P_{I,k} \overline{C}^T \tag{31b}$$

The robust, modified discriminator $F_{IO} = \overline{C}_0 P_{I,k} \overline{C}_0^T$ may be calculated for example by factoring the state extraction vector, e.g. into $\overline{C} = \overline{C}_0 |\overline{C}|$.

Further, the output prediction may be based for example on the following equation:

$$\hat{y}_{k+1|k} = C_{k+1} \hat{x}_k \tag{31c}$$

In this case, $\hat{y}_{k+1|k}$ is the estimate of $y_{k+1}$ based on the data up to the time instant k and $C_{k+1}$ is the corresponding observation vector. The estimation error variance is given for example by the following equations:

$$\sigma_{ERR}^2 = \begin{cases} C_{k+1} P_{R,k} C_{k+1}^T + R_{k+1} R_{k+1}^T & \text{if } F_I = 0 \\ \infty & \text{if } F_I > 0 \end{cases} \tag{31d}$$

$$F_I = C_{k+1} P_{I,k} C_{k+1}^T \tag{31e}$$

The robust, modified discriminator $F_{IO} = C_0 P_{I,k} C_0^T$ may be constructed accordingly by factoring the observation vector, for example into $C_{k+1} = C_0 |C_{k+1}|$. However, other (e.g. more complex) prediction scenarios may be conceivable.

According to various embodiments, the fast and numerically stable square root algorithm for updating and/or downdating the state information may be used in a component of a control system and/or for monitoring discrete processes, as described above. Additionally, a normalized observation vector (e.g. a normalized state extraction vector) may be used to calculate a robust, modified discriminator (e.g. $F_{IO}$) to detect the infinite prediction variance of the Kalman based filter. According to various embodiments, the discriminator may be stored for each metrology update to trace the correct discrimination of the first and second case.

According to various embodiments, a fast and stable square root update algorithm is provided for a Kalman filter. In the following, a fast and numerically stable square root algorithm is provided for updating a Kalman based filter or any other similar filter based for example on Equations (1), (1*), (2), (2*), (8) to (12) as described above. As described above, some typical issues of a run-to-run control can be solved by dissecting the error covariance matrices P into a finite and an infinite part. However, the square root algorithms described in the following as examples based on dissected the error covariance matrices P can be applied in the same way to non-dissected error covariance matrices P, as described herein as well. The numerical accuracy may be improved considerably if both parts are factorized into square roots. This transforms Equation (8a) described above into:

$$\hat{x}_{k+1} = A_{k+1} \hat{x}_k + B_{k+1} \tag{8a}$$

$$S_{R,k+1}^T S_{R,k+1} = A_{k+1} S_{R,k}^T S_{R,k} A_{k+1}^T + Q_{k+1} Q_{k+1}^T \tag{33}$$

$$S_{I,k+1}^T S_{I,k+1} = A_{k+1} S_{I,k}^T S_{I,k} A_{k+1}^T \tag{34}$$

In a run-to-run application, no state transition matrix may be used, i.e. ($A_{k+1} = I_n$). This may simplify Equations (33), (34) to:

$$S_{R,k+1}^T S_{R,k+1} = S_{R,k}^T S_{R,k} + Q_{k+1} Q_{k+1}^T \tag{33a}$$

$$S_{I,k+1}^T S_{I,k+1} = S_{I,k}^T S_{I,k} \tag{34a}$$

Equation (34a) may be trivial to handle, while Equation (33a) may correspond to a square root update. However, the computational complexity of conventional update algorithms is proportional to $n^3$. The number of states n used in a run-to-run control is typically several hundreds. Therefore, various embodiments are described in the following providing an update algorithm with reduced computational complexity.

According to various embodiments, following observations were made on the sets of Equations (3) and (4) described above:

If the process noise matrix Q is a diagonal matrix process noise is accumulated at main diagonal of error covariance matrix P only.

The diagonal element P(i,i) does not affect the Kalman iteration as long as state x(i) is not involved in any metrology update.

The number of non-zero elements of the observation vector C is typically much smaller than the number of states (for run-to-run control: 2-4 vs. some hundreds).

Figure 7A:
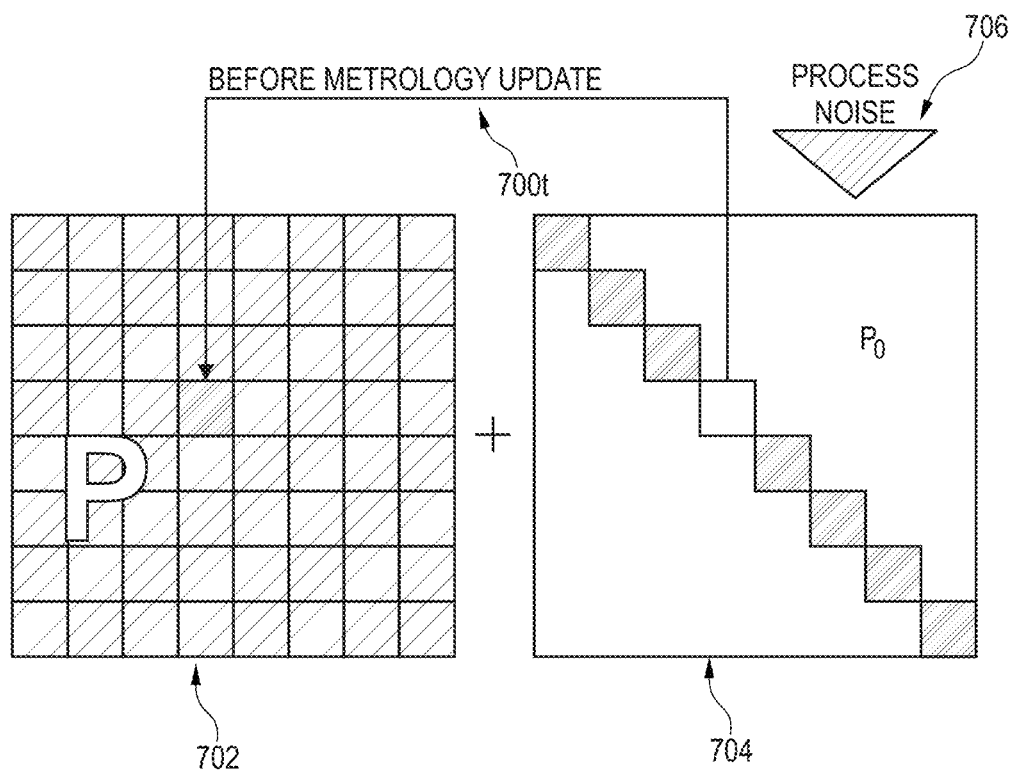
FIGS. 7A and 7B show various configurations of a data merging circuit in a schematic view, according to various embodiments.

These observations can be exploited to reduce the computational complexity of Equation (33a). A modification may be for example as follows, see FIG. 7A:

The accumulated process noise can be separated from the error covariance matrix P, see for example reference sign 702.

New (e.g. incoming) process noise 706 is added to a separate diagonal matrix $P_0$ (e.g. for the process update), see for example reference sign 704.

When state x(i) is involved in metrology update, the process noise is transferred 700t from $P_0(i,i)$ to P(i,i) before updating the error covariance matrix P.

Figure 7B:
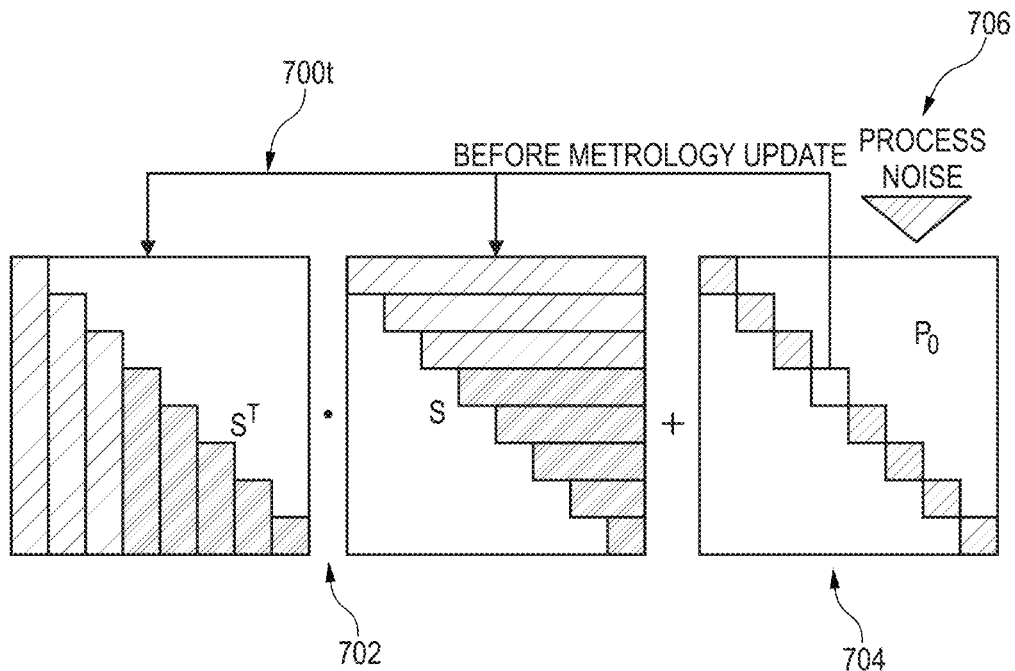

As illustrated for example in FIG. 7B in a schematic view, the approach may be adapted to $P = S^T S$ and similar factorizations, as described above. In this case, the computational complexity of transferring the process noise from $P_0(i,i)$ to $S^T S$ is proportional to $n^2$, e.g. for a rank-1 update, as described above.

This approach can be summarized in two algorithms, as described in more detail below. Generally, the error covariance matrix P is dissected for example into:

$$P = S^T S + P_0 \quad (35)$$

In this case, $P_0$ is a (n,n) diagonal matrix.

According to various embodiments, the algorithms (e.g. Algorithms (9), (10)) described herein for separating the process noise from the error covariance matrix P, e.g. as illustrated in Equation (35), may be applied in the same way to the cases in which the error covariance matrix P is dissected into a finite part $P_R$ and into an infinite part $P_I$, as described herein. In this case, the error covariance matrices $P_R$ and $P_I$ may be dissected for example as follows:

$$P_R = S_R^T S_R + P_{0,R} \text{ or } P_I = S_I^T S_I + P_{0,I}.$$

With $S_{k+1}^T S_{k+1} + P_{0,k+1} = S_k^T S_k + P_{0,k} + Q_{k+1} Q_{k+1}^T$ the Algorithms (9), (10) may be implemented as follows:

Algorithm 9

1. Input: $S_k$—(n,n) upper triangular matrix
   $P_{0,k}$—(n,n) diagonal matrix
   $Q_{k+1}$—(n,n) diagonal matrix
2. Calculate: $P_{0,k+1} = P_{0,k} + Q_{k+1} Q_{k+1}^T$; $S_{k+1} = S_k$

Algorithm 10

1. Input: $S_k$—(n,n) upper triangular matrix
   $P_{0,k}$—(n,n) diagonal matrix
   $C_{k+1}$—(1,n) observation vector
2. Find all indices i with $C_{k+1}(i) \neq 0$ and $P_{0,k}(i,i) \neq 0$
3. For all indices i found in step 2 do the following steps:
   a. Initialize: $a = (0\ 0\ \ldots\ 0)^T$
   b. Set $a(i) = \sqrt{P_{0,k}(i,i)}$
   c. Use Algorithm (3) to modify $S_k$: $S_k := R1UD(S_k, a)$
   d. Set $P_{0,k}(i,i) = 0$
4. Apply square root downdate algorithm to calculate matrix $S_{k+1}$ According to various embodiments, with, for example, $\bar{S}^T \bar{S} = S^T S + aa^T$, a rank-1 update may be implemented for example based on Algorithm (4) as described above.

According to various embodiments, the fast and numerically stable square root algorithm is provided for the process update, as described above. In this case, the computational complexity is reduced from order $n^3$ to order $n^2$, when the number of non-zero elements in the observation vector C is much smaller than the number of states n. Further, the storage requirements do not increase significantly, as n additional values need to be stored only.

According to various embodiments, the fast and numerically stable square root algorithm for the process update may be used in a component of a control system and/or for monitoring discrete processes, as described above. According to various embodiments, the error covariance matrix may be dissected into $S^T S + P_0$ or into a similar sum. New process noise may be added to the diagonal matrix $P_0$. The process noise is transferred from $P_0(i,i)$ to $S^T S$ (e.g. only) when a state x(i) is involved in corresponding metrology update.

According to various embodiments, one or more alternative factorization may be used in a similar way, as described above. Instead of the Equation (35), one of the following alternative factorizations may be used to reformulate Algorithms (9) and/or (10):

$$P = SS^T + P_0 \quad (36)$$

$$P = U^T D U + P_0 \quad (37)$$

$$P = UDU^T + P_0 \quad (38)$$

According to various embodiments, as illustrated above, see FIG. 6C, the respective factorization matrix S or U for the square rooting algorithm may be a triangular (n, n) matrix having a number of n rows and n columns, wherein n is a natural number. According to various embodiments, the respective factorization matrix that is used for the square rooting algorithm may be an upper right triangular matrix, an upper left triangular matrix, a lower right triangular matrix, or a lower left triangular matrix. The error covariance matrix P is a symmetric (n, n) matrix.

When the error covariance matrix is factorized based on for example $P = S^T S$ or $P = U^T D U$, as described above, the respective factorization matrix S or U (and therefore also the error covariance matrix P) is of the rank R with a number of n rows and having a number of n minus R exact-zero rows. Further, in this case, for each of the n rows that includes at least one non-zero element, the corresponding diagonal element of the respective factorization matrix S or U is non-zero. Alternatively, when the error covariance matrix is factorized based on for example $P = S S^T$ or $P = U D U^T$, the respective factorization matrix S or U (and therefore also the error covariance matrix P) is of the rank R with a number of n columns and having a number of n minus R exact-zero columns. Further, in this case, for each of the n columns that includes at least one non-zero element, the corresponding diagonal element of the respective factorization matrix S or U is non-zero. In both cases, the respective factorization matrix is a triangular matrix, according to various embodiments.

According to various embodiments, the exact-zero rows and/or the exact-zero columns allows structurally coding a reduction of the rank. According to various embodiments, the data merging circuit 108 may be configured to generate accordingly one column or one zero row when the rank of the respective factorization matrix S or U is reduced by one. This allows that the algorithm may easily identify a zero row/column and may start another procedure as for non-zero rows. Further, this may increase the calculation accuracy. Further, this allows that the algorithm can easily identify a singularity and consider the singularity during downdating. The downdate is for example formulated to preserve the properties of the matrices, e.g. to preserve the coding of the exact zero rows/lines accordingly.

According to various embodiments, a fast and numerically stable square root algorithm is provided herein based on a block-diagonal state transition matrix, as described in more detail below. Various algorithms are provided for a Kalman based filter or any other similar filter based on Equations (1), (1*), (2), (2*), as described above. In more detail, the state information of the process (1), (2) may be estimated by two sets of equations executed completely independently, see the set of Equations (3), (4), as described above.

A fast and stable square root update algorithm for an Infinity-Filter is described above for the case that no state transition matrix, A, is used (e.g. for $A_{k+1} = I$). This transforms Equations (8a, 8b, 8c) into:

$$\hat{x}_{k+1} = A_{k+1} \hat{x}_k + B_{k+1} \quad (8a)$$

$$S_{R,k+1}^T S_{R,k+1} + P_{0,k+1} = A_{k+1}(S_{R,k}^T S_{R,k} + P_{0,k}) A_{k+1}^T + Q_{k+1} Q_{k+1}^T \quad (39)$$

$$S_{I,k+1}^T S_{I,k+1} = A_{k+1} \cdot S_{I,k}^T S_{I,k} \cdot A_{k+1}^T \quad (40)$$

According to various embodiments, since the corresponding square root downdate described above should be applicable at the same time, the process update algorithm may be configured to preserve the exact-zero rows and ensures that all non-zero rows have non-zero diagonal elements. According to various embodiments, the computational complexity of the algorithms described herein is less than proportional to $n^3$.

It was recognized that in practical applications of the data merging circuit 108 only a small number of states may be modified by the state transition matrix upon application of, for example, Equation (3). Further, one or more states may also share the same sub-transition matrix. There may be several (but only a few) sub-transition matrices.

Figure 8:
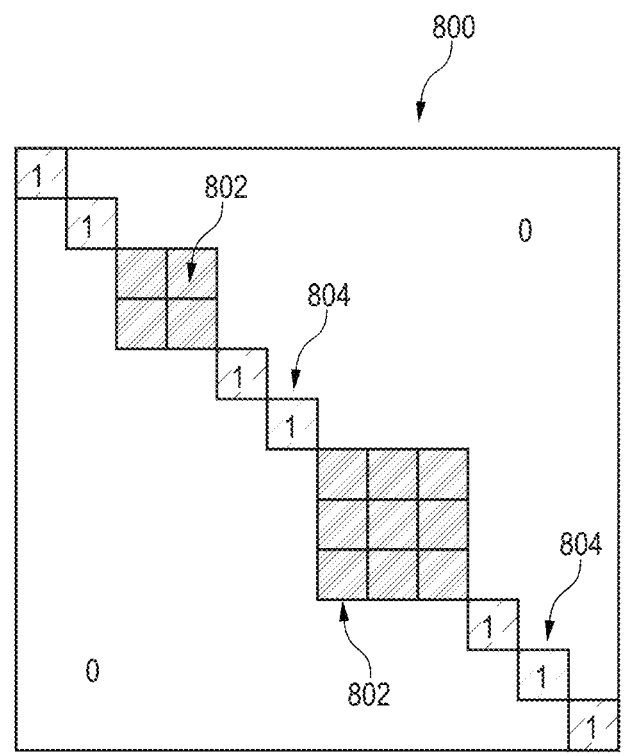
FIG. 8 shows a configuration of a data merging circuit in a schematic view, according to various embodiments.

According to various embodiments, the process update may include the following: First, the state transition matrix may be organized as block diagonal matrix 800, as for example illustrated in FIG. 8, according to various embodiments. Second, only the non-unit blocks 802 of the block diagonal matrix 800 may be stored, e.g. in a memory circuit that may be part of the process control circuit 100 or coupled to the process control circuit 100. In this case, all other diagonal blocks of the block diagonal matrix 800 are 1×1 identity matrices 804, which do not modify the state. Third, the total process update is now formulated as a sequence of sub-updates, wherein each sub-update processes one of the non-unit blocks 802. Fourth, the sub-update is restricted, wherever possible, to the rows and/or columns that the corresponding non-unit block 802 is modifying. This decreases the computational complexity significantly since the number of those rows and/or columns may be for example very small.

According to various embodiments, the process update may be separated into two parts: first, a state transition and, second, an addition of process noise. For the second part, i.e. the addition of process noise, the method described above can be used. The first part, i.e. the state transition, can be reformulated for example based on the following equations:

$$\bar{S}_R^T \bar{S}_R + \bar{P}_0 = A \cdot (S_R^T S_R + P_0) \cdot A^T \quad (41)$$

$$\bar{S}_I^T \bar{S}_I = A \cdot S_I^T S_I \cdot A^T \quad (42)$$

Focusing on a single sub-update, the Equation (41) can be formulated for example as Equation (43) as follows:

$$\bar{S}^T \bar{S} + \bar{P}_0 =$$

$$\begin{bmatrix} 1 & & & & & \\ & \ddots & & & & \\ & & 1 & & & \\ & & & A_* & & \\ & & & & 1 & \\ & & & & & \ddots \\ & & & & & & 1 \end{bmatrix} \cdot \left( S^T S + \begin{bmatrix} p_1 & & & & & \\ & \ddots & & & & \\ & & p_{i-1} & & & \\ & & & P_*^T P_* & & \\ & & & & p_{j+1} & \\ & & & & & \ddots \\ & & & & & & p_n \end{bmatrix} \right) \cdot$$

-continued $$\begin{bmatrix} 1 & & & & & \\ & \ddots & & & & \\ & & 1 & & & \\ & & & A_*^T & & \\ & & & & 1 & \\ & & & & & \ddots \\ & & & & & & 1 \end{bmatrix}$$

According to various embodiments, the Equation (43) may be used in the same way for updating $\bar{S}_{k,R}^T \bar{S}_{k,R} + \bar{P}_{0,k,R}$ or $\bar{S}_{k,I}^T \bar{S}_{k,I} + \bar{P}_{0,k,I}$.

The corresponding non-unit block 802 is denoted by $A^*$ while $P^*$ is the related part of the diagonal matrix $P_0$. It may have for example the following structure:

$$P_* = \begin{bmatrix} \sqrt{p_i} & & & \\ & \sqrt{p_{i+1}} & & \\ & & \ddots & \\ & & & \sqrt{p_j} \end{bmatrix} \quad (44)$$

Further, expanding Equation (43) may result for example in Equation (45) as follows, which may be the basis for the update algorithm, as described below in more detail:

$$\bar{S}^T \bar{S} + \bar{P}_0 = A \cdot S^T S \cdot A^T +$$

$$\begin{bmatrix} 0 & & & & \\ & \ddots & & & \\ & & 0 & & \\ & & & A_* P_*^T P_* A_*^T & \\ & & & & 0 \\ & & & & & \ddots \\ & & & & & & 0 \end{bmatrix} + \begin{bmatrix} p_1 & & & & \\ & \ddots & & & \\ & & p_{i-1} & & \\ & & & 0 & \\ & & & & p_{j+1} \\ & & & & & \ddots \\ & & & & & & p_n \end{bmatrix}$$

$$=: \bar{P}_0$$

Various embodiments described in the following are related to algorithms for a process update including the state transition.

With the following equations:

$$\bar{S}_R^T \bar{S}_R + \bar{P}_0 = A \cdot (S_R^T S_R + P_0) \cdot A^T \text{ and } \bar{S}_I^T \bar{S}_I = A \cdot S_I^T S_I \cdot A^T,$$

Algorithm (11) may be formulated as follows:

Algorithm 11

Input: $S_R$—(n,n) upper triangular matrix
$S_I$—(n,n) upper triangular matrix
$P_0$—(n,n) diagonal matrix
$A$—(n,n) block-diagonal state transition matrix
For all (non-unit) block matrices $A^*$ of A do the following:
1. Determine the set I of row/column indices corresponding to current block matrix $A^*$. Denote the smallest index in I by i.

2. Multiply columns I of $S_R$ and $S_I$ from the right with $A^{*T}$. This destroys the upper triangular form of $S_R$ and $S_I$.
$S_R(1:n,I):=S_R(1:n,I)A^{*T}$
$S_I(1:n,I):=S_I(1:n,I)A^{*T}$
3. Restore the upper triangular form of rows I of A by orthogonal row transformations using Algorithm (12). If A* is regular, the transformation can be restricted to rows I only. Otherwise the transformation needs to be extended to rows i, i+1, . . . , n. In both cases columns 1, 2, . . . , i−1 are left unchanged.
Case 1 (A* regular):
$S_R(I,i:n):=MQR[S_R(I,i:n)]$
$S_I(I,i:n):=MQR[S_I(I,i:n)]$
Case 2 (A* singular):
$S_R(i:n,i:n):=MQR[S_R(i:n,i:n)]$
$S_I(i:n,i:n):=MQR[S_I(i:n,i:n)]$
4. Find all indices in I with $P_0(i,i) \neq 0$
5. For all indices i found in step 4 do the following:
   a. Initialize: $a_R = a_I = (0\ 0\ \ldots\ 0)^T$
   b. Set $a_R(I) = a^{*i} \sqrt{P_0(i,i)}$; $a_I(I) = a^{*i}$
      where $a^{*i}$ denotes the i-th column of A*
   c. Use Algorithm (3) to modify $S_R$ and $S_I$:
      $S_R := R1UD(S_R, a_R)$
      $S_I := R1UD(S_I, a_I)$
   d. Set $P_0(i,i) = 0$ According to various embodiments, the (m, n) input matrix S is transformed into an upper triangular matrix $\overline{S}$. Further, all exact-zero rows of the input matrix S is preserved during the update and all non-zero rows of the input matrix $\overline{S}$ may have non-zero diagonal elements. Therefore, according to various embodiments, Algorithm (12) (also referred to as MQR) may include a modified Q, R decomposition as follows:

Algorithm 12

1. Input: S—(m,n) matrix
2. Detect and remove any exact-zero rows of S
3. Use orthogonal row transformations (e.g. QR decomposition, Givens rotations, etc.) to transform S into upper triangular matrix M.
4. Initialize (m,n) result matrix $\overline{S}$ with zeros
5. For all rows r of M do the following steps:
   a. Find first non-zeros element from the left and denote the index of the element by k
   b. If row k is exact zero kip steps c-e. Otherwise copy row r of M to row k of $\overline{S}$.
   c. If row k of $\overline{S}$ is occupied apply orthogonal row transformations (e.g. Givens rotations) to row r of M and row k of $\overline{S}$ to eliminate element M(r,k).
   d. Set all elements of row r of M to zero if $|M(r,i)| < \epsilon$ where threshold $\epsilon$ could be e.g. the maximum norm of M.
   e. Repeat steps a-e.

In this case, Algorithm (4) may be used for the rank-1 update as described before.

According to various embodiments, the overall computational complexity of Algorithms (4), (11) and (12) is considerably smaller than order $n^3$ respectively, because the algorithms use (usually) the few rows and/or columns that correspond to the current non-unit block 802 only (instead of the overall n rows and/or columns). Further, the algorithm preserves exact-zero rows in the square root error covariance matrices. It also ensures that non-zero rows in the square root error covariance matrices have non-zero diagonal elements.

According to various embodiments, the state transition matrix, A, may be organized as a block diagonal matrix 800, as described above. An update algorithm may be used, as described above, that works on the rows and/or columns of the non-unit block 802 only (wherever possible).

In the following, an algorithm for a fast calculation of the exact gradient of the log-likelihood function is provided for a Kalman based filter or any other similar filter based for example on Equations (1), (1*), (2), (2*), as described above. As already described, the state information of the process (1), (2) may be estimated by two sets of Equations (e.g. Equations (3) and (4) or Equations (8a) to (12d)) that are executed completely independently from each other.

According to various embodiments, the unknown state $x_k$ may be estimated with a Kalman filter based algorithm. The respective Kalman filter based algorithm may be implemented in the data merging circuit 108 of the process control circuit 100. The state information and error information (e.g. provided based on the error covariance matrix) of the filter may mirror the accumulation and deterioration of the process information (decrease and increase and of estimation error) precisely as long as the process model parameters $Q_k$, $R_k$, $B_k$, $D_k$, $C_k$, $A_k$ fit to the real life process.

To cope with initialization problems and model ambiguity, as described above, it may be beneficial to decompose the error covariance matrix of the filter into a finite and infinite part. After each process or maintenance step a process update may be is executed. Using this method the estimated state $\hat{x}_k$ and the decomposed covariance matrices $P_{R,k}$ and $P_{I,k}$ are updated based on Equations (8a), (8b), and (8c), as described above. Further, the metrology data may be added to the state by the metrology update based on Equations (9) to (12d), as described above. However, the determination of the process model parameters $Q_k$, $R_k$, $B_k$, $D_k$ may be a major practical aspect in applying Kalman based filters to real production processes.

In general, production data may be in practical situations an available source of information. A powerful data-driven method to tune Kalman filter parameters may be the maximum likelihood estimation. The likelihood is the probability that some given data set fit to the model and its parameters. Unlike in many other cases, the calculation of the (logarithmized) likelihood value may be used for Kalman filter based models, as described herein. According to various embodiments, the maximum likelihood estimation may be based on the following equations:

$$L = const + \sum_{k=1}^{N} L_k \text{ with } L_k = \begin{cases} l_k & \text{if } F_{I,k} = 0 \\ 0 & \text{otherwise} \end{cases} \quad (46)$$

$$l_k = -\frac{1}{2}\left(\ln(F_{R,k}) + \frac{(y_k - C_k \hat{x}_{k-1} - D_k)^2}{F_{R,k}}\right) \quad (47)$$

$$F_{R,k} = C_k P_{R,k-1} C_k^T + R_k^2 \quad (48)$$

$$F_{I,k+1} := C_{k+1} P_{I,k} C_{k+1}^T \quad (49)$$

Figure 9:
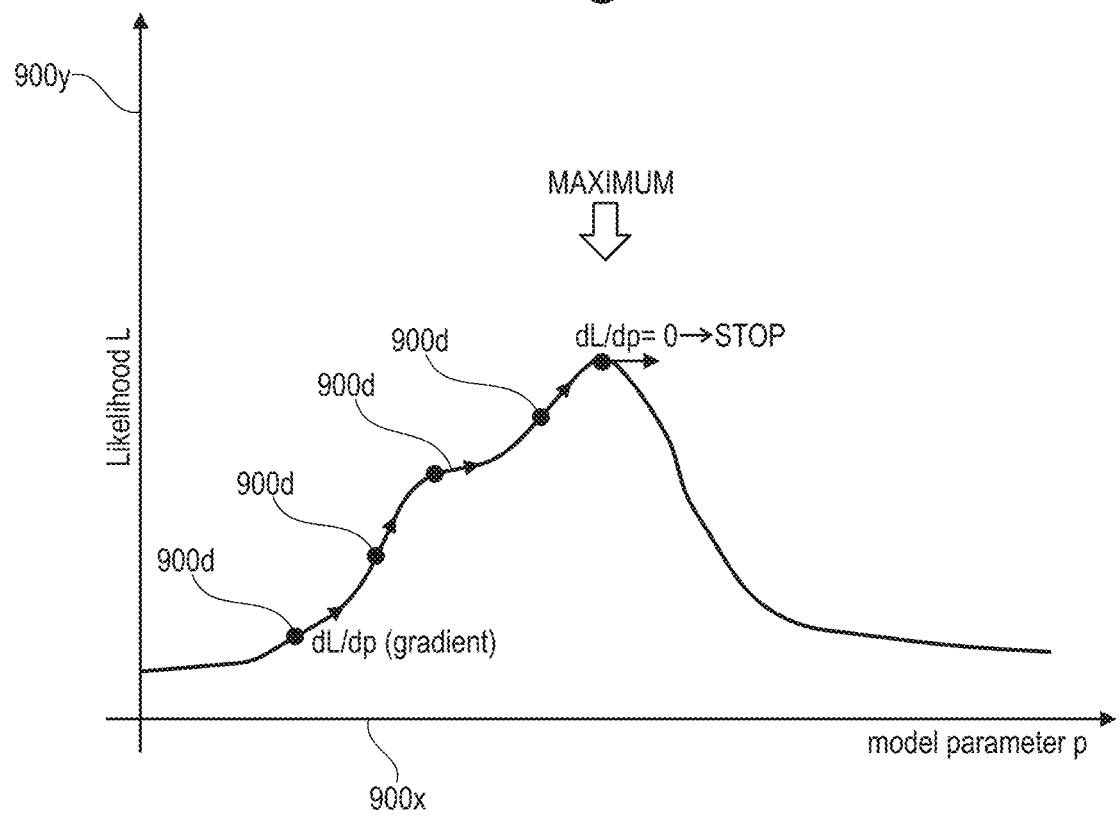
FIG. 9 shows a configuration of a data merging circuit in a schematic view, according to various embodiments.
Figure 10:
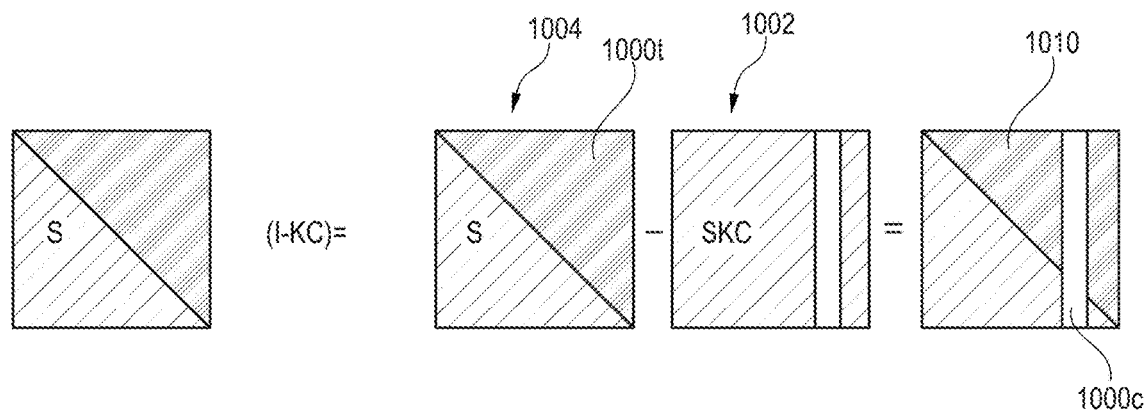
FIG. 10 shows a configuration of a data merging circuit in a schematic view, according to various embodiments.

The objective of the maximum likelihood estimation may be to maximize the log-likelihood value L. Because the dependency between the log-likelihood and the process model parameters is non-linear, this is possible by numerical optimization only. Via a numerical optimization the process model parameters may be modified iteratively in direction of steepest ascent of the log-likelihood. To identify the direction 900d of the steepest ascent, the first-order partial derivatives of the log-likelihood 900y (gradient vector, score vector) may be calculated for at least one model parameter 900x, as illustrated for example in FIG. 9, according to various embodiments.

Several methods may be used to calculate the gradient vector of the log-likelihood value L, as for example finite differences, implicit finite differences, and the Exact Score Algorithm (ES), as illustrated in the following.

According to various embodiments, to calculate the gradient vector of the log-likelihood value L based on finite differences, the exact partial derivative of L with respect to the i-th tuning parameter can be approximated by a difference quotient according to the following set of Equations (50):

$$\left.\frac{\partial L}{\partial p_i}\right|_{p=p^*} \approx f[\Delta, L(p_i^*), L(p_i^* + \Delta),$$

$$L(p_i^* + 2\Delta), \ldots, L(p_i^* - \Delta), L(p_i^* - 2\Delta), \ldots ]$$

e.g., $$\left.\frac{\partial L}{\partial p_i}\right|_{p=p^*} \approx \frac{L(p_i^* + \Delta) - L(p_i^* - \Delta)}{\Delta}.$$

To determine the full gradient vector for all p process model parameters the log-likelihood value L must be calculated for at least p+1 slightly modified sets of process model parameters. The calculation of a single log-likelihood value L, e.g. via Equations (46)-(49) requires to iterate the Kalman filter Equations (8a)-(12d) over the entire data set (k=1, 2, ..., N). This means that the calculation of a p-dimensional gradient vector requires at least p+1 full forward iterations of the Kalman filter. The procedure may be repeated for each optimization step.

Numerical optimization algorithms may be used to calculate the finite differences of the optimized function implicitly (e.g. via the conjugate gradient algorithm). This may be more efficient than calculating the full gradient explicitly for each optimization step. However, the effort may be still tremendous.

According to various embodiments, an algorithm may be used for calculating the full gradient vector of the likelihood function with a single forward and backward iteration of the Kalman filter. This algorithm may be for example applicable for tuning process model parameters, e.g. the noise scaling matrices $Q_k$ and $R_k$, according to a set of Equations (50a) as follows:

$$\left.\frac{\partial L}{\partial p_i}\right|_{p=p^*} = \sum_{k=1}^N \frac{\partial L_k}{\partial p_i} \text{ with } \frac{\partial L_k}{\partial p_i} = \begin{cases} \frac{\partial l_k}{\partial p_i} & \text{if } F_{I,k} = 0 \\ 0 & \text{otherwise} \end{cases}$$

$$\frac{\partial l_k}{\partial p_i} = -\frac{1}{2} tr\left[(r_{k-1}r_{k-1}^T - N_{k-1}) \cdot \frac{\partial \overline{Q}_k}{\partial p_i} + (e_k e_k^T - E_k) \cdot \frac{\partial \overline{R}_k}{\partial p_i}\right]$$

$$\overline{Q}_k = Q_k Q_k^T; \overline{R}_k = R_k^2$$

According to various embodiments, the corresponding vectors $r_k$, $e_k$ and matrices $N_k$, $E_k$ may be calculated with Algorithm (13), as follows:

---

ALGORITHM 13:

1. Calculate $\hat{x}_k$ for k = 1, 2, ..., N using Equations (8a)-(12d). Store $\upsilon_k := y_k - C_k \hat{x}_{k-1} - D_k$, $F_{R,k}$, $F_{I,k}$ and $K_k$ for each k.
2. Initialization: $r_N = 0$; $N_N = 0$
3. for k = N, N-1, ..., 1
   $e_k = -K_k^T A_{k+1}^T r_k + F_k^{-1} \upsilon_k$
   $E_k = K_k^T A_{k+1}^T N_k A_{k+1} K_k + F_k^{-1}$
   $r_{k-1} = A_{k+1}^T r_k + C_k^T e_k$
   $N_{k-1} = (I - C_k^T K_k^T) A_{k+1}^T N_k A_{k+1} (I - C_k K_k) + C_k^T F_k^{-1} C_k$
   with
   $$F_k^{-1} := \begin{cases} F_{R,k}^{-1} & \text{if } F_{I,k} = 0 \\ 0 & \text{otherwise} \end{cases}$$
   end

---

Illustratively, Algorithm (13) represents the backward iteration part of the ES algorithm. The exact score algorithm is not applicable when measurement data is not available for at least one time instance k, when any of the matrices $Q_k$ and $R_k$ is singular (which may be a very common situation in run-to-run applications), and/or for tuning model parameters, e.g. for $B_k$ and $D_k$.

According to various embodiments, a modified Algorithm (13) is provided herein to overcome the limitation of the conventional algorithm, wherein the modified algorithm provided herein copes for example with missing measurements. According to various embodiments, the following Algorithm (14) may be used to calculate the gradient vector of the log-likelihood value L:

---

ALGORITHM 14:

1. Calculate $\hat{x}_k$ for k = 1, 2, ..., N using Equations (8a)-(12d). Store $\upsilon_k := y_k - C_k \hat{x}_{k-1} - D_k$, $F_{R,k}$, $F_{I,k}$ and $K_k$ for each k.
2. Initialization: $r_N = 0$; $N_N = 0$
3. for k = N, N-1, ..., 1
   if measurement $y_k$ is available
   $e_k = -K_k^T A_{k+1}^T r_k + F_k^{-1} \upsilon_k$
   $E_k = K_k^T A_{k+1}^T N_k A_{k+1} K_k + F_k^{-1}$
   $r_{k-1} = A_{k+1}^T r_k + C_k^T e_k$
   $N_{k-1} = (I - C_k^T K_k^T) A_{k+1}^T N_k A_{k+1} (I - C_k K_k) + C_k^T F_k^{-1} C_k$
   with
   $$F_k^{-1} := \begin{cases} F_{R,k}^{-1} & \text{if } F_{I,k} = 0 \\ 0 & \text{otherwise} \end{cases}$$
   else
   $e_k = 0$
   $E_k = 0$
   $r_{k-1} = A_{k+1}^T r_k$
   $N_{k-1} = A_{k+1}^T N_k A_{k+1}$
   end
end

---

Further, the gradient calculation according to the set of Equations (50a) may be generalized to singular tuning matrices $Q_k$ and $R_k$, according to various embodiments. Therefore, the following Algorithm (15) may be used, based for example on a modified set of Equations (51).

---

ALGORITHM 15:

$$\left.\frac{\partial L}{\partial p_i}\right|_{p=p^*} = \sum_{k=1}^N \frac{\partial L_k}{\partial p_i} \text{ with } \frac{\partial L_k}{\partial p_i} = \begin{cases} \frac{\partial l_k}{\partial p_i} & \text{if } F_{I,k} = 0 \\ 0 & \text{otherwise} \end{cases}$$

$$\frac{\partial l_k}{\partial p_i} = -\frac{1}{2} tr\left[Q_k^+ \frac{\partial \overline{Q}_k}{\partial p_i} + \frac{\partial \overline{Q}_k^+}{\partial p_i} \Omega_{Q,k}\right] - \qquad (51)$$

ALGORITHM 15:

$$\frac{1}{2}\text{tr}\left[\overline{R}_k^+ + \frac{\partial \overline{R}_k}{\partial p_i} + \frac{\partial \overline{R}_k^+}{\partial p_i}\Omega_{R,k}\right]$$

$$\Omega_{Q,k} = \overline{Q}_k(r_{k-1}r_{k-1}^T - N_{k-1})\overline{Q}_k + \overline{Q}_k$$
$$\Omega_{R,k} = \overline{R}_k(e_k e_k^T - E_k)\overline{R}_k + \overline{R}_k$$
$$\overline{Q}_k = Q_k Q_k^T; \overline{R}_k = R_k^2$$

According to various embodiments, the corresponding vectors $r_k$, $e_k$ and matrices $N_k$, $E_k$ may be calculated with Algorithm (14), as described above. $\overline{Q}_k^+$ and $\overline{R}_k^+$ denote the Moore-Penrose pseudoinverse of $\overline{Q}_k$ and $\overline{R}_k$ respectively. In run-to-run control, the tuning matrices (e.g. matrices Q and R) are often simple diagonal matrices and may be written for example in the following form:

$$Q_k = \begin{bmatrix} \sqrt{\sum_{i=1} p_i^2 w_{Q,1,i,k}^2} & 0 & 0 & 0 \\ 0 & \sqrt{\sum_{i=1} p_i^2 w_{Q,2,i,k}^2} & 0 & 0 \\ 0 & 0 & \ddots & 0 \\ 0 & 0 & 0 & \sqrt{\sum_{i=1} p_i^2 w_{Q,n,i,k}^2} \end{bmatrix} \quad (52)$$

$$R_k = \begin{bmatrix} \sqrt{\sum_{i=1} p_i^2 w_{R,1,i,k}^2} & 0 & 0 & 0 \\ 0 & \sqrt{\sum_{i=1} p_i^2 w_{R,2,i,k}^2} & 0 & 0 \\ 0 & 0 & \ddots & 0 \\ 0 & 0 & 0 & \sqrt{\sum_{i=1} p_i^2 w_{R,m,i,k}^2} \end{bmatrix} \quad (53)$$

In this case, $p_i$ denotes the i-th tuning parameter. The weighting factors $w_{Q,r,i,k}$ and $w_{R,r,i,k}$ may control the impact of $p_i$ on the r-th row/column of $Q_k$ and $R_k$ respectively. The gradient calculation may be simplified dramatically by exploiting the special structure of the matrices according to Equations (52), (53). The result is for example in Algorithm (16) based on Equation (54) as follows:

Algorithm 16

$$\left.\frac{\partial L}{\partial p_i}\right|_{p=p^*} = \sum_{k=1}^N \sum_{j=1}^n [(r_{j,k-1}^2 - N_{jj,k-1})p_i^* w_{Q,j,i,k}^2] + \quad (54)$$

$$\sum_{k=1}^N \sum_{j=1}^m [(e_{j,k}^2 - E_{jj,k})p_i^* w_{R,j,i,k}^2]$$

In this case, $r_{j,k}$ and $e_{j,k}$ denote the j-th element of vectors $r_k$ and $e_k$ respectively. $N_{jj,k}$ and $E_{jj,k}$ are the (j,j)-element (j-th main diagonal element) of matrices $N_k$ and $E_k$. Further, the corresponding vectors $r_k$, $e_k$ and matrices $N_k$, $E_k$ may be calculated with Algorithm (14) as described above.

According to various embodiments, the calculation of exact gradients for the process model parameters, e.g. $B_k$ and $D_k$, may be equivalent to the calculation of the first partial derivative of $l_k$ in Equation (46). According to various embodiments, following Equation (55) may be utilized:

$$\frac{\partial l_k}{\partial p_i} = \frac{v_k}{F_{R,k}}\left[C_k A_k \frac{\partial \hat{x}_{k-1}}{\partial p_i} + C_k \frac{\partial B_k}{\partial p_i} + \frac{\partial D_k}{\partial p_i}\right] \quad (55)$$

The unknown sensitivity vector $$\frac{\partial \hat{x}_{k-1}}{\partial p_i} =: z_{k-1}$$

can be calculated recursively. The result is illustrated for example in Algorithm (17) as follows:

ALGORITHM 17:

1. Initialization: $z_0 = 0$
2. for k = 1, 2, ..., N
   calculate helper vector:

$$\gamma_k = A_k z_{k-1} + \frac{\partial B_k}{\partial p_i}$$

if measurement $y_k$ is available $$z_k = (I - K_k C_k)\gamma_k - K_k \frac{\partial D_k}{\partial p_i}$$

else
$\quad z_k = \gamma_k$
end
calculate score component:
$v_k := y_k - C_k \hat{x}_{k-1} - D_k$ $$\frac{\partial l_k}{\partial p_i} = \frac{v_k}{F_{R,k}}\left[C_k \gamma_k + \frac{\partial D_k}{\partial p_i}\right]$$

end

According to various embodiments, the application of the Algorithms (14) to (17), as described for example above, may be not limited to a filter based on Equations (8a)-(12d). The algorithms may be also applied to the non-modified Kalman filter, as described for example above. The non-modified Kalman filter may be regarded as a special case of the infinity filter (also referred to as generalized Kalman filter), where the infinite part of the error covariance matrix P is zero ($P_I=0$ and $F_I=0$). The log-likelihood value of the standard Kalman filter may be given by Equations (46)-(49) with $F_I=0$ and $P_R=P$. Consequently, according to various embodiments, the Algorithms (14), (15), (16), and (17) may be applied to the standard Kalman filter by setting $F_I$ to zero.

According to various embodiments, the exact gradient vector may be calculated by Algorithms (14), (15), (16), and (17) also in the case of missing measurements, in case of singular noise matrices $Q_k$ and $R_k$, and for tuning matrices $B_k$ and $D_k$ (e.g. for singular or regular tuning matrices). Further, the algorithms provided herein allow calculating the exact gradients of the log-likelihood function in case of missing measurements and singular or regular tuning matrices $Q_k$, $R_k$, $B_k$ and $D_k$.

In the following, a fast and stable square root algorithm for the calculation of the exact gradient of the log-likelihood function is provided for a Kalman based filter or any other similar filter based for example on the Equations (1), (1*), (2), (2*), as described above. As already described, according to various embodiments, the state of the process (1), (2) may be estimated by two sets of Equations (e.g. Equations (3) and (4) or Equations (8a) to (12d)) executed completely independently from each other.

According to various embodiments, the unknown state $x_k$ may be estimated with a Kalman filter based algorithm implemented via the data merging circuit 108 of the process control circuit 100. The filter state and error covariance matrix may mirror the accumulation and deterioration of the process information (decrease and increase and of estimation error) precisely as long as the process model parameters $Q_k$, $R_k$, $B_k$, $D_k$, $C_k$, $A_k$ fit to the real life process. However, the determination of the process model parameters $Q_k$, $R_k$, $B_k$, $D_k$ may be a major practical aspect in applying Kalman filters to real production processes.

As described above, historical production data may be in practical situations a suitable and available source of information. Various algorithms for using a data-driven method to tune Kalman filter parameters based on the maximum likelihood estimation are already described above. According to various embodiments, the maximum likelihood estimation may be based on the Equations described before, cf. Equations (46) to (49). In this case, $P_{R,k}$ and $P_{I,k}$ are the finite and infinite part of the error covariance matrix P of the Kalman filter for time index k respectively. The objective of the maximum likelihood estimation may be to maximize the log-likelihood value L, as described above. To identify the direction 900d of the steepest ascent, the first-order partial derivatives of the log-likelihood 900y (gradient vector, score vector) may be calculated for a model parameter 900x, as illustrated for example in FIG. 9.

A method to calculate the exact gradient vector that works for regular tuning matrices $Q_k$, $R_k$ may require solving a recursive matrix equation of the following form:
Case 1: $|F_{I,k+1}|=0$ (in practice $\leq L_{NUM}$)

$$N_{k-1} = (I - C_k^T K_k^T) A_{k+1}^T N_k A_{k+1} (I - K_k C_k) + C_k^T C_k \cdot \frac{1}{F_{R,k}} \quad (60)$$

Case 2: $|F_{I,k+1}|>0$ (in practice $>L_{NUM}$)

$$N_{k-1} = A_{k+1}^T N_k A_{k+1} \quad (61)$$

As already described above, the method may be modified (generalized) to handle singular tuning matrices $Q_k$, $R_k$, $B_k$, $D_k$. It is known that solving equations like Equation (60) numerically may be a delicate task. Notably the multiplication by (I−KC) and its transpose ("downdate") may be error prone. The problem is aggravated by the fact that a typical run-to-run Kalman model may consist of several hundred states. According to various embodiments, to calculate the exact gradient vector for such a model more efficiently (e.g. more accurately or more reliably), the numerical stability of Equations (60), (61) is improved significantly, as described in more detail below.

According to various embodiments, to improve the numerical stability for solving Equations (60), (61), a square root analogon of these equations may be used. Therefore, the matrix $N_k$ is replaced by the following factorization or a similar factorization:

$$N_k =: S_k^T S_k. \quad (62)$$

In this case, the square root matrix $S_k$ is propagated directly instead of the matrix $N_k$. This strategy may be also applied to the Kalman filtering, as described above. The condition number of the square root matrix $S_k$ (wherein $S_k$ are the Cholesky factors for the time index k) is much better than the condition number of the original matrix $N_k$. Inserting Equation (9) into Equations (7), (8) and dropping subscripts k and k+1 for simplicity results for example in:
Case 1: $|F_I|=0$ (in practice $\leq L_{NUM}$)

$$\bar{S}^T \bar{S} = (I - C^T K^T) A^T \cdot S^T S \cdot A (I - KC) + C^T C \cdot \frac{1}{F_R} \quad (63)$$

Case 2: $|F_I|>0$ (in practice $>L_{NUM}$)

$$\bar{S}^T \bar{S} = A^T \cdot S^T S \cdot A \quad (64)$$

In this case, the input matrix S and output matrix $\bar{S}$ are triangular matrices. The following Algorithm (18) illustrates the square root procedure for Equations (63), (64), wherein Algorithm (4) is the helper procedure used by Algorithm (18).

Algorithm 18

Input: S—(n,n) upper triangular matrix
 $\bar{S}$—(n,n) upper triangular matrix
 A—(n,n) block-diagonal state transition matrix
 C—(1,n) observation vector
 K—(n,1) Kalman gain vector
 $F_R$—finite part of innovation variance
 $F_I$—infinite part of innovation variance
1. For all (non-unit) block matrices A* of A do the following:
 a. Determine the set I of row/column indices corresponding to current block matrix A*. Denote the smallest index in I by i.
 b. Multiply columns I of $S_R$ and $S_I$ from the right with A*. This destroys the upper triangular form of S.
    S(1:n,I):=S(1:n,I)A*
 c. Restore the upper triangular form of rows I of A by orthogonal row transformations using (e.g. QR decomposition, Givens rotations, etc.). The transformation can be restricted to rows I only. Columns 1, 2, . . . , i−1 are left unchanged.
    S(I,i:n):=QR[S(I,i:n)]
2. Skip steps 3-7 if $|F_I|>0$ (Case 2)
3. Subtract matrix S·K·C from matrix S. This destroys the upper triangular form of S for all columns, which correspond to non-zero elements of vector C.
    S:=S(I−KC)=S−SKC
4. Pick the leftmost of the $n_C$ disturbed column of S. Use the bottom element to eliminate all other column elements below the main diagonal with orthogonal row transformations (e.g. Givens rotations). This populates the bottom row of S.
5. Use the corresponding main diagonal elements to eliminate the artifact in the bottom row with orthogonal row transformations. The result is an upper triangular matrix with $n_C-1$ disturbed columns.
6. Repeat steps 4 and 5 until all disturbed columns are eliminated.
7. Use Algorithm (4) to add $C^T C \cdot F^{-1}$ to S:

$$\bar{S} = R1UD\left(S, a = \frac{C^T}{\sqrt{F}}\right)$$

As illustrated for example in FIG. to, subtracting matrix S·K·C (see reference sign 1002) from matrix S (see reference sign 1004) destroys the upper triangular form 1000t of the matrix S for all columns 1000c (see reference sign 1010), which correspond to non-zero elements of the vector C.

According to various embodiments, Algorithm (4) may be used for a rank-1 update, as described before.

According to various embodiments, similar to the algorithms described above, Algorithm (18) and Algorithm (4) may be applied to the modified Kalman filter (also referred to as infinity filter) as well as to the non-modified Kalman filter, or to any other similar filter. Since the Kalman filter may be a special case of the infinity filter, Algorithm (18) and Algorithm (4) may be applied to the Kalman filter by setting the infinite part of the error covariance matrix P to zero ($P_I=0$ and $F_I=0$).

According to various embodiments, the fast and numerically stable square root algorithm for propagating equations (60), (61), as described herein, may be used in a component of a control system and/or for monitoring discrete processes, as described above.

According to various embodiments, a fast and numerically stable square root algorithm is provided for the recursive matrix Equations (60), (61).

In the following, an algorithm for validation of process models that are tuned to real data is provided for a Kalman based filter or any other similar filter based for example on Equations (1), (1*), (2), (2*), as described above. As already described, according to various embodiments, the state of the process (1), (2) may be estimated by two sets of Equations (e.g. Equations (3) and (4) or Equations (8a) to (12d)) executed completely independently from each other.

In the following, an algorithm for validation of process models that are tuned to real data is provided for a Kalman based filter or any other similar filter based for example on Equations (1), (1*), (2), (2*), as described above. As already described, according to various embodiments, the state of the process (1), (2) may be estimated by two sets of Equations (e.g. Equations (3) and (4) or Equations (8a) to (12d)) executed completely independently from each other.

As described above, in general historical production data may be in practical situations an available source of information. Various algorithms for using a data-driven method to tune Kalman filter parameters based on the maximum likelihood estimation is already described above. According to various embodiments, the maximum likelihood estimation may be based on the Equations (46)-(49), as described above.

Figure 11:
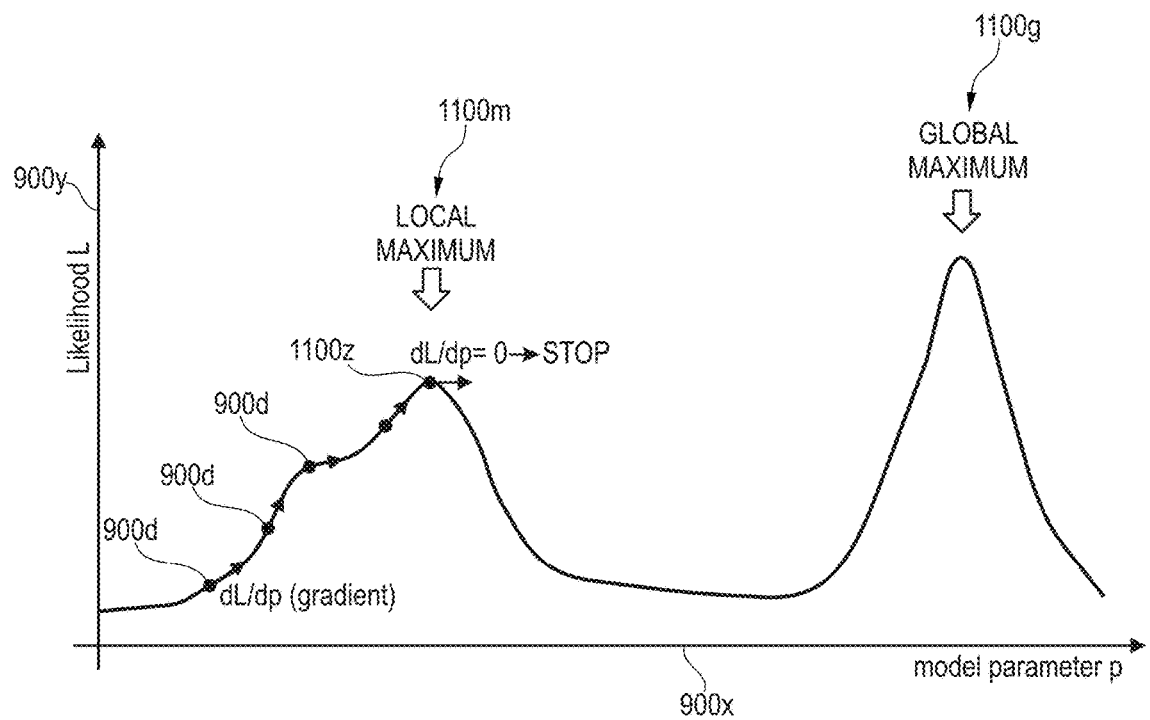
FIG. 11 shows a configuration of a data merging circuit in a schematic view, according to various embodiments.

As illustrated for example in FIG. 11 (cf. FIG. 9), the numerical optimization modifies the tuning parameters, p, iteratively in direction of steepest ascent of the log-likelihood, as already described. However, the optimization stops if the gradient is (e.g. approximately) zero, see reference sign 1100z.

Therefore, there is no guarantee that an optimization algorithm converges to a global maximum 1100g, since the optimization may stop also at local maximum 1100m. Further, in practical applications it may be not ensured that the chosen model structure fits to the actual data. Both aspects may lead to a misfit between the process model and the reality, which may cause yield loss and/or scrap during manufacturing. Therefore, according to various embodiments, various algorithms are provided to detect a model misfit reliably.

According to various embodiments, a model misfit may be detected or the process model may be validated based on the mean of squared normalized innovations, or in a similar way, based on any suitable mean value considering a plurality of symmetrized normalized prediction errors. The total likelihood L in for example Equation (46) is the sum of N individual sub-likelihoods $l_k$. Each sub-likelihood may be formulated for example as follows:

$$l_k = -\frac{1}{2}\left(\ln(F_{R,k}) + \frac{(y_k - C_k\hat{x}_{k-1} - D_k)^2}{F_{R,k}}\right) = -\frac{1}{2}\left(\ln(F_{R,k}) + \frac{v_k^2}{F_{R,k}}\right) \quad (65)$$

Figure 12:
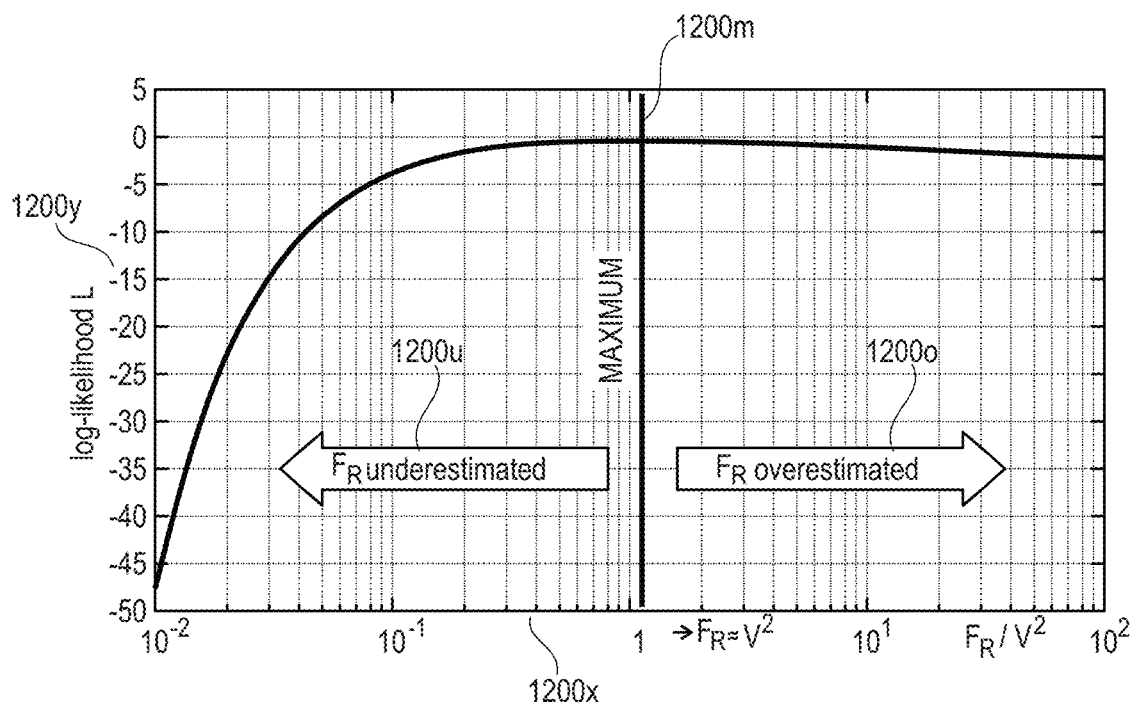
FIG. 12 shows a configuration of a data merging circuit in a schematic view, according to various embodiments.

In this case, k=1, 2, ..., N corresponds to a particular time instant k. The optimization algorithm may be configured to maximize all sub-likelihoods simultaneously in order to maximize the total likelihood L. FIG. 12 illustrates $l_k$ (see reference sign 1200y) vs. the ratio $F_{R,k}/v_k^2$ (see reference sign 1200x) for some fixed innovations $\tilde{o}_k$. In the case that the ratio $F_{R,k}/v_k^2$ is less than 1.0 the value of $F_{R,k}$ is underestimated (see reference sign 1200u) and in the case that ratio $F_{R,k}/v_k^2$ is greater than 1.0 the value of $F_{R,k}$ is overestimated (see reference sign 12000)

The maximum 1200m occurs for $F_{R,k}=v_k^2$, which is equivalent to $v_k^2/F_{R,k}=1$. The later condition can be rewritten for example as $v_{0,k}^2=1$ with $$v_{0,k} := \begin{cases} \frac{y_k - C_k\hat{x}_{k-1} - D_k}{\sqrt{F_{R,k}}} = \frac{v_k}{\sqrt{F_{R,k}}} & \text{if } F_{I,k}=0 \\ 0 & \text{otherwise} \end{cases} \quad (66)$$

According to various embodiments, the ratio $v_{0,k}^2$ according to Equation (66) may be a major aspect in the following and will be referred to as the normalized innovation, as already described above. The maximum of the log-likelihood L is equivalent to shifting all squared normalized innovations $\tilde{o}_{0,k}^2$; k=1, 2, ..., N as close as possible to 1.0. Therefore a proper (global) maximum of the likelihood function may be characterized for example by the following equation:

$$V_0 = \frac{1}{N_0}\sum_{k=1}^{N} v_{0,k}^2 \approx 1.0 \quad (67)$$

In this case, $N_0$ is the number of time instances k with $v_{0,k}\neq 0$.

According to various embodiments, a model misfit may be detected or the process model may be validated based on an observation of the normalized innovations, e.g. the normalized innovations or a parameter that represents the normalized innovations may be plotted vs. the counter index k (also referred to as time index k). According to various embodiments, the optimization algorithm described above shifts all normalized innovations $v_{0,k}^2$ as close as possible to 1.0. This is not possible when the model does not fit to the training data. Therefore, according to various embodiments, the model misfit may be checked by checking $|v_{0,k}|$ or $v_{0,k}^2$ for values that exceed 1.0 for example significantly (e.g. >3.0).

Figure 13:
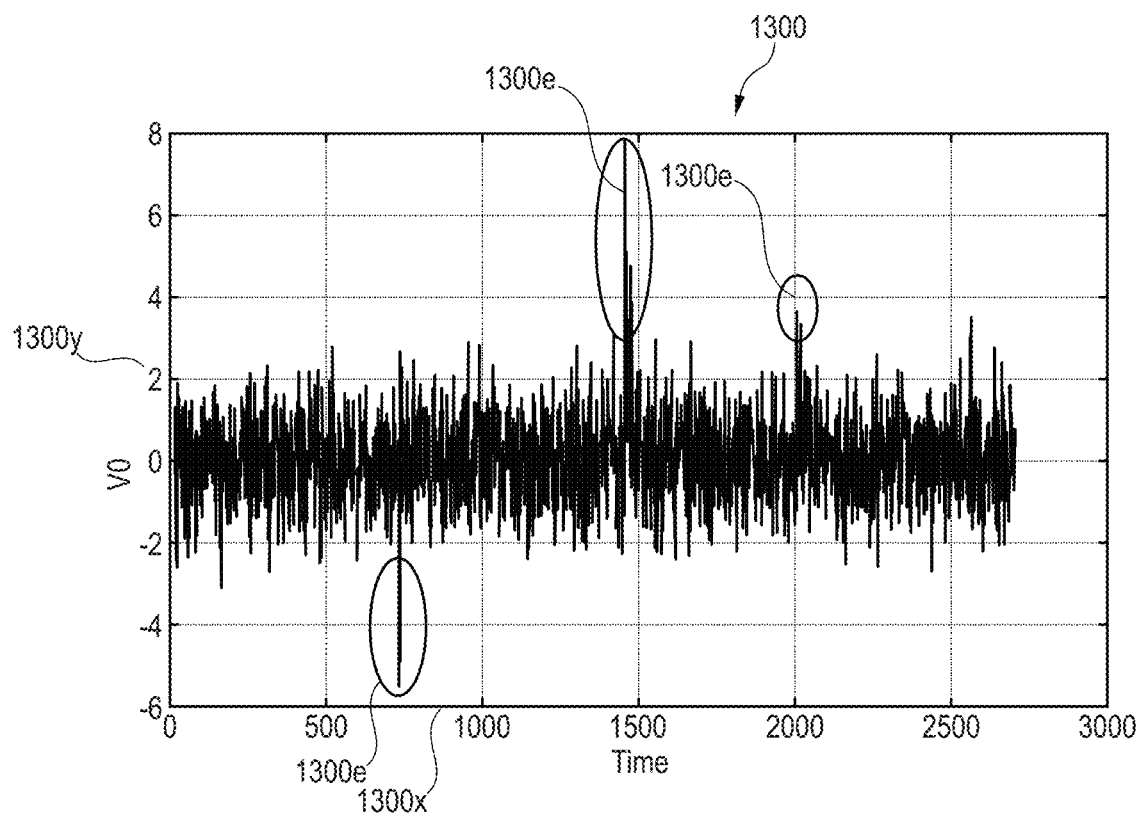
FIG. 13 shows a configuration of a data merging circuit in a schematic view, according to various embodiments.

FIG. 13 illustrates an example for an observation of the normalized innovations, $v_{0,k}^2$ (see reference sign 1300y), over the time (see reference sign 1300x), e.g. represented by the counter index k. In the case that the normalized innovation exceeds 1.0 for example significantly, see points 1300e, the process model may not be valid to describe the corresponding data.

According to various embodiments, the validation described above allows to specifically analyze problems of the process model at points (e.g. referring to specific processes that can be traced by the counter index k), where the process model may not be valid.

According to various embodiments, a model misfit may be detected or the process model may be validated based on observation of the sub-likelihood, e.g. the respective sub-likelihood values or a parameter representing the sub-likelihood may be plotted vs. the counter index k. The total likelihood, L, in Equation (46) decomposes into N individual sub-likelihoods, $l_k$. The model mismatch may be typically limited to some fraction of the training data. The individual sub-likelihood values will differ significantly in this case (high likelihood for data matching the model and low likelihood for data mismatching the model). Thus, checking the individual sub-likelihoods $l_k$ sequence for significant drop-downs may be a powerful test.

Figure 14:
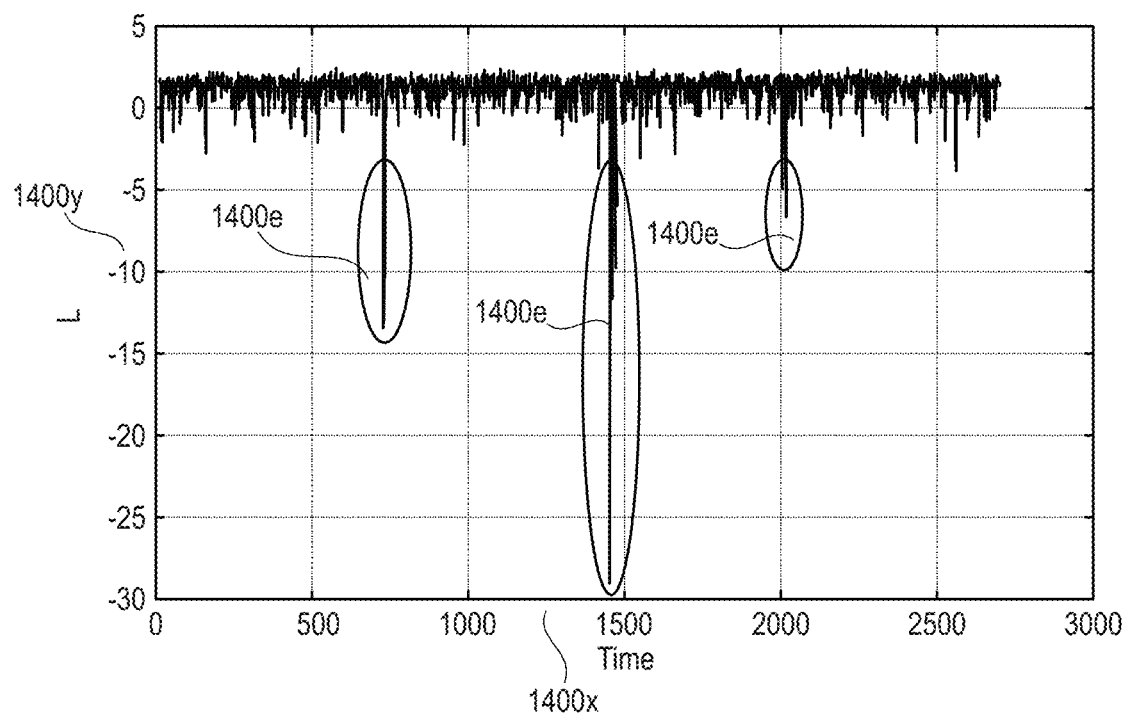
FIG. 14 shows a configuration of a data merging circuit in a schematic view, according to various embodiments.

FIG. 14 illustrates an example for an observation of the individual sub-likelihood, $l_k$, (see reference sign 1400$y$), over the time (see reference sign 1400$x$), e.g. represented by the counter index k. In the case that the sub-likelihood has for example a significant drop, see points 1400$e$, the process model may not be valid to describe the corresponding data.

According to various embodiments, a model misfit may be detected or the process model may be validated based on observation of the gradient signal, e.g. the gradient signal or a parameter representing the gradient signal may be plotted vs. the counter index k. The numerical optimization algorithm may exploit the partial derivative of the total likelihood, see Equation (46). Differentiating Equation (46) with respect to tuning parameter $p_i$ shows that the total gradient decomposes into N sub-gradients for example as follows:

$$\left.\frac{\partial L}{\partial p_i}\right|_{p=p^*} = \sum_{k=1}^{N} \frac{\partial L_k}{\partial p_i} \text{ with } \frac{\partial l_k}{\partial p_i} = \begin{cases} \frac{\partial l_k}{\partial p_i} & \text{if } F_{l,k} = 0 \\ 0 & \text{otherwise} \end{cases} \quad (68)$$

Each sub-gradient $\partial l_k/\partial p_i$ corresponds to a particular time instant k. The respective sub-gradient $\partial l_k/\partial p_i$ may be approximated by finite differences for example as follows (see set of Equations (50a) described above):

$$\left.\frac{\partial l_k}{\partial p_i}\right|_{p=p^*} \approx f[\Delta, l_k(p_i^*), l_k(p_i^* + \Delta), \quad (69)$$
$$l_k(p_i^* + 2\Delta), \ldots, l_k(p_i^* - \Delta), l_k(p_i^* - 2\Delta), \ldots]$$

$$\text{e.g., } \left.\frac{\partial l_k}{\partial p_i}\right|_{p=p^*} \approx \frac{l_k(p_i^* + \Delta) - l_k(p_i^* - \Delta)}{\Delta} \quad (69a)$$

Using the methods described above, the sub-gradients $\partial l_k/\partial p_i$ may be also calculated exactly, for example using the following equations:

$$\frac{\partial l_k}{\partial p_i} = -\frac{1}{2}tr\left[\overline{Q}_k^+ \frac{\partial \overline{Q}_k}{\partial p_i} + \frac{\partial \overline{Q}_k^+}{\partial p_i} \Omega_{Q,k}\right] - \frac{1}{2}tr\left[\overline{R}_k^+ \frac{\partial \overline{R}_k}{\partial p_i} + \frac{\partial \overline{R}_k^+}{\partial p_i} \Omega_{R,k}\right] \quad (70)$$

in the case that $p_i$ is associated with $\overline{Q}_k$, $\overline{R}_k$ (see Equation (51)), and $$\frac{\partial l_k}{\partial p_i} = \frac{v_k}{F_{R,k}}\left[C_k\left(A_k z_{k-1} + \frac{\partial B_k}{\partial p_i}\right) + \frac{\partial D_k}{\partial p_i}\right]. \quad (71)$$

in the case that $p_i$ is associated with $B_k$, $D_k$ (see Equation (55)).

According to various embodiments, the gradient signal may be analyzed at the maximal likelihood value found by the numerical optimizer. The corresponding sub-gradient $\partial l_k/\partial p_i$ shows how the tuning parameter $p_i$ should be modified to increase the sub-likelihood $l_k$ for the time instant k. Significant variations of $\partial l_k/\partial p_i$ over the time instant k may be a clear contradiction (e.g. the parameter $p_i$ needs to be increased for some time intervals and decreased for others). Checking the gradient signals of all tuning parameters $p_i$ may be a powerful test for a model mismatch, according to various embodiments. One possible consequence may be to split conspicuous tuning parameters $p_i$ into two or more parameters.

Figure 15:
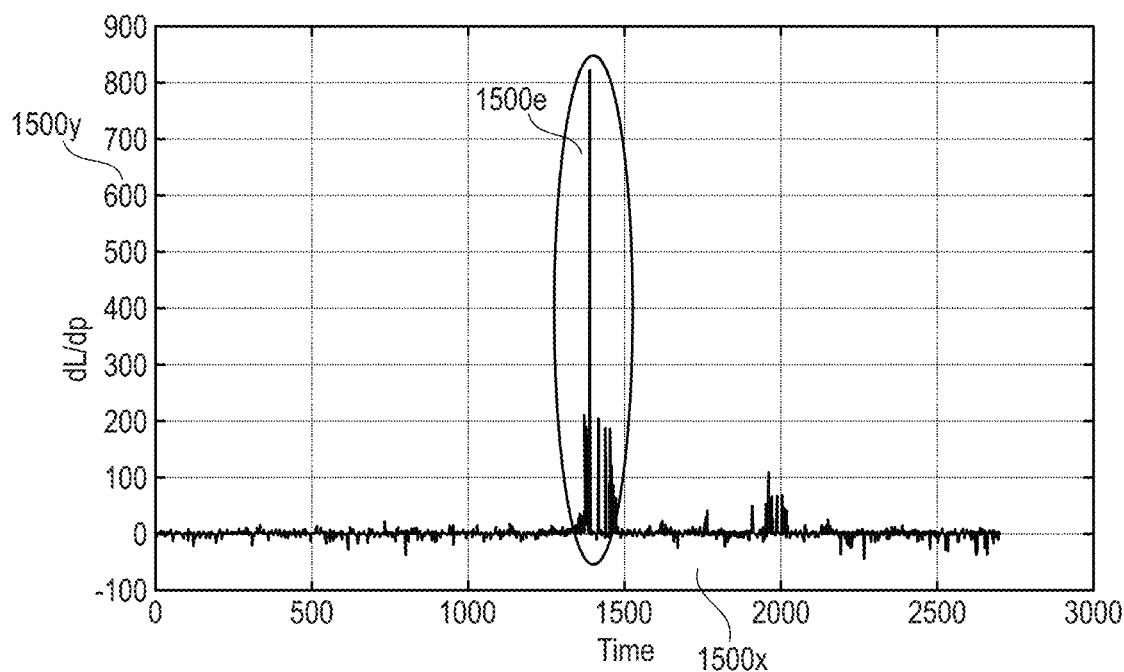
FIG. 15 shows a configuration of a data merging circuit in a schematic view, according to various embodiments.

FIG. 15 illustrates an example for an observation of a gradient signal, $\partial l_k/\partial p_i$, (see reference sign 1500$y$), over the time (see reference sign 1500$x$), e.g. represented by the counter index k. In the case that the gradient signal has for example a significant increase, see point 1500$e$, the process model may not be valid to describe the corresponding data.

According to various embodiments, a model mismatch may be identified based on one or more of the procedures described herein. After the optimizer stopped at some (possibly local) maximum, one or more of the following processes may be carried out:

1. Run the Kalman filter over the full training data set using the tuning parameters found by the optimizer. Store $F_{R,k}$, $F_{l,k}$ and the innovation sequence $\upsilon_k$.
2. Calculate the normalized innovations $\upsilon_{0,k}$ for all k=1, 2, ..., N with Equation (66).
3. Calculate $V_0$ with Equation (9). Reject the model if $|V_0-1.0|$ exceeds some threshold $T_1$ with e.g. $0.1 \leq T_1 \leq 0.3$.
4. Check sequence $\upsilon_{0,k}$ against some threshold $T_2$. Reject the model if $|\upsilon_{0,k}|$ exceeds $T_2$ for any k with e.g. $2 \leq T_2 \leq 5$. Try to modify the model for the time intervals where $T_2$ is exceeded.
5. Calculate the (sub-) likelihood sequence $l_k$ with Equation (65). Reject the model if $l_k$ shows significant drop-downs. Try to modify the model for the time intervals with drop-downs.
6. Calculate the (sub-) likelihood sequences for $\partial l_k/\partial p_i$ for all tuning parameters $p_i$. Reject the model if any sequence $\partial l_k/\partial p_i$ shows significant variations. Try to modify the model for the time intervals with major variations.

According to various embodiments, as for example described above, not only a model mismatch may be revealed but also the time instances, where the mismatch occurs, may be identified. This may be valuable information for improving the process model. The logistic context information (e.g. the process event data) for those time instances may be checked, according to various embodiments. Therefore, a common pattern could be determined to find the root cause of the model mismatch.

Similar to the algorithms described above, the process model validation may be applied to the modified Kalman filter as well as to the non-modified Kalman filter, or any other similar filter.

According to various embodiments, a process model mismatch may be detected based on at least one of the following parameters: the innovation, $v_{0,k}$, the normalized innovation, the (sub-) likelihood signal, or the (sub-) gradient signal. Further, the time or a parameter representing the time may be used to locate the process model mismatch.

According to various embodiments, a user interface may be provided as part of the process control circuit 100 or coupled to the process control circuit 100 to display at least one of the validation measures/signals $V_0$, $v_{0,k}$, $l_k$ or $\partial l_k/\partial p_i$, or representatives thereof, for example in combination with some feedback device for accepting or rejecting the tuned process models and/or measurement models.

As described above, the data merging circuit may be configured to validate the process model and/or the measurement model based on a mean value considering a plurality of symmetrized normalized prediction errors. A symmetrization may be useful to prevent that positive and negative values compensate each other. The symmetrized normalized prediction errors may be provided by applying a symmetric function on the normalized prediction errors. As an example, a root mean square (RMS) value may be used. According to various embodiments, the data merging circuit 108 may be configured to validate the process model and/or the measurement model based on an innovation signal, a likelihood signal and/or a likelihood-gradient signal for one or more process model parameters of the process model.

According to various embodiments, the data merging circuit may be configured to validate the process model based and/or the measurement model on a set of training data. The set of training data may include for example historical data including any available process data (e.g. context data and/or logistic data of the processing arrangement) and measurement data. The measurement data may be for example mapped to the process data or may be included in the process data.

Illustratively, the validation of the process model and/or the measurement model may include checking, if the available data set that is handled by the data merging circuit 108 are described properly via the underlying process model and/or the measurement model according to which the data merging circuit 108 operates.

According to various embodiments, reference measurement event data may be predicted via the data merging circuit 108 and newly acquired measurement event data may be compared with the predicted reference measurement event data. Based on this comparison, the process model and/or the measurement model may be validated, e.g. if the newly acquired measurement event data may be correct, the process model and/or the measurement model is not suitable to predict appropriate reference measurement event data and therefore does not described the process appropriately. Further, based on the comparison of the newly acquired measurement event data and the predicted reference measurement event data, the measurement event and/or the corresponding process event may be validated, e.g. the newly acquired measurement event data may be ruled out if the process model describes the process appropriately.

In the following, an algorithm is provided for tracking, monitoring and/or debugging of a Kalman based filter or any other similar filter based for example on Equations (1), (1*), (2), (2*), as described above. As already described, according to various embodiments, the state of the process (1), (2) may be estimated by two sets of Equations (e.g. Equations (3) and (4) or Equations (8a) to (12d)) executed completely independently from each other.

According to various embodiments, the unknown state $x_k$ may be estimated with a Kalman filter based algorithm implemented via the data merging circuit 108 of the process control circuit 100. In general, Kalman filter based systems may lack transparency, which may lead to the problem that for example process engineers may not use these filters for controlling processes in which a failure might have serious consequences. This is caused by the high complexity of the algorithms in a Kalman based filter compared to conventional approaches. For example, it may be not possible to retrace Equations (8a)-(12d) using simple means like paper and pencil. This may a handicap for the acceptance of a Kalman filter based controller by process engineers and the production personnel.

One reason for the complexity (and the at the same time for the power) of a Kalman filter based control system, as described herein, is the simultaneous update of all states and all possible state combinations. Process update and metrology update of any state combination may influence all other states. According to various embodiments, a tracing and debugging tool is provided that focuses on one or more particular (user defined) linear combination of states, as described in more detail below.

During operation of the data merging circuit 108 based on a Kalman filter, problems may occur often for particular linear state combinations. According to various embodiments, the analysis may be focused on this state combination. Limiting the analysis to a linear combination of states, according to various embodiments, reduces the complexity dramatically. The complicated behavior of the filter is exemplified by the more comprehensible behavior of the state combination.

The number of states and potential linear state combinations of interest may be typically very high. It may be not possible to calculate and store the evolution of all interesting states and state combination at run-time. According to various embodiments, various strategies are provided to reconstruct the complete evolution of the filter in retrospect. A first strategy may be to store all intermediate filter states incl. the corresponding error covariance matrices. A second strategy may be to store the initial state of the filter and all Kalman matrices; and to reconstruct all intermediate states, e.g. by re-running the respective Equations (e.g. Equations (8a)-(12d)). A third strategy may be to store intermediate states recurrently (incl. the corresponding error covariance matrices) and to store all Kalman matrices. In this case, any intermediate state can be reconstructed if desired by re-running the respective equations for the time interval of interest starting at an appropriate (e.g. the nearest) stored state.

The storage requirements may be tremendous for the first strategy. The second strategy may require to re-run the respective equations for the entire lifetime of the filter, which may be for example one or more years, resulting in a tremendous calculation effort. According to various embodiments, the third strategy may be used for tracking, monitoring and/or debugging of the operation of the filter used in the data merging circuit 108 of the process control circuit 100. The third strategy may be most efficient considering both storage requirements and computational speed.

Figure 16A:
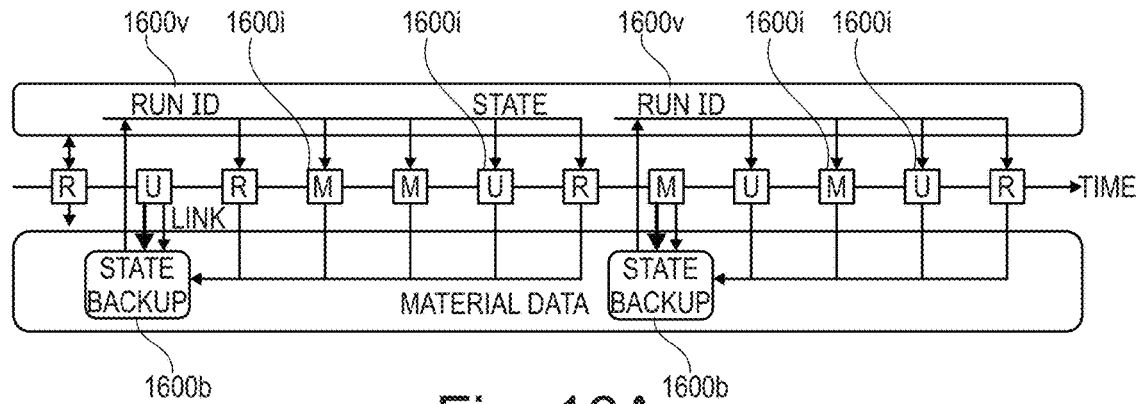
FIGS. 16A to 16C show various configurations of a data merging circuit, according to various embodiments.
Figure 16B:
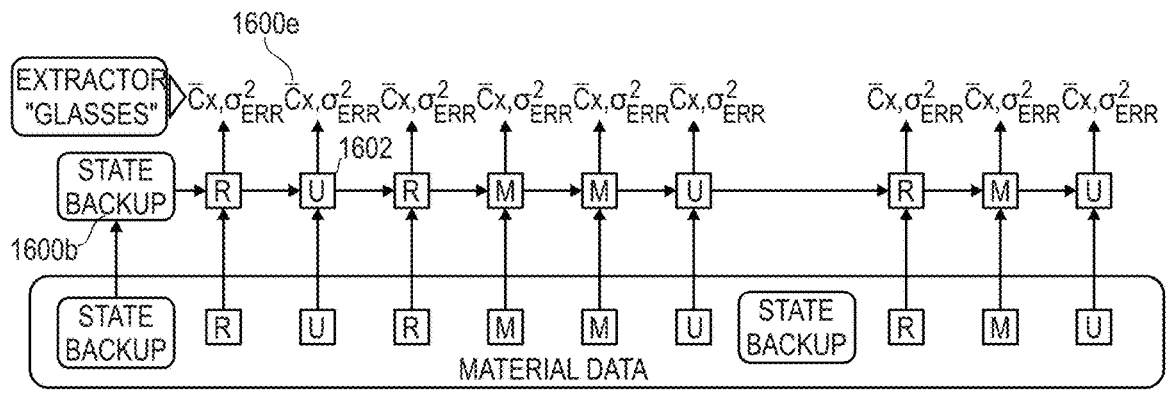
Figure 16C:
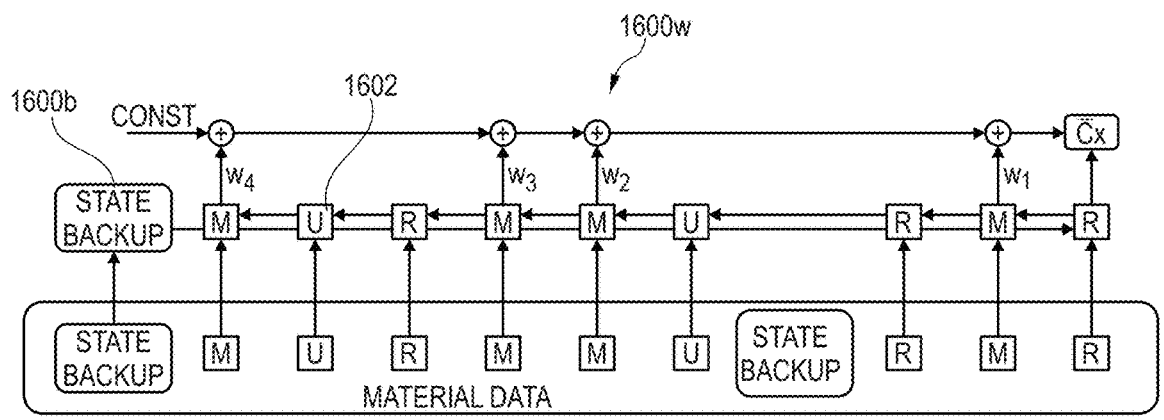

FIG. 16A to FIG. 16C illustrate the third strategy as a schematic operation diagram, according to various embodiments. Starting from a corresponding state backup 1600b, a desired intermediate state can be reconstructed by recalculation. The stored Kalman matrices 1600i may be used for the recalculation. The stored Kalman matrices 1600i may be correlated with the corresponding backup state 1600b via a corresponding identification value 1600v, also referred to as run-ID. The run-ID may be used to connect the data input (e.g. a process update, a measurement update, etc.) 1602 with the corresponding (e.g. nearest) backup-state. Therefore, the run-ID defines the starting point for recalculating a respective state. In the following, three important analysis and/or debugging use cases are described with reference to the third strategy.

According to various embodiments, a first use-case may include an in-depth analysis of an evolution of a linear state combination $\overline{C}x$ of interest. In this case, the linear combination of some states of interest $\overline{C}\hat{x}_k$ and the corresponding estimation error may be reconstructed. The analysis may be based for example on the following equations:

$$\alpha_k = \overline{C}\hat{x}_k \tag{72}$$

$$\sigma_{ERR}^2 = \begin{cases} \overline{C}P_{R,k}\overline{C}^T & \text{if } \overline{F}_I \leq L_{NUM} \\ \infty & \text{if } \overline{F}_I > L_{NUM} \end{cases} \tag{73}$$

$$\overline{F}_I = \overline{C}P_{I,k}\overline{C}^T \tag{74}$$

In this case, the extractor vector $\overline{C}$ (see reference sign 1600e) selects the states of interest and specifies the corresponding weighting factors, as illustrated for example in FIG. 16B in a schematic operation diagram. The analysis may be generic and flexible since a generic extractor vector may be used that can be adapted to all types of Kalman filter based models.

Therefore, according to various embodiments, the evolution of the linear state combination $\alpha_k$ may be examined. In this way, one or more time instances k may be identified, at which the linear state combination $\alpha_k$ and/or its estimation error changes. Those are the time instances, where new information are added to the linear state combination $\alpha_k$. Checking the corresponding logistical context information may reveal the root cause of problems that might occur while operating the Kalman based filter.

According to various embodiments, a second use-case may include an identification of dominant measurements for a linear state combination $\overline{C}x$. The Kalman filter/model may trust some measurements more than other measurements. It may be revealing to identify the corresponding measurements that influence a state combination $\alpha_k = \overline{C}\hat{x}_k$ of interest. According to various embodiments, influence information (or in other words the impact) may be used to crosscheck the plausibility of the process model. In addition, dominant measurements may be examined in detail to determine possible abnormalities. The Kalman gain $K_k$ may be directly related to the impact of a measurement and may be used as a criterion for monitoring, and the like. Since the absolute magnitude of the Kalman gain may be application dependent, a normalized version of the Kalman gain is provided herein that may be used as measure of the impact, according to various embodiments.

The Kalman gain, $K_k$, may be given for example by the following equations:

$$K_k = \frac{P_{k-1}C_k^T}{C_k P_{k-1} C_k^T + R_k^T} = \frac{E[\tilde{x}_{k-1} v_k]}{E[v_k^2]} \tag{75}$$

$$v_k = y_k - C_k \hat{x}_{k-1} - D_k \tag{76}$$

In this case, $v_k$ and $\tilde{x}_k$ are the innovation and the state estimation error respectively. Multiplying Equation (75) by the state extractor vector $\overline{C}$ results for example in the following equation:

$$\overline{C}K_k = \frac{E[\overline{C}\tilde{x}_{k-1} v_k]}{E[v_k^2]} \tag{77}$$

The numerator of Equation (77) reveals for example that the Kalman gain, $K_k$, is controlled by a covariance of $v_k$ and $\tilde{x}_k$. The Kalman gain $K_k$ is for example zero, when the innovation $v_k$ and the state estimation error $\tilde{x}_k$ are uncorrelated, while the absolute value of the Kalman gain $K_k$ is 1.0, when the innovation $v_k$ and the state estimation error $\tilde{x}_k$ are perfectly correlated. According to various embodiments, the correlation between the innovation $v_k$ and the state estimation error $\tilde{x}_k$ may be used to provide normalized impact measure, $K_{0,k}$, for example according to the following equations:

$$K_{0,k} := \text{corr}(\overline{C}\tilde{x}_{k-1}, v_k) \tag{78}$$

$$K_{0,k} = \frac{E[(\overline{C}\tilde{x}_{k-1}) \cdot v_k]}{\sqrt{E[(\overline{C}\tilde{x}_{k-1})^2] \cdot E[v_k^2]}} = \overline{C}K_k \cdot \sqrt{\frac{E[v_k^2]}{E[(\overline{C}\tilde{x}_{k-1})^2]}} \tag{79}$$

According to various embodiments, there may be one or more alternative definitions of the normalized impact measure, $K_{0,k}$, which may be equivalent to Equation (79), as for example the following definition:

$$|K_{0,k}| := \sqrt{\frac{E[(\overline{C}\tilde{x}_{k-1})^2] - E[(\overline{C}\tilde{x}_k)^2]}{E[(\overline{C}\tilde{x}_{k-1})^2]}} \tag{80}$$

$$|K_{0,k}| = \sqrt{\frac{\overline{C}P_{k-1}\overline{C}^T - \overline{C}P_k\overline{C}^T}{\overline{C}P_{k-1}\overline{C}^T}} \tag{81}$$

The expected value $E[(\overline{C}\tilde{x}_{k-1})^2]$ in Equation (80) is the estimation error variance for state combination $\alpha_k = \overline{C}\tilde{x}_k$. This leads to another intuitive interpretation of the normalized impact measure, $K_{0,k}$, namely that the squared gain $K_{0,k}^2$ is the relative reduction of the estimation error variance of $\alpha_{k-1}$ due to a measurement $y_k$.

According to various embodiments, Algorithm (19), as described in more detail below, may be used to calculate the normalized impact measure $K_{0,k}$, in the case that a dissected error covariance matrix is used for the state estimation, as described herein. If a conventional Kalman filter is used, $F_I$ and $\overline{F}_I$ can be set to zero in the Algorithm (19). Further, Algorithm (20), as described in more detail below, may be used in the case that a factorized error covariance matrix is used for the state estimation, as described above.

---

ALGORITHM 19:

1. Calculate $F_I := CP_{I,k-1}C^T$ and $\overline{F}_I := \overline{C}P_{I,k-1}\overline{C}^T$
2. if $|F_I| \leq L_{NUM}$ and $|\overline{F}_I| \leq L_{NUM}$ $$K_{0,k} = \frac{\overline{C}P_{R,k-1}C^T}{\sqrt{(\overline{C}P_{R,k-1}\overline{C}^T)(CP_{R,k-1}C^T + R_k^2)}}$$

else if $|F_I| > L_{NUM}$ and $|\overline{F}_I| > L_{NUM}$

-continued

ALGORITHM 19:

$$K_{O,k} = \frac{\overline{C}P_{I,k-1}C^T}{\sqrt{(\overline{C}P_{I,k-1}\overline{C}^T)(CP_{I,k-1}C^T)}}$$

else
$\quad K_{O,k} = 0$
end

ALGORITHM 20:

1. Calculate $m_I = S_{I,k-1}C_k^T$; $F_I = m_I^T m_I$
$\overline{m}_I = S_{I,k-1}\overline{C}^T$; $\overline{F}_I = \overline{m}_I^T m_I$
2. if $|F_I| \le L_{NUM}$ and $|\overline{F}_I| \le L_{NUM}$
$m_R = S_{R,k-1}C_k^T$; $F_R = m_R^T m_R + C_k P_0 C_k^T + R_k^2$
$\overline{m}_R = S_{R,k-1}\overline{C}^T$; $\overline{F}_R = \overline{m}_R^T m_R + \overline{C}^T P_0 \overline{C}$ $$K_{O,k} = \frac{\overline{m}_R^T m_R + \overline{C}P_0 C_k^T}{\sqrt{\overline{F}_R F_R}}$$

else if $|F_I| > L_{NUM}$ and $|\overline{F}_I| > L_{NUM}$ $$K_{O,k} = \frac{\overline{m}_I^T m_I}{\sqrt{\overline{F}_I F_I}}$$

else
$\quad K_{O,k} = 0$
end

According to various embodiments, a third use-case may include an analysis of a predicted value of interest. The Kalman filter based algorithms, as described above, may predict the process state in order to calculate optimal tuning parameters for next materials (lot, wafer, or batch). Thus, the origin of the predicted value may be relevant, in particular, when the value is suspicious. According to various embodiments, the current state $\hat{x}_k$ of the Kalman filter based algorithms may be decomposed into a weighted sum of all previous measurements and a constant. This may be expressed for example as follows:

$$\hat{x}_k = const + \sum_{i=1}^{k} w_i y_i \quad (82)$$

In this case, the weights $w_i$ of the sum may be calculated with Algorithm (21), as described in more detail below. Multiplying for example Equation (82) from the left with some state extractor vector $\overline{C}$ results in:

$$\overline{C}\hat{x}_k = const + \sum_{i=1}^{k} \overline{w}_i y_i \quad (83)$$

In this case, the left hand side of Equation (83) is the predicted value $\alpha_k := \overline{C}\hat{x}_k$, when $\overline{C}$ is the corresponding state extractor vector.

The weights $\overline{w}_i$ are scalars that can be for example conveniently plotted vs. time. Further, the weight $\overline{w}_i$ reveals the impact of a measurement $y_i$ on the prediction. This may be valuable information for operation the Kalman based filter. First, all measurements with significant impact may be identified and checked for abnormalities. Second, they can be used to correct the prediction quickly if erroneous measurements are found. Equation (83) shows for example that the prediction correction is a simple weighted sum of the measurement corrections, i.e.:

$$\alpha_{CORR,k} = \alpha_k + \Delta\alpha_k \quad (84)$$

$$\Delta\alpha_k = \sum_{i=1}^{k} \overline{w}_i \Delta y_i \quad (85)$$

The scalar weights $\overline{w}_i$ can be calculated using the recurrently stored states, as described above with reference to FIG. 16A, and for example Algorithm (22). The complete procedure is for example illustrated in FIG. 16C in a schematic operation diagram 1600w, according to various embodiments.

ALGORITHM 21:

1. Calculate $\hat{x}_k$ for k= 1, 2, ..., N using Equations (8a)-(12d). Store $K_k$ and $F_{I,k}$ for each k.
2. Initialization: $Z_N = I$
3. for k = N, N − 1, ..., 1
    if measurement $y_k$ is available
        $w_k = Z_k K_k$
        $Z_{k-1} = Z_k(I - K_k C_k)A_k$
    else
        $w_k = 0$
        $Z_{k-1} = Z_k A_k$
    end
end

ALGORITHM 22:

1. Calculate $\hat{x}_k$ for k = 1, 2, ..., N using Equations (8a)-(12d). Store $K_k$ and $F_{I,k}$ for each k.
2. Initialization: $z_N = \overline{C}$
3. for k = N, N − 1, ..., 1
    if measurement $y_k$ is available
        $\overline{w}_k = z_k K_k$
        $z_{k-1} = z_k(I - K_k C_k)A_k$
    else
        $\overline{w}_k = 0$
        $z_{k-1} = z_k A_k$
    end
end According to various embodiments, the algorithm for tracking, monitoring and/or debugging of a Kalman based filter may be used in a component of a control system and/or for monitoring discrete processes, as described above. According to various embodiments, intermediate states and/or Kalman matrices may be stored. Based on this stored intermediate states and/or the stored Kalman matrices, various tracking and/or debugging quantities, e.g. the estimate $\alpha_k$, the estimation error $\sigma_{ERR,k}$, the measurement impact $K_{O,k}$, the measurement weight $\overline{w}_i$, etc., may be calculated and/or plotted. This allows, for example, focusing on particular user defined linear combinations of states.

According to various embodiments, the data merging circuit 108 may be configured to store a plurality of backup state information and a plurality of backup model parameters (e.g. model parameters for time instance k, k−1, k−2) to reconstruct at least one state information to be monitored. Illustratively, historical model parameters may be used to reconstruct at least one state information to be monitored. The reconstruction of the at least one state information to be monitored may be efficient, as described above, when the recalculation starts from one of the stored plurality of backup state information that is near in time.

According to various embodiments, the data merging circuit 108 may be configured to decompose the state information into a weighted sum considering a plurality of previous measurement event data, a plurality of backup model parameters (e.g. process model parameters and measurement model parameters) and some suitable backup states.

According to various embodiments, a method is provided to reduce the size of Kalman filter data sets. Therefore, an algorithm is provided in the following for a Kalman based filter or any other similar filter based for example on the Equations (1), (1*), (2), (2*), as described above. As already described, according to various embodiments, the state of the process (1), (2) may be estimated by two sets of Equations (e.g. Equations (3) and (4) or Equations (8a) to (12d)) executed completely independently from each other.

According to various embodiments, the unknown state $x_k$ may be estimated with a Kalman filter based algorithm implemented via the data merging circuit 108 of the process control circuit 100. The filter state and error covariance matrix may mirror the accumulation and deterioration of the process information (decrease and increase and of estimation error) precisely as long as the process model parameters $Q_k$, $R_k$, $B_k$, $D_k$, $C_k$, $A_k$ fit to the real life process.

As already described, historical production data may be in practical situations an available source of information. Calculating the Kalman filter parameters from historical production data may be an expensive and time-consuming task. The historical data set may include several hundred thousand individual materials, e.g. produced wafers, and their corresponding process event data and, if available, measurement event data. The tuning procedure for the process model may be based on numerical optimization, which may require running the Kalman filter (and optional a gradient calculation) for each optimization step over the whole data set. Therefore, the model design process may be compromised because the high expenditure limits the number of model variations that can be tested.

In semiconductor manufacturing, for example, only a fraction of the processed wafers is measured (e.g. typically 20% or less). Therefore, according to various embodiments, the process Equations (1), (1*) may be aggregated in case of missing and/or non-validated measurements. As an example, measurements may be available for time instances $k_0$ and k, while they are missing for the intermediate time instances $k_0+1$, $k_0+2$, ..., k−2, k−1. Inserting the corresponding process equations into each other results for example in the following aggregated Equation (100) similar to Equation (1):

$$x_k = A_k A_{k-1} \ldots A_{k_0+1} x_{k_0} + \sum_{i=k_0}^{k-1} [A_k A_{k-1} \ldots A_{i+1} Q_i \xi_i] + \quad (100)$$

$$Q_k \xi_k + \sum_{i=k_0}^{k-1} [A_k A_{k-1} \ldots A_{i+1} B_i] + B_k$$

Equation (100) may be in fact a process equation that links the state information $x_{k_0}$ directly to the state information $x_k$. This process equation may be reformulated for example as follows:

$$x_k = \overline{A}_k x_{k_0} + \overline{Q}_k \overline{\xi}_k + \overline{B}_k \quad (100^*)$$

with $$\overline{A}_k = A_k A_{k-1} \ldots A_{k_0+1} \quad (101)$$

$$\overline{B}_k = \sum_{i=k_0}^{k-1} [A_k A_{k-1} \ldots A_{i+1} B_i] + B_k \quad (102)$$

$$E[\overline{Q}_k \overline{\xi}_k \overline{\xi}_k^T \overline{Q}_k^T] = \quad (103)$$

$$\overline{Q}_k \overline{Q}_k^T = \sum_{i=k_0}^{k-1} [A_k A_{k-1} \ldots A_{i+1} Q_i Q_i^T A_{i+1}^T \ldots A_{k-1}^T A_k^T] + Q_k Q_k^T$$

The aggregated Equation (100), (100*) are equivalent to the original k–$k_0$ intermediate process equations. According to various embodiments, replacing all intermediate process equations by aggregated equations may shrink the data set dramatically (e.g. by 80% and more, depending on the percentage of missing measurements).

According to various embodiments, the aggregated Kalman matrices $\overline{A}_k$ and $\overline{B}_k$ may be calculated with Equations (101) and (102) respectively. The Kalman filter may use the squared matrix $\overline{Q}_k \overline{Q}_k^T$, which is given for example directly by Equation (103). However, in the case that for example a square root filter is used, as described above, the underlying matrix $\overline{Q}_k$ may be calculated accordingly, e.g. using Algorithm (23). This can be done using for example the following algorithm:

Algorithm 23

1. Calculate M:=$\overline{Q}_k \overline{Q}_k^T$ using Equation (7)
2. Decompose M into Cholesky factors M=$SS^T$ using e.g. Cholesky algorithm or singular value decomposition
3. Result matrix $\overline{Q}_k$ is given by the Cholseky factor S According to various embodiments, all process noise matrices $Q_k$ and all state transition matrices $A_k$ may be diagonal matrices, e.g. in practical applications. In this case, the calculation is significantly simplified, as illustrated by Algorithm (24) as follows.

Algorithm 24

1. Calculate M:=$\overline{Q}_k \overline{Q}_k^T$ using Equation (103)
2. Element $\overline{Q}_k(i,i)$ of diagonal result matrix $\overline{Q}_k$ is given by $\sqrt{M(i,i)}$ According to various embodiments, the algorithm for reducing the size of a data set of a Kalman based filter provided herein may be used in a component of a control system and/or for monitoring discrete processes, as described above. According to various embodiments, the size of one or more tuning data sets may be shrinked by aggregating intermediate process equations not considering measurements. In other words, a consecutive sequence of process updates may be aggregated in the case that none of the process updates of the consecutive sequence is correlated to a measurement that has to be considered.

According to various embodiments, the data merging circuit 108 may be configured to provide an aggregated model parameter (e.g. process model parameter) for one or more of the model parameter respectively. In this case, the aggregated model parameter represents a plurality of model parameters of corresponding events for which an aggregation leads to the same result as for the non-aggregated events. As an example, a plurality of process model parameters according to a (e.g. consecutive) sequence of process events may be aggregated when no measurement events are to be considered for the sequence of process events.

In the following, an algorithm is provided for modelling a disruption or any other disturbance in the complex and dynamic process. As already described, a Kalman based filter or any other similar filter based for example on Equations (1), (1*), (2), (2*) may be used for controlling a production process. The state of the process (1), (2) may be estimated by two sets of Equations (e.g. Equations (3) and (4) or Equations (8a) to (12d)) executed completely independently from each other. The normalized innovations $v_0$ may be calculated for example based on the following equation:

$$v_0 = \frac{y_{k+1} - C_{k+1}\hat{x}_k - D_{k+1}}{\sqrt{C_{k+1}P_k C_{k+1}^T + R_{k+1}R_{k+1}^T}} \quad (104)$$

As described above, the normalized innovations or any other suitable parameter that represents the accuracy of the state estimation can be monitored. If the utilized process model (and/or measurement model) and the real process match, it may be very unlikely for the normalized innovations to deviate substantially from 3, e.g. that $|v_0|$ is greater than 3. According to various embodiments, a model mismatch may be assumed if $|v_0|$ exceeds some predefined threshold $L_y$ with $2 \leq L_y \leq 4$. In other words, the process model and/or the measurement model may be validated based on the normalized innovations $|v_0|$ or any other suitable parameter that represents the accuracy of the state estimation.

Figure 17A:
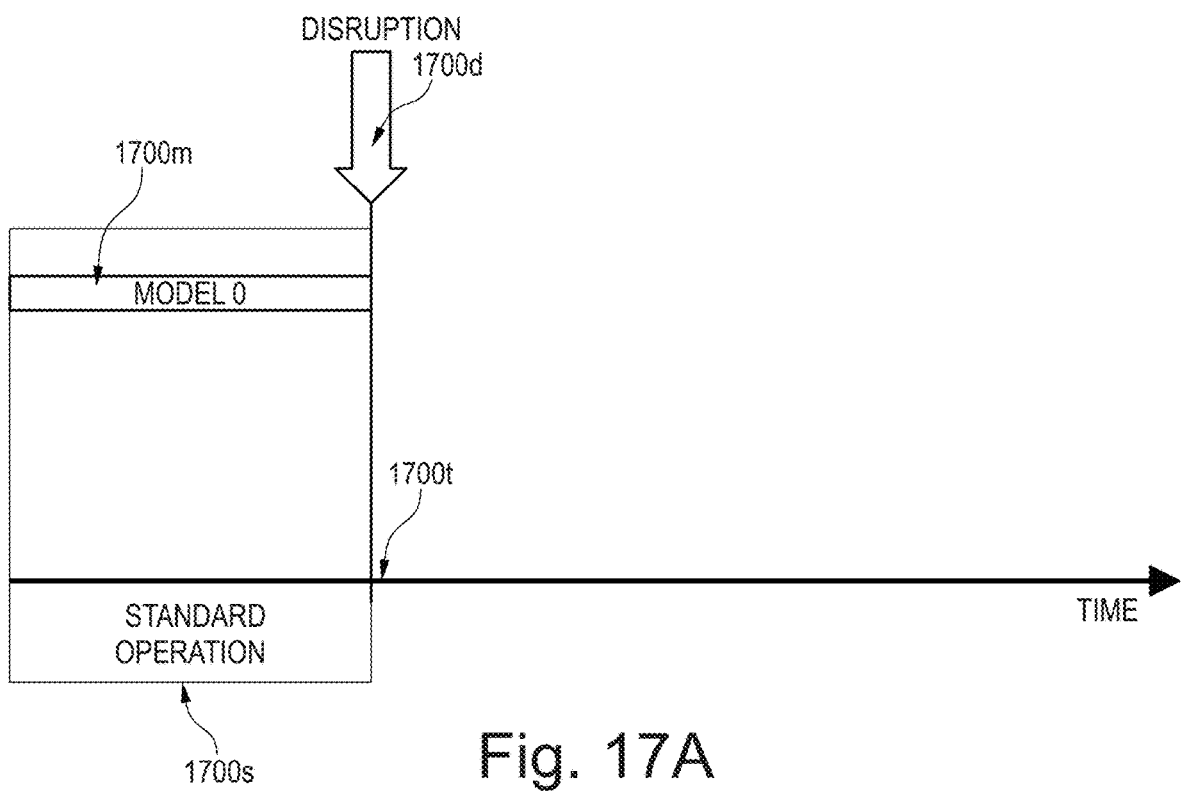
FIGS. 17A, 17B and 17C show various configurations of a data merging circuit in a schematic view, according to various embodiments.

In the following, a method is provided to validate the process model and/or the measurement model. According to various embodiments, a check for a model mismatch may be carried out when new measurement data are fed to the estimation algorithm. A model mismatch may occur for example after a maintenance event for a processing tool of the processing arrangement 104 or due to an erratic operation of a processing tool of the processing arrangement 104, and the like, which is referred to herein as a disruption. As illustrated for example in FIG. 17A in a schematic diagram, a standard operation 1700s of the filter may be disrupted 1700d at a certain point in time 1700t. During the standard operation 1700s, a corresponding process model 1700m may be used for operation of the filter.

Figure 17B:
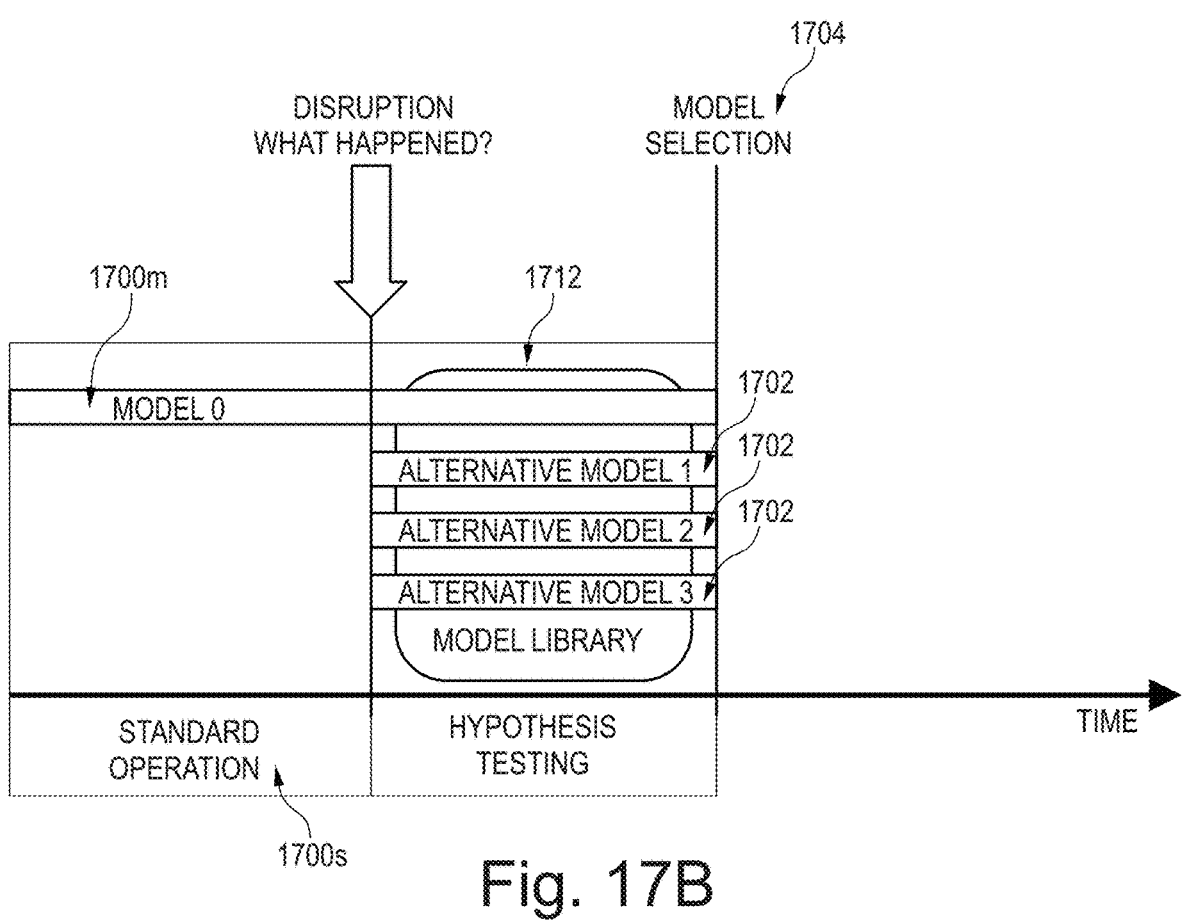

In the case that a model mismatch is detected, according to various embodiments, a set of alternative models 1702 is defined, as for example illustrated in FIG. 17B. Each of the alternative models 1702 may correspond to one possible root cause of the disruption. The alternative models 1702 and the process model 1700m used so far may be collected in a model library 1712. Further, according to various embodiments, the state estimate may be calculated for each model in the model library 1712. If necessary or helpful, the models may be adapted to the current data, e.g. with a maximum likelihood estimation, as described above. Further, according to various embodiments, the performance of the different models of the model library 1712 may be compared, e.g. by comparing the mean square prediction error, the likelihood (e.g. probability that model fits to the actual data) or an information criterion (e.g. Akaike information criterion, Bayesian information criterion), and the like. This may be also referred to as testing or validating the process models. Further, according to various embodiments, the model with the best performance may be selected 1704 based on the result of the testing. The procedure can be seen as testing different hypotheses about the root cause of the disruption and selecting a new process model in accordance with the best matching hypotheses.

In the case that the current data may be insufficiently for distinguishing the models to be selected, the selection may be delayed until new measurement data arrives. The new measurement data may be included in the test, which than may allow to distinguish the models. If sufficient data is available, the best process model may be selected. Therefore, a measurement or any other way to obtain additional data may be initiated to improve the selection of a suitable process model.

Figure 17C:
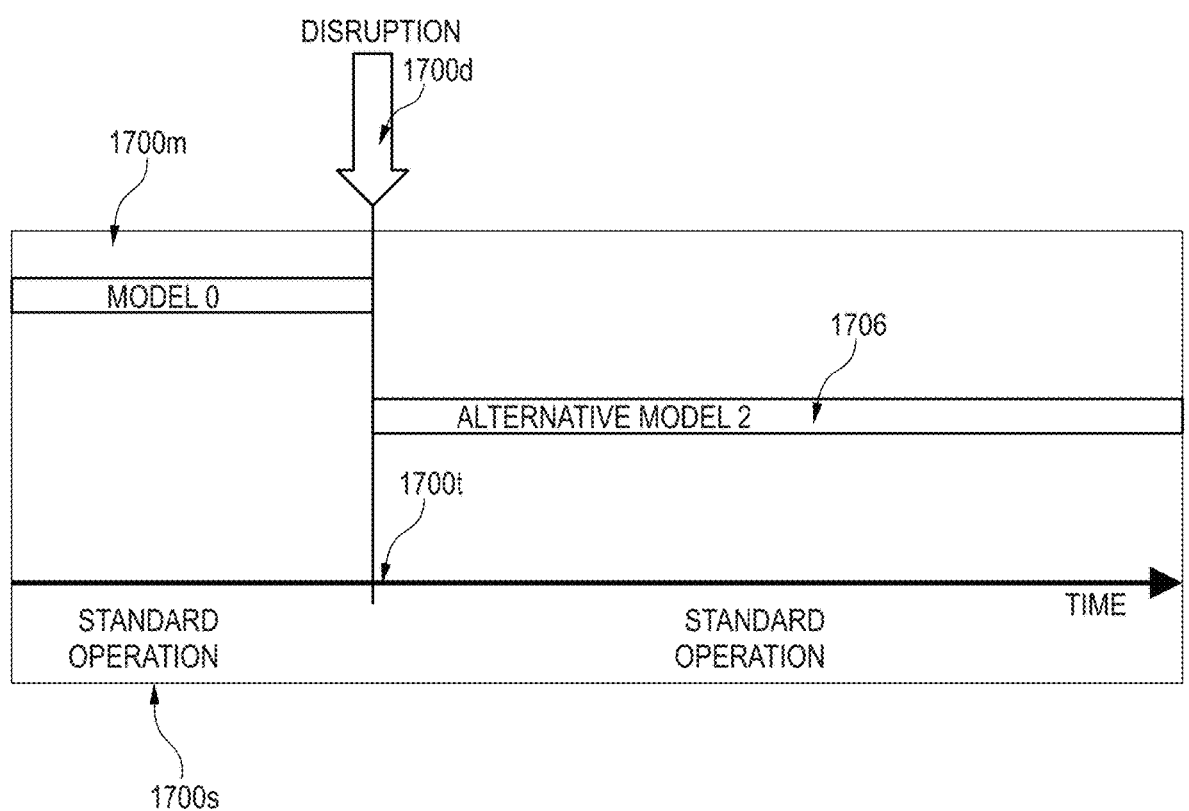

As for example illustrated in FIG. 17C, the selected model 1706 may be used for the further state estimation after the disruption 1700d. According to various embodiments, the state estimates may be recalculated if necessary starting from the time instant 1700t at which the disruption 1700d is detected to obtain a more accurate state information.

According to various embodiments, the modelling of a disruption or any other disturbance in a complex and dynamic process, e.g. in a semiconductor manufacturing process, provided herein may be used in a component of a control system and/or for monitoring discrete processes, as described above. According to various embodiments, the mismatch between the process model (and accordingly the measurement model) and real process data (and accordingly measurement data) may be monitored; and when a mismatch is detected, two or more alternative models (also referred to as disruption hypotheses) may be tested and, based on the result of the testing, a process model may be selected that matches the data best. According to various embodiments, the process model may include the corresponding process equations and the measurement equations.

According to various embodiments, the data merging circuit 108 may be configured to determine a model mismatch. For example, acquired measurement data may be validated based on a statistical error information.

Illustratively, a model mismatch may have various different reasons. According to various embodiments, the data merging circuit may be configured to provide a plurality of reference models according to the different reasons for a model mismatch, and to determine the reasons for the model mismatch by testing, whether at least one of the reference models may model the acquired measurement data appropriately. If no reference models can be found that model the acquired measurement data appropriately, for example, the operation of the filter may interrupted and an error message may be send. Alternatively, a reference model may be selected that fits best.

According to various embodiments, the data merging circuit may be configured to select a first reference model of a plurality of reference model and to recalculate the state information based on the selected first reference model and to determine a first model match parameter, and select a second reference model of a plurality of reference model and to recalculate the state information based on the selected second reference model and to determine a second model match parameter, and to compare the first model match parameter with the second model match and to select the first or second model for further operation based on the comparison. The model match parameter may be a statistical error information, e.g. the ratio normalized innovation, according to various embodiments.

Figure 18:
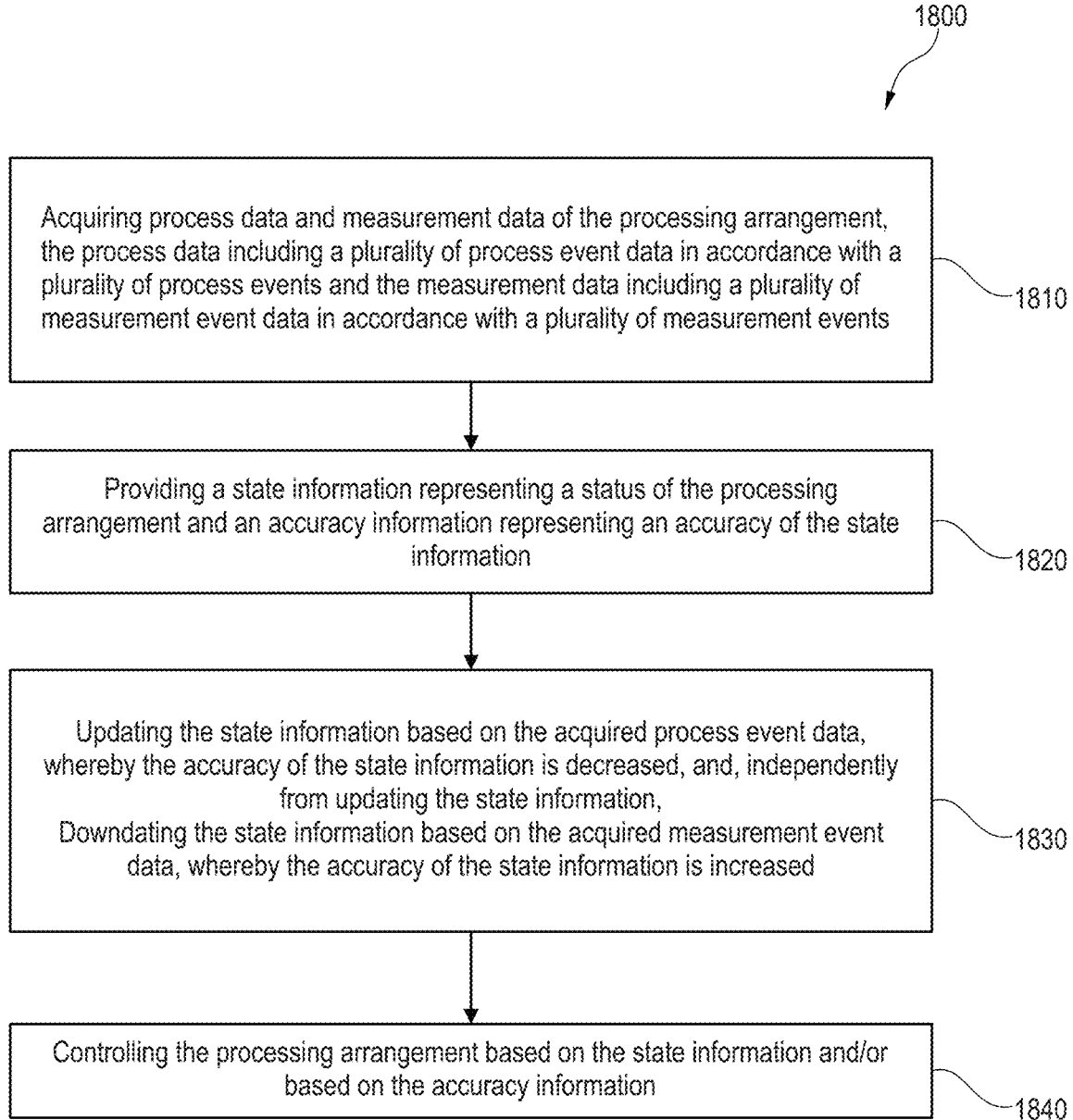
FIG. 18 shows a schematic flow diagram of a method for operating a process control circuit, according to various embodiments.

According to various embodiments, a method 1800 for controlling a processing arrangement, e.g. process control circuit 100 as described herein, may be provided, as illustrated in FIG. 18 in a schematic process flow. According to various embodiments, the method 1800 may include: in 1810, acquiring process data and measurement data of the processing arrangement, the process data including a plurality of process event data in accordance with a plurality of process events and the measurement data including a plurality of measurement event data in accordance with a plurality of measurement events; in 1820, providing state information representing a status of the processing arrangement and accuracy information representing an accuracy of the state information; in 1830, updating the state information based on the acquired process event data, whereby the accuracy of the state information is decreased, and, independently from updating the state information, downdating the state information based on the acquired measurement event data, whereby the accuracy of the state information is increased, and, in 1840, controlling the processing arrangement based on the state information.

According to various embodiments, the method 1800 may further include one or more of the algorithms and methods described herein, for example:

To provide the state information and the accuracy information accordingly,

To update and downdate the state information accordingly, and/or

To control the processing arrangement accordingly.

According to various embodiments, one or more aspects of the process control circuit 100 may be implemented in software, e.g. based on MATLAB® software or any other suitable software. The algorithms described herein are provided in pseudocode to provide main aspects to be implemented via any suitable programming environment.

According to various embodiments, a method may include using one or more of the algorithms described herein, e.g. for calculating one or more parameters or any other desired value as described herein.

According to various embodiments, the one or more functionalities described above with reference to a process control circuit 100 or to a data merging circuit 108 may be also understood as a method or part of a method to control a suitable system, e.g. a processing arrangement 104.

Since the modelling of the processes may be correlated to the modelling of the measurements, within the description the terms "process model" or "model" may be used, for sake of brevity, to mean for example the process model and/or the measurement model, accordingly. In the same way, the terms "process model parameter" or "model parameter" may be used, for sake of brevity, to mean for example the process model parameter and/or the measurement model parameter, accordingly. In the same way, the term "process" with may be used, for sake of brevity, to mean for example any aspect to be considered regarding the operation of the processing arrangement 104, including for example processing tool and measurement tools. The term "data" may be used herein to mean for example any information to be considered regarding for example the processing arrangement 104, including for example processing data, measurement data, tuning data, and the like, as for example contextual/logistical data (specific product, reticle, . . . ) and data (process and measurement) of previous process steps (including pre-process chamber/tool, pre-process in-line (measurement) data, pre-process contextual/logistical data, pre-process processing time). For example, additional data may be provided based on the operation of the algorithm that may define the operation of the data merging circuit 108, e.g. monitoring data, debugging data, tracking data, validation data, and the like. It is understood that suitable means for data processing, data storing, and for displaying data, are used, as desired.

In the following, various examples are provided referring to the process control circuit and the method for operating a process control circuit, as described above, and in a similar way to a non-transitory computer readable medium.

Various examples are related to modelling and prediction of production processes (e.g. batch production processes) in a complex and dynamic manufacturing environment.

Example 1 is a process control circuit including: a data acquisition circuit configured to acquire process data and measurement data of a processing arrangement, the process data including a plurality of process event data in accordance with a plurality of process events and the measurement data including a plurality of measurement event data in accordance with a plurality of measurement events; a data merging circuit configured to provide state information, the state information representing a status of the processing arrangement, and accuracy information (P) representing an accuracy of the state information; wherein the data merging circuit is further configured to update the state information (e.g. performing a process update) based on the acquired process event data, whereby the accuracy of the state information is decreased, and, independently from updating the state information, to downdate the state information (e.g. performing a metrology update) based on the acquired measurement event data, whereby the accuracy of the state information is increased, and a control circuit configured to control the processing arrangement based on the state information (X, etc.) and/or the accuracy information ($\Delta X$, P, etc.).

Various examples are related to a process model for modelling and prediction of production processes (e.g. batch production processes) in a complex and dynamic manufacturing environment.

In Example 2, the process control circuit according to Example 1 optionally includes that the data merging circuit is further configured to update the state information based on a process model considering process model parameters (e.g. accessible model parameter, A and/or B) and process model estimation parameters (e.g. non-accessible model parameter, N and/or Q).

In Example 3, the process control circuit of Example 1 or 2 may optionally include that the data merging circuit is further configured to downdate the state information based on a measurement model considering measurement model parameters (e.g. accessible measurement model parameter, C and/or D) and measurement model estimation parameters (e.g. non-accessible measurement model parameter, M and/or R).

In Example 4, the process control circuit of any one of the preceding Examples may optionally include that the control circuit is further configured to control the processing arrangement based on both the state information (X, etc.) and the accuracy information ($\Delta X$, P, etc.).

In Example 5, the process control circuit of any one of the preceding Examples may optionally include that the control circuit is further configured to provide process control data to control the processing arrangement based on the state information (X, etc.) and/or based on the accuracy information ($\Delta X$, P, etc.).

In Example 6, the process control circuit of any one of the preceding Examples may optionally include that the control circuit is further configured to provide monitoring data based on the state information (X) and/or the accuracy information (ΔX, P, etc.) According to various embodiments, the monitoring data may be used to monitor at least one of the processing arrangement, the data acquisition circuit, and/or the data merging circuit.

In Example 7, the process control circuit of any one of the preceding Examples may optionally include that the data merging circuit is configured to provide the accuracy information (ΔX) based on a statistical estimation error (P, σ, σ 2, v, etc., as described herein).

In Example 8, the process control circuit of any one of the preceding Examples may optionally include that the data merging circuit is configured to merge the process data and the measurement data based on a Kalman-Filter to provide (or on other words to estimate) the state information (X and ΔX).

In Example 9, the process control circuit of any one of the preceding Examples may optionally include that the data merging circuit is further configured to update and downdate the state information for each of the acquired process event data and each of the acquired process measurement data in a chronological order defined by the process events, wherein the measurement events are mapped to the process events.

In Example 10, the process control circuit of any one of the preceding Examples may optionally include that the data merging circuit is configured to update the state information for each of the plurality of process events upon acquiring the corresponding process event data and for each of the plurality of measurement events upon acquiring the corresponding measurement event data.

In Example 11, the process control circuit of any one of the preceding Examples may optionally include that the data merging circuit is configured to collect a plurality of process event data of corresponding process events and to update the state information considering the collected plurality of process event data upon acquiring measurement event data of a subsequent measurement event, and downdating the state information based on the acquired measurement event data. Illustratively, the process update may be executed at the latest when measurement event data of a measurement event to be considered are available.

Various examples are related to the adaption of recursive estimation and prediction algorithms to production scenarios with delayed and permuted measurements.

In Example 12, the process control circuit of any one of the preceding Examples may optionally include that the data acquisition circuit is further configured to correlate (e.g. to map) the measurement events with corresponding process events. Therefore, at least one tuple may be provided based on at least one process event and at least one measurement corresponding to the process event. The tuple may be assigned to a product, e.g. to a wafer, to an electronic device, and the like.

In Example 13, the process control circuit of any one of the preceding Examples may optionally include that the data merging circuit is further configured to calculate a current state information based on process event data of a current process event and of a sequence of previous process events and/or measurement events.

In Example 14, the process control circuit of any one of the preceding Examples may optionally include that the data merging circuit is further configured to calculate a current state information based on process event data of a current process event and of a sequence of previous process evens (e.g. and previous measurement events), and to recalculate the current state information upon acquiring measurement event data corresponding to at least one previous process event of the sequence of previous process events.

In Example 15, the process control circuit of Example 14 may optionally include that the sequence of previous process events includes a limited number of process events starting from an initial process event defining a base state information and ending with the current process event defining the current state information.

In Example 16, the process control circuit of Example 15 may optionally include that the initial process event is selected to be a first element in the sequence of previous process events for which no corresponding measurement event data are available and for which the corresponding measurement event data are pending.

Various examples are related to a process model for a recursive estimation and prediction algorithm.

In Example 17, the process control circuit of any one of the preceding Examples may optionally include that the data merging circuit is further configured to model the process data based on a process model including one or more process model parameter for modelling known influences (A and/or B), and/or one or more a process estimation parameter for modelling unknown influences (N).

In Example 18, the process control circuit of any one of the preceding Examples may optionally include that the data merging circuit is further configured to model the measurement data based on one or more measurement model parameter for modelling known influences (C and/or D), and/or one or more a measurement estimation parameter for modelling unknown influences (M).

According to various embodiments, the one or more equations or algorithms for modeling the processes are independent from the one or more equations or algorithms for modeling the measurements.

In Example 19, the process control circuit of any one of the preceding Examples may optionally include that the data merging circuit is further configured to model the process data based on a (e.g. linear time variant state space) process model including at least one of the following process model parameters: a state transition parameter (A), a process noise parameter (N), and/or a process drift parameter (B).

In Example 20, the process control circuit of any one of the preceding Examples may optionally include that the data merging circuit is further configured to model the process data based on the following equation and/or a similar equation:

$$x_{k+1}=A_{k+1}x_k+N_{k+1}+B_{k+1},$$

wherein $x_{k+1}$ is a state vector, $x_k$ is a previous state vector, $A_{k+1}$ is a state transition matrix, $N_{k+1}$ is a process noise vector, $B_{k+1}$ is a process drift vector, and wherein k is a counter variable.

In Example 21, the process control circuit of Example 20 may optionally include that $N_{k+1}=Q_{k+1}\xi_{k+1}$, wherein $\xi_{k+1}$ is a random vector representing process noise (e.g. with $E[\xi]=0$; $E[\xi^2]=I$) and $Q_{k+1}$ is a noise scaling matrix.

In Example 22, the process control circuit of any one of the preceding Examples may optionally include that the data merging circuit is further configured to model the measurement data based on a measurement model including at least one of the following measurement model parameters: an observation parameter (C), a measurement noise parameter (M), and/or a measurement offset parameter (D).

In Example 23, the process control circuit of any one of the preceding Examples may optionally include that the data merging circuit is further configured to model the measurement data based on the following equation and/or a similar equation:

$$y_{k+1}=C_{k+1}x_{k+1}+M_{k+1}+D_{k+1},$$

wherein $y_{k+1}$ is a scalar measurement value or a measurement vector, $C_{k+1}$ is an observation vector or an observation matrix (e.g. describing the contribution of the elements of state vector $x_{k+1}$ to $y_{k+1}$), $M_{k+1}$ is a measurement noise scalar or a measurement noise vector, and $D_{k+1}$ is a measurement offset scalar or a measurement offset vector, and wherein k is a counter variable.

In Example 24, the process control circuit of Example 23 may optionally include that $M_{k+1}=R_{k+1}\eta_{k+1}$, wherein $\eta_{k+1}$ is a scalar random value or a random vector representing measurement noise (e.g. with $E[\eta]=0$; $E[\eta^2]=I$) and $R_{k+1}$ is a noise scaling scalar or noise scaling matrix.

In Example 25, the process control circuit of any one of the preceding Examples may optionally include that the data merging circuit is further configured to update the state information based on a first set of equations and to downdate the state information based on a second set of equations, wherein the equations of the first set of equations are executed independent from the equations of the second set of equations.

In Example 26, the process control circuit of Example 25 may optionally include that the first set of equations is based on the following equations and/or a similar equations:

$$\hat{x}_{k+1}=A_{k+1}\hat{x}_k+B_{k+1},$$

$$P_{k+1}=A_{k+1}P_kA_{k+1}^T+Q_{k+1}Q_{k+1}^T,$$

wherein $P_k$, $P_{k+1}$ is an error covariance matrix (i.e. previous and updated error covariance matrix) and $\hat{x}_k$ is the state information and $\hat{x}_{k+1}$ is the estimated state information (i.e. $\hat{x}_k$ is the previous and $\hat{x}_{k+1}$ is the updated state estimate).

In Example 27, the process control circuit of Example 25 or 26 may optionally include that the second set of equations is based on the following equations and/or a similar equations:

$$\hat{x}_{k+1}=\hat{x}_k+K_{k+1}(y_{k+1}-C_{k+1}\hat{x}_k-D_{k+1})$$

$$P_{k+1}=(I-K_{k+1}C_{k+1})P_k$$

$$K_{k+1}=P_kC_{k+1}^T(C_{k+1}P_kC_{k+1}^T+R_{k+1}R_{k+1}^T)^{-1},$$

wherein $K_{k+1}$ is a feedback gain vector, and I is an identity matrix.

According to various embodiments, it is understood that other equivalent formulations of the same equations may be obtained.

In Example 28, the process control circuit of any one of the preceding Examples may optionally include that a statistical error information of the estimated state information includes an estimation error variance, $\sigma^2_{ERR}$, based on the following equation and/or a similar equation:

$$\sigma_{ERR}^2=\overline{C}P_{k+1}\overline{C}^T,$$

wherein $P_{k+1}$ is an error covariance matrix, and $\overline{C}$ is a state extractor vector.

In Example 29, the process control circuit of any one of the preceding Examples may optionally include that the data merging circuit is further configured to provide predicted measurement event data ($y_{k+1}$) for a subsequent measurement event with a corresponding (measurement) prediction error information.

In Example 30, the process control circuit of Example 29 may optionally include that the (measurement) prediction error information of the predicted measurement event data is statistical error information.

In Example 31, the process control circuit of Example 29 or 30 may optionally include that the predicted measurement event data is based on the combination of one or more elements of the estimated state vector.

In Example 32, the process control circuit of any one of Examples 29 to 31 may optionally include that the data merging circuit is further configured to validate the state information and/or a process model based on the accuracy information of the predicted measurement event data.

In Example 33, the process control circuit of any one of Examples 29 to 32 may optionally include that the data merging circuit is further configured to validate the state information and/or the process model based on the statistical error information of the predicted measurement event data.

In Example 34, the process control circuit of any one of the preceding Examples may optionally include that the data merging circuit is configured to validate acquired measurement data based on accuracy information of predicted measurement event data. The data merging circuit may be configured to validate the acquired measurement data based on statistical error information of the predicted measurement event data.

In Example 35, the process control circuit of any one of the preceding Examples may optionally include that the data merging circuit is configured to validate acquired measurement data by calculating a prediction error (also referred to as innovation).

In Example 36, the process control circuit of Example 35 may optionally include that the prediction error, v, is calculated based on the following equation and/or a similar equation:

$$v=y_{k+1}-C_{k+1}\hat{x}_k-D_{k+1}.$$

In Example 37, the process control circuit of any one of the preceding Examples may optionally include that the data merging circuit is configured to validate acquired measurement data by calculating a ratio normalized innovation and by comparing the calculated ratio normalized innovation with a reference value.

In Example 38, the process control circuit of Example 37 may optionally include that the ratio normalized innovation, v0, is calculated based on the following equation and/or a similar equation:

$$v_0 = \frac{y_{k+1} - C_{k+1}\hat{x}_k - D_{k+1}}{\sqrt{C_{k+1}P_kC_{k+1}^T + R_{k+1}R_{k+1}^T}}.$$

In Example 39, the process control circuit of any one of the preceding Examples may optionally include that the data merging circuit is configured to provide estimated measurement data using a process model and a measurement model to check for a mismatch between the measurement data and the estimated measurement data.

In Example 40, the process control circuit of any one of the preceding Examples may optionally further include a communication circuit configured to provide (e.g. to generate and to send) an alarm message in the case that a mismatch according to Example 39 is detected.

Various examples are related to a cope with complex ambiguities.

In Example 41, the process control circuit of any one of the preceding Examples may optionally include that the data merging circuit is further configured to determine the accuracy information based on an estimation error, wherein the estimation error is dissected into a finite part and into an infinite part.

In Example 42, the process control circuit of Example 41 may optionally include that the estimation error is determined via an error covariance matrix (P) or an inverted error covariance matrix ($P^{-1}$, also referred to as information matrix).

In Example 43, the process control circuit of Example 42 may optionally include that the error covariance matrix or the inverted error covariance matrix is dissected into a finite part ($P_R$) and into an infinite part ($P_I$).

In Example 44, the process control circuit of Example 42 or 43 may optionally include that the error covariance matrix (or the inverted error covariance matrix) is dissected according to the following equation and/or a similar equation:

$$P_k = P_{R,k} + \kappa \cdot P_{I,k},$$

with $\kappa \to \infty$.

In Example 45, the process control circuit of any one of the preceding Examples may optionally include that the data merging circuit is further configured to downdate the state information based on a first set of downdate equations in a first case and on a second set of downdate equations in a second case, wherein the first case and the second case are discriminated from each other via a discrimination criterion.

In Example 46, the process control circuit of any one of the preceding Examples may optionally include that the data merging circuit is further configured to calculate the prediction error for new measurements and to check whether the prediction error contains infinite parts.

In Example 47, the process control circuit of any one of the preceding Examples may optionally include that the data merging circuit is further configured to calculate estimated measurement data and a corresponding prediction error and to check whether the prediction error contains infinite parts.

In Example 48, the process control circuit of any one of the preceding Examples may optionally include that the data merging circuit is further configured to downdate the state information for a measurement vector via a plurality of single scalar downdates.

In Example 49, the process control circuit of Example 48 may optionally include that for each of the single scalar downdates it is checked, whether the corresponding measurement prediction error contains infinite parts.

In Example 50, the process control circuit of any one of the preceding Examples may optionally include that the data merging circuit is further configured to check whether the measurement prediction error (or in other words the prediction error for new measurements) contains infinite parts based on a numeric reference value, $L_{NUM}$.

In Example 51, the process control circuit of Example 50 may optionally include that a first set of downdate equations is used to downdate the state information when $|F_{I,k+1}| > L_{NUM}$, and that a second set of downdate equations is used to downdate the state information when $|F_{I,k+1}| \leq L_{NUM}$ with:

$$F_{I,k+1} := C_{k+1} P_{I,k} C_{k+1}^T.$$

In this case, $F_{I,k+1}$ corresponds to the infinite part of the prediction error.

Illustratively, observation parameter C in Example 51 selects a product and a measurement tool.

Various examples are related to a robust discrimination between finite und infinite measurement prediction variance.

In Example 52, the process control circuit of any one of the preceding Examples may optionally include that the data merging circuit is further configured to provide a discrimination value based on an observation parameter C and an error covariance matrix P and to compare the discrimination value with a reference value, $L_{NUM}$.

In Example 53, the process control circuit of Example 52 may optionally include that the observation parameter C is factorized.

In Example 54, the process control circuit of Example 53 may optionally include that the observation parameter C is an observation vector C that is factorized based on the following equation and/or a similar equation:

$$C = C_0 \cdot |C|,$$

with $C := C_{k+1}$ and $|C_0| = 1$.

The factorization according to Example 54 leads for example to $$F_{I0,k} = C_0 P_{I,k} C_0^T.$$

According to various embodiments, the $F_{I0,k}$ may be used as a discrimination criterion.

Various examples are related to applying a square root factorization.

In Example 55, the process control circuit of any one of the preceding Examples may optionally include that the error covariance matrix or the inverted error covariance matrix (also referred to as information matrix) is factorized.

In Example 56, the process control circuit of any one of the preceding Examples may optionally include that the error covariance matrix or the inverted error covariance matrix is factorized into triangular matrices. Optionally, the error covariance matrix or the inverted error covariance matrix may be factorized additionally into one or more diagonal matrices (e.g. matrix D).

In Example 57, the process control circuit of any one of the preceding Examples may optionally include that the error covariance matrix (e.g. P) (or the inverted error covariance matrix) is an n×n matrix (also referred to as (n,n)-matrix, e.g. possessing n rows and n columns) and that the triangular matrix (e.g. S) is an n×n matrix, wherein n is a natural number. All factorization matrices of the factorized error covariance matrix may be quadratic and have the same size (n×n) as the error covariance matrix.

In Example 58, the process control circuit of any one of the preceding Examples may optionally include that the error covariance matrix (or the inverted error covariance matrix) is factorized based on the following equation and/or a similar equation:

$$P = S^T S \text{ or } P = U^T D U,$$

wherein D is a diagonal matrix.

In Example 59, the process control circuit of any one of the preceding Examples may optionally include that the triangular matrix (e.g. S or U) has a number of n rows and is of rank r and includes a number of n minus r exact-zero rows. The error covariance matrix P has a number of n rows and is of rank r.

In Example 60, the process control circuit of Example 59 may optionally include that for each of the n rows that includes at least one non-zero element the corresponding diagonal element of the triangular matrix (e.g. S or U) is non-zero.

In Example 61, the process control circuit of any one of the preceding Examples may optionally include that the error covariance matrix is factorized based on the following equation and/or a similar equation:

$$P=SS^T \text{ or } P=DU^T,$$

wherein D is a diagonal matrix.

According to various embodiments, the triangular matrix (e.g. S or U) (for example according to Examples 58 and 61) may be an upper or lower right matrix or an upper or lower left matrix.

In Example 62, the process control circuit of any one of the preceding Examples may optionally include that the triangular matrix (e.g. S or U) has a number of n columns and is of rank r and includes a number of n minus r exact-zero columns. The error covariance matrix P has a number of n rows and is of rank r.

In Example 63, the process control circuit of Example 62 may optionally include that for each of the n columns that includes at least one non-zero element the corresponding diagonal element of the triangular matrix (e.g. S or U) is non-zero.

In Example 64, the process control circuit of any one of the preceding Examples may optionally include that the data merging circuit is further configured to generate a number of g exact zero rows or columns in the triangular matrix (e.g. S or U) if the rank of the triangular matrix (e.g. S or U) is reduced by the number g.

In Example 65, the process control circuit of any one of the preceding Examples may optionally include that the data merging circuit is further configured to generate a number of g exact zero rows or columns in the triangular matrix (e.g. S or U) if the rank of the error covariance matrix P is reduced by the number g.

In Example 66, the process control circuit of any one of the preceding Examples may optionally include that the downdate algorithm processes the rows or columns of the triangular matrix (e.g. S or U) sequentially (one after another). Further, exact zero rows/columns may be processed by a different procedure than non-zero rows. Further, existing zero-rows/columns may be preserved.

In Example 67, the process control circuit of any one of the preceding Examples may optionally include that the finite part ($P_R$) and the infinite part ($P_I$) of the error covariance matrix are factorized. This may increase the numerical precision.

In Example 68, the process control circuit of any one of the preceding Examples may optionally include that the finite part ($P_R$) and the infinite part ($P_I$) of the error covariance matrix are factorized based on the following equation and/or a similar equation:

$$P_R=S_R^T S_R, \ P_R=S_R S_R^T, \ P_R=U_R^T DU_R, \text{ or } P_R=U_R DU_R^T; \text{ and}$$

$P_I=S_I^T S_I, \ P_I=S_I S_I^T, \ P_I=U_I^T DU_I, \text{ or } P_I=U_I DU_I^T$, wherein $S_I$ $S_R$ $U_I$ $U_R$ is a Cholesky Factor, and wherein D is a diagonal matrix.

According to various embodiments, the Cholesky Factor is a triangular matrix.

Various examples are related to a square root update.

In Example 69, the process control circuit of any one of the preceding Examples may optionally include that the error covariance matrix (or in a similar way the inverted error covariance matrix) is dissected.

In Example 70, the process control circuit of any one of the preceding Examples may optionally include that the error covariance matrix (or in a similar way the inverted error covariance matrix) is factorized and dissected.

In Example 71, the process control circuit of any one of the preceding Examples may optionally include that a finite part of the error covariance matrix is factorized and dissected and that an infinite part of the error covariance matrix is factorized and dissected.

In Example 72, the process control circuit of any one of the preceding Examples may optionally include that the finite part of the error covariance matrix is factorized and dissected based on the following equation and/or a similar equation:

$$P_R=S_R^T S_R+P_{R,0}, \ P_R=S_R S_R^T+P_{R,0}, \ P_R=U_R^T DU_R+P_{R,0}, \text{ or } P_R=U_R DU_R^T+P_{R,0}.$$

In Example 73, the process control circuit of any one of the preceding Examples may optionally include that the infinite part of the error covariance matrix is factorized and dissected based on the following equation and/or a similar equation:

$$P_I=S_I^T S_I+P_{I,0}, \ P_I=S_I S_I^T+P_{I,0}, \ P_I=U_I^T DU_I+P_{I,0}, \text{ or } P_I=U_I DU_I^T+P_{I,0}.$$

The matrices $P_{R,0}$ $P_{I,0}$ of Example 72 and 73 are diagonal matrices (of the size n).

In Example 74, the process control circuit of any one of the preceding Examples may optionally include that the error covariance matrix is dissected into a main error covariance matrix and into a process noise matrix to handle accumulated process noise separately in the process noise matrix.

In Example 75, the process control circuit of Example 74 may optionally include that the data merging circuit is further configured to add new process noise to the process noise matrix only (process update) and to transfer (non-zero) elements of the process noise matrix to the main covariance matrix prior to some later downdate in the case that the downdate involves state elements related to this matrix elements.

In Example 76, the process control circuit of any one of the preceding Examples may optionally include that inverted error covariance matrix (e.g. the information matrix) is dissected into a main information matrix and into a measurement noise matrix to handle accumulated measurement noise separately in the measurement noise matrix.

In Example 77, the process control circuit of Example 76 may optionally include that the data merging circuit is further configured to add new measurements noise to the measurement noise matrix only (downdate) and to transfer (non-zero) elements of the measurement noise matrix to the main information matrix prior to some later process update if the update involves state elements related to this matrix elements.

In Example 78, the process control circuit of any one of the preceding Examples may optionally include that the data merging circuit is further configured to update the state information based on a first set of update equations dealing with the transition of the state (A update) and on a second set of update equations for adding new process noise to the state (Q update).

In Example 79, the process control circuit of any one of the preceding Examples may optionally include that a state transition matrix (A) is separated into unit-blocks and non-unit blocks to update the state information.

In Example 80, the process control circuit of Example 78 or 79 may optionally include that the state transition matrix (A) is formulated as or transformed into a block diagonal matrix with a plurality of unit blocks and non-unit blocks.

In Example 81, the process control circuit of Example 79 or 80 may optionally include that the total process update is formulated as a sequence of sub-process-updates, each of the sub-process-updates considering one of the plurality of non-unit blocks.

Various examples are related to validation of Kalman filter models that are tuned to real data.

In Example 82, the process control circuit of any one of the preceding Examples may optionally include that the data merging circuit is further configured to validate and/or tune the process model (e.g. the process model parameters) and/or measurement model (e.g. the measurement model parameters) based on a set of training data.

In Example 83, the process control circuit of Example 82 may optionally include that the set of training data includes available process data (e.g. context data and/or logistic data of the processing arrangement and the operation of the processing arrangement) and/or measurement data (e.g. mapped to the process data).

In Example 84, the process control circuit of any one of the preceding Examples may optionally include that the data merging circuit is further configured to validate a tuned process model and/or a tuned measurement model.

In Example 85, the process control circuit of Example 84 may optionally include that the data merging circuit is further configured to validate the (e.g. tuned) process model and/or the (e.g. tuned) measurement model based on a normalized prediction error signal for predicting reference measurement event data for a plurality of measurement events.

In Example 86, the process control circuit of any one of the preceding Examples may optionally include that the data merging circuit is further configured to validate the process model and/or the measurement model based on a mean value considering a plurality of symmetrized normalized prediction errors.

In Example 87, the process control circuit of Example 86 may optionally include that the symmetrized normalized prediction errors are provided by applying a symmetric function to the normalized prediction errors.

In Example 88, the process control circuit of any one of the preceding Examples may optionally include that the data merging circuit is further configured to validate the process model and/or the measurement model (e.g. all parameters) based on a likelihood signal and/or a likelihood-gradient signal for one or more model parameters (e.g. for a specific model parameter). The signal may be a sequence of numbers, wherein each number corresponds to a measurement value.

Various examples are related to tracking, monitoring and debugging of a recursive estimation and prediction algorithm.

In Example 89, the process control circuit of any one of the preceding Examples may optionally include that the data merging circuit is further configured to store a plurality of backup state information (e.g. thereby generating additional historical data) and a plurality of backup model parameters to reconstruct at least one state information to be monitored.

In Example 90, the process control circuit of any one of the preceding Examples may optionally include that the data merging circuit is further configured to reconstruct at least one state information to be monitored during operating the filter.

In Example 91, the process control circuit of any one of the preceding Examples may optionally include that the data merging circuit is further configured to reconstruct the at least one state information to be monitored by recalculating the at least one state information to be monitored starting from one of the stored plurality of backup state information and considering or incorporating one or more of the stored plurality of model parameters.

In Example 92, the process control circuit of any one of the preceding Examples may optionally further include a data processing circuit configured to reconstruct a (for example user defined) combination of one or more state information elements of the at least one state information to be monitored.

In Example 93, the process control circuit of any one of the preceding Examples may optionally include that the data merging circuit is further configured to decompose state information or a combination of state information elements of the state information into a weighted sum considering a plurality of previous measurement event data.

In Example 94, the process control circuit of any one of the preceding Examples may optionally include that the data merging circuit is further configured to provide one or more tracking and/or debugging quantities considering at least one user defined (e.g. linear) combination of state information elements of the state information.

In Example 95, the process control circuit of any one of the preceding Examples may optionally include that the data merging circuit is further configured to calculate an exact likelihood-gradient of the process model (e.g. for the process equations and/or the measurement equations).

In Example 96, the process control circuit of Example 95 may optionally include that a generalized inverse (pseudo-inverse) of a product is used to calculate an exact likelihood-gradient of the process model, the product including a matrix of a process or measurement model parameter and the transposed of the matrix.

In Example 97, the process control circuit of Example 95 or 96 may optionally include that the data merging circuit is further configured to calculate an exact likelihood-gradient of the process model considering the following equation or a similar equation:

$$N_{k-1} = (I - C_k^T K_k^T) A_{k+1}^T N_k A_{k+1} (I - C_k K_k) + C_k^T F_k^{-1} C_k.$$

According to various embodiments, the matrix N in Example 97 is factorized.

In Example 98, the process control circuit of any one of the preceding Examples may optionally include that the data merging circuit 108 is further configured to calculate an exact likelihood-gradient of the process model and/or measurement model using a generalized inverse of a product, the product comprising a matrix of a process or measurement model parameter and its transpose, and/or using a forward and a backward iteration, wherein at least one iteration matrix in the forward iteration is factorized and/or wherein at least one iteration matrix in the backward iteration is factorized.

In Example 99, the process control circuit of any one of the preceding Examples may optionally include that the data merging circuit is further configured to provide an aggregated process model parameter for one or more of the process model parameter respectively. The aggregated process model parameter represents a plurality of process model parameters of corresponding process events for which no measurement events are considered.

Various examples are related to a disruption modeling for a process model and/or a measurement model for a recursive estimation and prediction algorithm.

In Example 100, the process control circuit of any one of the preceding Examples may optionally include that the data merging circuit is configured to validate acquired measurement data based on statistical error information to determine a model mismatch.

In Example 101, the process control circuit of any one of the preceding Examples may optionally include that the data merging circuit is configured to select a reference model of a plurality of reference models and to recalculate the state information based on the selected reference model, e.g. in the case that a mismatch is determined as described in Example 100.

In Example 102, the process control circuit of any one of the preceding Examples may optionally include that the data merging circuit is configured to select a first reference model of a plurality of reference model and to recalculate the state information based on the selected first reference model and to determine a first model match parameter, and to select a second reference model of a plurality of reference model and to recalculate the state information based on the selected second reference model and to determine a second model match parameter, and to compare the first model match parameter with the second model match parameter and to select the first or second model for further operation based on the comparison.

In Example 103, the process control circuit of any one of the preceding Examples may optionally include that the data merging circuit is further configured to validate and/or tune a model that is utilized for updating and/or downdating (e.g. the process model and/or measurement model).

Example 104 is a method for controlling a processing arrangement, the method including: acquiring process data and measurement data of the processing arrangement, the process data including a plurality of process event data in accordance with a plurality of process events and the measurement data including a plurality of measurement event data in accordance with a plurality of measurement events; providing state information representing a status of the processing arrangement and accuracy information representing an accuracy of the state information; updating the state information based on the acquired process event data, whereby the accuracy of the state information is decreased, and, independently from updating the state information, downdating the state information based on the acquired measurement event data, whereby the accuracy of the state information is increased, and controlling the processing arrangement based on the state information and/or on the accuracy information.

Example 105 is a non-transitory computer readable medium with program instructions, which when executed, cause a device to perform a processing arrangement control including: acquiring process data and measurement data of the processing arrangement, the process data including a plurality of process event data in accordance with a plurality of process events and the measurement data including a plurality of measurement event data in accordance with a plurality of measurement events; providing state information representing a status of the processing arrangement and accuracy information representing an accuracy of the state information; updating the state information based on the acquired process event data, whereby the accuracy of the state information is decreased, and, independently from updating the state information, downdating the state information based on the acquired measurement event data, whereby the accuracy of the state information is increased, and controlling the processing arrangement based on the state information and/or on the accuracy information.

Example 106 is a process control circuit including: a data acquisition circuit configured to acquire process data and measurement data of a processing arrangement, the process data including a plurality of process event data in accordance with a plurality of process events and the measurement data including a plurality of measurement event data in accordance with a plurality of measurement events; a data merging circuit configured to provide an estimated state information, the estimated state information representing an estimated status of the processing arrangement, and an error information representing an estimation error of the estimated state information; the data merging circuit further configured to provide the estimated state information by updating and downdating a previous state information based on the acquired process event data and measurement event data, wherein the estimation error is increased by the updating (e.g. considering the process data), and, wherein the estimation error is decreased by the downdating (e.g. considering the measurement event data), and a control circuit configured to control the processing arrangement based on at least one of the estimated state information (X) and/or the estimation error.

Example 107 is a process control circuit including: a data acquisition circuit configured to acquire process data and measurement data of a processing arrangement, the process data including a plurality of process event data in accordance with a plurality of process events and the measurement data including a plurality of measurement event data in accordance with a plurality of measurement events; a recursive process control circuit configured to recursively calculate a current state information based on process event data of a current process event and of a sequence of previous process (e.g. and measurement) events, and to recalculate the current state information upon acquiring measurement event data corresponding to at least one previous process event of the sequence of previous process events (and/or upon acquiring process event data), and a control circuit configured to control the processing arrangement based on the current state information (X) and/or based on an accuracy ($\Delta X$) of the current state information (X).

In Example 108, the process control circuit according to any one of preceding Examples is used in batch production for producing a plurality of products, wherein each of the plurality of products is produced via a plurality of processes. Batch production may result in a huge dataset to be handled, wherein the huge dataset is automatically handled by the data merging circuit 108 described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A process control circuit comprising:
    a data acquisition circuit configured to acquire process data and measurement data of a processing arrangement, the process data comprising process event data in accordance with a plurality of process events and the measurement data comprising measurement event data in accordance with a plurality of measurement events;
    a data merging circuit configured to merge the acquired process data and the measurement data to provide state information representing a status of the processing arrangement, and determine accuracy information representing an accuracy of the state information,
    wherein the determining the accuracy information comprises:

separating an estimation error of the provided state information into a finite part and an infinite part, determining an accuracy metric from the infinite part, comparing the accuracy metric to a threshold, providing a finite error variance when the accuracy metric is less than or equal to the threshold, and providing an infinite error variance when the accuracy metric is greater than the threshold, and wherein the data merging circuit is further configured to update the state information based on the acquired process event data, wherein the accuracy of the state information is decreased, and, independently from the updating the state information, to downdate the state information based on the acquired measurement event data, wherein the accuracy of the state information is increased; and a control circuit configured to control the processing arrangement based on the state information or based on the accuracy information.

2. The process control circuit according to claim 1, wherein the data merging circuit is further configured to update the state information based on a process model considering process model parameters and process model estimation parameters; or wherein the data merging circuit is further configured to downdate the state information based on a measurement model considering measurement model parameters and measurement model estimation parameters.

3. The process control circuit according to claim 1, wherein the control circuit is further configured to provide process control data to control the processing arrangement based on the state information or based on the accuracy information; or wherein the control circuit is further configured to provide monitoring data based on the state information or based on the accuracy information to monitor at least one of the processing arrangement, the data acquisition circuit, or the data merging circuit.

4. The process control circuit according to claim 1, wherein the estimation error comprises a statistical estimation error.

5. The process control circuit according to claim 1, wherein the data merging circuit is configured to merge the process data and the measurement data based on a Kalman filter to provide the state information or the accuracy information.

6. The process control circuit according to claim 1, wherein the data acquisition circuit is further configured to correlate the plurality of measurement events with the corresponding plurality of process events.

7. The process control circuit according to claim 1, wherein the data merging circuit is further configured to calculate current state information based on process event data of a current process event and of a sequence of previous process events, and to recalculate the current state information upon acquiring the measurement event data corresponding to at least one previous process event of the sequence of previous process events.

8. The process control circuit according to claim 1, wherein the data merging circuit is further configured to model the process data based on a process model comprising one or more process model parameters for modelling known influences and/or one or more process estimation parameters for modelling unknown influences; and wherein the data merging circuit is further configured to model the measurement data based on one or more measurement model parameters for modelling known influences and/or one or more measurement estimation parameters for modelling unknown influences.

9. The process control circuit according to claim 1, wherein the data merging circuit is further configured to update the state information based on a first set of equations and to downdate the state information based on a second set of equations, wherein equations of the first set of equations are executed independently from equations of the second set of equations.

10. The process control circuit according to claim 1, wherein the data merging circuit is configured to provide estimated measurement data using a process model and a measurement model to check for a mismatch between the measurement data and the estimated measurement data.

11. The process control circuit according to claim 10, further comprising:

a communication circuit configured to provide an alarm message or alarm signal in case the mismatch is detected.

12. The process control circuit according to claim 1, wherein the finite part of the estimation error is determined via a factorized error covariance matrix or a factorized inverted error covariance matrix and/or wherein the infinite part of the estimation error is determined via a further factorized error covariance matrix or a further factorized inverted error covariance matrix.

13. The process control circuit according to claim 1, wherein the data merging circuit is further configured to downdate the state information based on a first set of downdate equations in a first case and based on a second set of downdate equations in a second case, and wherein the first case and the second case are discriminated from each other via the accuracy metric.

14. The process control circuit according to claim 1, wherein the data merging circuit is further configured to downdate the state information based on a first set of downdate equations in a first case and based on a second set of downdate equations in a second case, wherein the first case and the second case are discriminated from each other via the accuracy metric, and wherein the data merging circuit is further configured to provide the accuracy metric based on an observation vector and an error covariance matrix and to compare the accuracy metric with a reference value, wherein the observation vector is factorized.

15. The process control circuit according to claim 1, wherein the estimation error is determined via a factorized error covariance matrix or a factorized inverted error covariance matrix.

16. The process control circuit according to claim 15, wherein the factorized error covariance matrix or the factorized inverted error covariance matrix comprises at least two triangular matrices, wherein at least one triangular matrix of the at least two triangular matrices has a number of n columns, is of rank r and comprises a number of n minus r exact-zero columns, and wherein for each of the n columns that comprises at least one non-zero element, a corresponding diagonal element of the at least one triangular matrix is non-zero.

17. The process control circuit according to claim 1, wherein the estimation error is determined via an error covariance matrix or an inverted error covariance matrix; and wherein the error covariance matrix is dissected into a main covariance matrix and into a process noise matrix to handle accumulated process noise separately in the process noise matrix, or wherein the inverted error covariance matrix is dissected into a main inverted covariance matrix and into a measurement noise matrix to handle accumulated measurement noise separately in the measurement noise matrix.

18. The process control circuit according to claim 17, wherein the data merging circuit is further configured to add new process noise to the process noise matrix only and to transfer elements of the process noise matrix to the main covariance matrix prior to a later downdate in case the later downdate involves state elements related to matrix elements of the process noise matrix; or wherein the data merging circuit is further configured to add new measurement noise to the measurement noise matrix only and to transfer elements of the measurement noise matrix to the main inverted covariance matrix prior to a later update in case the later update involves state elements related to matrix elements of the measurement noise matrix.

19. The process control circuit according to claim 1; wherein the data merging circuit is further configured to update the state information based on a process model and to validate or tune the process model or a measurement model based on a set of training data.

20. The process control circuit according to claim 1, wherein the data merging circuit is further configured to store a plurality of backup state information and a plurality of backup model parameters to reconstruct at least one state information to be monitored.

21. The process control circuit according to claim 2, wherein the data merging circuit is further configured to calculate an exact likelihood-gradient of the process model or the measurement model by using a generalized inverse of a product, the product comprising a matrix containing one or more process model parameters and its transpose or a matrix containing one or more measurement model parameters and its transpose; or using a forward and a backward iteration, wherein at least one iteration matrix in the forward iteration is factorized and/or wherein at least one iteration matrix in the backward iteration is factorized.

22. The process control circuit according to claim 1, wherein the data merging circuit is further configured to update the state information based on an aggregated process model parameter, wherein the aggregated process model parameter represents a plurality of process model parameters of corresponding process events for which no measurement events are considered.

23. The process control circuit according to claim 1, wherein the data merging circuit is configured to validate the acquired measurement data based on the accuracy information to determine a model mismatch, and, in the case that the model mismatch is determined, to select a reference model of a plurality of reference models and to recalculate the state information based on the selected reference model.

24. The process control circuit according to claim 1, wherein the data merging circuit is configured to update the state information based on a state transition matrix that is formulated as or transformed into a block diagonal matrix with a plurality of unit blocks and non-unit blocks, and wherein a total process update is formulated as a sequence of sub-process-updates, each of the sub-process-updates considering one of the plurality of non-unit blocks.

25. The process control circuit according to claim 1, wherein the data merging circuit is configured to validate a process model or a measurement model based on at least one of the following:
a normalized prediction error signal;
a mean value considering a plurality of symmetrized normalized prediction errors;
a likelihood signal; or
a likelihood-gradient signal.

26. The process control circuit according to claim wherein the data merging circuit is further configured to:
update the finite part of the estimation error based on finite part of a previous estimation error and not based on the infinite part of the previous estimation error when the accuracy metric is less than or equal to the threshold; and
update the finite part of the estimation error based on both the finite part of the previous estimation error and the infinite part of the previous estimation error when the accuracy metric is greater than then the threshold.

27. The process control circuit according to claim 1, wherein the control circuit is further configured to interrupt a control loop of the processing arrangement when the provided finite error variance or the provided infinite error variance is greater than then the threshold.

28. The process control circuit according to claim 1, wherein the data merging circuit is further configured to perform a maximum likelihood estimation, wherein the performing the maximum likelihood estimation comprises determining log-likelihood values based on the finite part of the estimation error when the accuracy metric is less than or equal to the threshold.

29. A method for controlling a processing arrangement, the method comprising:
acquiring process data and measurement data of the processing arrangement, the process data comprising process event data in accordance with a plurality of process events and the measurement data comprising measurement event data in accordance with a plurality of measurement events;
merging the acquired process data and the measurement data to provide state information representing a status of the processing arrangement;
determining accuracy information representing an accuracy of the state information, wherein the determining the accuracy information comprises:
separating an estimation error of the provided state information into a finite part and an infinite part,
determining an accuracy metric from the infinite part,
comparing the accuracy metric to a threshold,
providing a finite error variance when the accuracy metric is less than or equal to the threshold, and
providing an infinite error variance when the accuracy metric is greater than the threshold;
updating the state information based on the acquired process event data, wherein the accuracy of the state information is decreased;
independently from the updating the state information, downdating the state information based on the acquired measurement event data, wherein the accuracy of the state information is increased; and
controlling the processing arrangement based on the state information or on the accuracy information.

30. A non-transitory computer readable medium with program instructions thereon, which when executed, causes a device to perform a processing arrangement control comprising:

acquiring process data and measurement data of the processing arrangement, the process data comprising process event data in accordance with a plurality of process events and the measurement data comprising measurement event data in accordance with a plurality of measurement events;

merging the acquired process data and the measurement data to provide state information representing a status of the processing arrangement;

determining accuracy information representing an accuracy of the state information, wherein the determining the accuracy information comprises:
  separating an estimation error of the provided state information into a finite part and an infinite part,
  determining an accuracy metric from the infinite part,
  comparing the accuracy metric to a threshold,
  providing a finite error variance when the accuracy metric is less than or equal to the threshold, and
  providing an infinite error variance when the accuracy metric is greater than the threshold;

updating the state information based on the acquired process event data, wherein the accuracy of the state information is decreased;

independently from the updating the state information, downdating the state information based on the acquired measurement event data, wherein the accuracy of the state information is increased; and controlling the processing arrangement based on the state information or on the accuracy information.

31. A process control circuit comprising:

a data acquisition circuit configured to acquire process data and measurement data of a processing arrangement, the process data comprising process event data in accordance with a plurality of process events and the measurement data comprising measurement event data in accordance with a plurality of measurement events;

a data merging circuit configured to merge the acquired process data and the measurement data to provide state information, the state information representing a status of the processing arrangement, and accuracy information representing an accuracy of the state information, wherein the data merging circuit is further configured to update the state Information based on the acquired process event data, wherein the accuracy of the state information is decreased, and, independently from the updating the state information, to downdate the state information based on the acquired measurement event data, wherein the accuracy of the state information is increased, wherein the data merging circuit is further configured to determine the accuracy information based on an estimation error, wherein the estimation error is determined via a factorized error covariance matrix or a factorized inverted error covariance matrix, wherein the factorized error covariance matrix or the factorized inverted error covariance matrix comprises at least two triangular matrices, wherein at least one triangular matrix of the at least two triangular matrices has a number of n columns, is of rank r and comprises a number of n minus r exact-zero columns, and wherein for each of the n columns that comprises at least one non-zero element, a corresponding diagonal element of the at least one triangular matrix is non-zero; and a control circuit configured to control the processing arrangement based on the state information or based on the accuracy information.

* * * * *

UNITED STATES PATENT AND TRADEMARK OFFICE
CERTIFICATE OF CORRECTION

| | |
|---|---|
| PATENT NO. | : 10,963,449 B2 |
| APPLICATION NO. | : 15/993304 |
| DATED | : March 30, 2021 |
| INVENTOR(S) | : Ulf Seidel |

Page 1 of 1

It is certified that error appears in the above-identified patent and that said Letters Patent is hereby corrected as shown below:

In the Claims

In Column 81, Line 24, Claim 19, delete "claim 1;" and insert --claim 1,--.

In Column 82, Line 10, Claim 26, delete "claim wherein" and insert --claim 1, wherein--.

In Column 82, Line 26, Claim 27, delete "than then the threshold" and insert --than the threshold--.

In Column 84, Line 10, Claim 31, delete "the state Information" and insert --the state information--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*